US012664829B2

(12) United States Patent
Darden et al.

(10) Patent No.: US 12,664,829 B2
(45) Date of Patent: Jun. 23, 2026

(54) DATA STORAGE AND TRANSFER DEVICE FOR AN AGRICULTURAL INTELLIGENCE COMPUTING SYSTEM

(71) Applicant: CLIMATE LLC, Saint Louis, MO (US)

(72) Inventors: Will Darden, Cary, NC (US); Jongjin Kim, Vernon Hills, IL (US); Aaron Petersdorf, Wheaton, IL (US); Samuel Rodriguez, Arlington Heights, IL (US)

(73) Assignee: CLIMATE LLC, Saint Louis, MO (US)

( * ) Notice: Subject to any disclaimer, the term of this patent is extended or adjusted under 35 U.S.C. 154(b) by 7 days.

(21) Appl. No.: 18/737,769

(22) Filed: Jun. 7, 2024

(65) Prior Publication Data

US 2024/0321021 A1 Sep. 26, 2024

Related U.S. Application Data

(60) Continuation of application No. 18/213,788, filed on Jun. 23, 2023, now Pat. No. 12,008,844, which is a
(Continued)

(51) Int. Cl.
*G07C 5/00* (2006.01)
*G05D 1/00* (2024.01)
(Continued)

(52) U.S. Cl.
CPC ........... *G07C 5/008* (2013.01); *G05D 1/0022* (2013.01); *G05D 1/226* (2024.01); *G06F 1/20* (2013.01); *G07C 5/085* (2013.01); *H04W 4/40* (2018.02)

(58) Field of Classification Search
CPC ...... G07C 5/008; G07C 5/085; G05D 1/0022; G05D 1/226; G06F 1/20; H04W 4/40;
(Continued)

(56) References Cited

U.S. PATENT DOCUMENTS 3,182,280 A * 5/1965 Daut .................... H01R 13/443
439/378
3,270,314 A * 8/1966 Kohanek ................ H01R 13/17
439/827
(Continued)

FOREIGN PATENT DOCUMENTS

CA 2888742 A1 3/2015
EP 1687762 A1 8/2006
(Continued)

OTHER PUBLICATIONS

Introduction to M2, by Macchina, https://web.archive.org/web/20181122234247/https://www.macchina.cc/m2-introduction (Year: 2018).*

(Continued)

*Primary Examiner* — Frederick M Brushaber
(74) *Attorney, Agent, or Firm* — Harness, Dickey & Pierce, P.L.C.

(57) ABSTRACT

A connector is provided for use with a communication apparatus to facilitate communication of data, via the communication apparatus, between a vehicle or agricultural implement and a computing device. The connector includes a first portion first portion configured to couple the connector to the vehicle or agricultural implement, and a second portion configured to couple the connector to the communication apparatus. The second portion of the connector includes a substrate having at least one circuit trace defined along a surface of the substrate and configured to conductively transfer electronic signals between the connector and the communication apparatus.

20 Claims, 37 Drawing Sheets portable computing
device 12 farm equipment 10

Related U.S. Application Data continuation of application No. 17/380,630, filed on Jul. 20, 2021, now Pat. No. 11,688,210, which is a division of application No. 16/808,149, filed on Mar. 3, 2020, now Pat. No. 11,069,158.

(60) Provisional application No. 62/813,629, filed on Mar. 4, 2019.

(51) Int. Cl.

| | |
|---|---|
| *G05D 1/226* | (2024.01) |
| *G06F 1/20* | (2006.01) |
| *G07C 5/08* | (2006.01) |
| *H04W 4/40* | (2018.01) |

(58) Field of Classification Search
CPC ....... H04W 4/02; H04W 4/027; H04W 4/029; H04W 4/80; H01Q 1/22; H01Q 1/325; H01Q 5/35; H01Q 9/42
See application file for complete search history.

(56) References Cited

U.S. PATENT DOCUMENTS

| | | | | |
|---|---|---|---|---|
| D220,105 | S | 3/1971 | Small | |
| D303,584 | S | 9/1989 | Bakic | |
| D327,690 | S | 7/1992 | Ogawa et al. | |
| D382,255 | S | 8/1997 | Moffatt | |
| D387,062 | S | 12/1997 | Heine | |
| 5,695,362 | A | 12/1997 | Hillbish et al. | |
| D391,943 | S | 3/1998 | Han | |
| D391,944 | S | 3/1998 | Han | |
| D398,079 | S | 9/1998 | Denison | |
| D402,992 | S | 12/1998 | Sander | |
| D414,476 | S | 9/1999 | Hibino | |
| D438,202 | S | 2/2001 | Hui | |
| D442,338 | S | 5/2001 | Roman | |
| D454,873 | S | 3/2002 | Clark et al. | |
| 6,554,626 | B2 * | 4/2003 | Ramos, Jr. .......... | H01R 13/405 439/372 |
| D507,569 | S | 7/2005 | Tagliabue et al. | |
| D519,859 | S | 5/2006 | Chinnadurai et al. | |
| D543,458 | S | 5/2007 | Dittmer et al. | |
| D552,607 | S | 10/2007 | Cleland et al. | |
| 7,327,145 | B2 * | 2/2008 | Haugland ................ | G01V 3/30 73/152.43 |
| D567,090 | S | 4/2008 | Swint et al. | |
| D581,927 | S | 12/2008 | Sumii | |
| D582,408 | S | 12/2008 | Maiers et al. | |
| D585,892 | S | 2/2009 | Urban | |
| D587,706 | S | 3/2009 | Maiers et al. | |
| D587,707 | S | 3/2009 | Maiers et al. | |
| D590,391 | S | 4/2009 | Sumii | |
| D598,018 | S | 8/2009 | Sumii | |
| D598,020 | S | 8/2009 | Lu et al. | |
| D600,694 | S | 9/2009 | Sumii | |
| 7,701,714 | B2 | 4/2010 | Shabany | |
| 7,805,228 | B2 | 9/2010 | Liebl et al. | |
| D642,565 | S | 8/2011 | Demskie et al. | |
| D657,784 | S | 4/2012 | Akana et al. | |
| D660,711 | S | 5/2012 | Watabe | |
| 8,284,107 | B2 * | 10/2012 | Borisov ............... | H01Q 1/2233 343/700 MS |
| D673,504 | S | 1/2013 | Esses | |
| D687,009 | S | 7/2013 | Song et al. | |
| D697,475 | S | 1/2014 | Regole | |
| D697,800 | S | 1/2014 | Villarreal et al. | |
| D717,305 | S | 11/2014 | Alesi et al. | |
| D724,977 | S | 3/2015 | Browning | |
| 9,008,745 | B2 * | 4/2015 | Pushpala ............ | A61B 5/14514 600/345 |
| D729,772 | S | 5/2015 | Ferber et al. | |
| D736,166 | S | 8/2015 | Kuh et al. | |
| D747,417 | S | 1/2016 | Cho et al. | |
| D747,984 | S | 1/2016 | Zhao et al. | |
| D751,538 | S | 3/2016 | Koehler | |
| D768,626 | S | 10/2016 | Mikelson | |
| 9,609,112 | B2 * | 3/2017 | Mikelson ............ | H04B 1/3877 |
| D783,609 | S | 4/2017 | Mikelson | |
| D792,409 | S | 7/2017 | Shim | |
| 9,806,826 | B2 | 10/2017 | Zhu et al. | |
| D803,073 | S | 11/2017 | Ji et al. | |
| D826,738 | S | 8/2018 | Liao et al. | |
| D829,714 | S | 10/2018 | Robinson | |
| D829,719 | S | 10/2018 | Shim | |
| D832,264 | S | 10/2018 | Kim et al. | |
| D839,755 | S | 2/2019 | Du | |
| D843,238 | S | 3/2019 | Rose et al. | |
| D850,939 | S | 6/2019 | Siminoff et al. | |
| D852,077 | S | 6/2019 | Seaberry et al. | |
| D858,463 | S | 9/2019 | Nien et al. | |
| D870,704 | S | 12/2019 | Leung et al. | |
| D879,053 | S | 3/2020 | Yu | |
| D885,209 | S | 5/2020 | Hernandez | |
| D886,801 | S | 6/2020 | Feng | |
| D888,052 | S | 6/2020 | Manoharan et al. | |
| 10,761,075 | B2 * | 9/2020 | Gui ..................... | G06V 20/188 |
| D900,650 | S | 11/2020 | Hernandez et al. | |
| D900,788 | S | 11/2020 | Wang | |
| 10,871,563 | B2 * | 12/2020 | Hong ........................ | H01Q 9/04 |
| D917,472 | S | 4/2021 | Kwon et al. | |
| D922,381 | S | 6/2021 | Mills et al. | |
| 11,069,158 | B2 * | 7/2021 | Rodriguez ............... | G06F 1/20 |
| 11,191,219 | B2 * | 12/2021 | Baurer ............... | G06F 16/5838 |
| 11,688,210 | B2 | 6/2023 | Rodriguez et al. | |
| 2003/0003777 | A1 | 1/2003 | Lesesky et al. | |
| 2003/0060069 | A1 * | 3/2003 | Duquerroy ............. | H01R 24/50 439/188 |
| 2004/0137768 | A1 | 7/2004 | Haehn et al. | |
| 2005/0010341 | A1 | 1/2005 | MacNamara et al. | |
| 2005/0264176 | A1 * | 12/2005 | Onozuka ................. | H10F 39/12 313/500 |
| 2006/0226737 | A1 * | 10/2006 | Miyazawa ............. | H02N 2/004 310/323.02 |
| 2006/0235586 | A1 | 10/2006 | Waszkowski et al. | |
| 2007/0120753 | A1 | 5/2007 | Hung et al. | |
| 2008/0036381 | A1 * | 2/2008 | Kang ....................... | H01J 11/46 313/586 |
| 2008/0278377 | A1 | 11/2008 | Vance | |
| 2009/0005928 | A1 | 1/2009 | Sells et al. | |
| 2009/0102626 | A1 | 4/2009 | Lesesky | |
| 2009/0305533 | A1 * | 12/2009 | Feldman .......... | H01R 13/65918 439/101 |
| 2010/0269552 | A1 | 10/2010 | Morrison et al. | |
| 2010/0274452 | A1 * | 10/2010 | Ringwald ............ | A01B 69/008 701/50 |
| 2011/0270485 | A1 | 11/2011 | Jones | |
| 2012/0050104 | A1 * | 3/2012 | Jakab ....................... | G01S 19/34 342/357.75 |
| 2013/0090820 | A1 | 4/2013 | Frashure et al. | |
| 2013/0154884 | A1 | 6/2013 | Cheng et al. | |
| 2013/0282227 | A1 * | 10/2013 | Chen ....................... | G07C 5/008 701/1 |
| 2014/0319099 | A1 * | 10/2014 | Baujan ................... | H01H 33/08 218/41 |
| 2014/0357295 | A1 | 12/2014 | Skomra et al. | |
| 2016/0125669 | A1 | 5/2016 | Meyer et al. | |
| 2016/0344859 | A1 | 11/2016 | Mikelson et al. | |
| 2017/0018838 | A1 | 1/2017 | Wu et al. | |
| 2017/0142241 | A1 | 5/2017 | Kim et al. | |
| 2017/0214422 | A1 | 7/2017 | Na et al. | |
| 2018/0129987 | A1 | 5/2018 | Tatge et al. | |
| 2019/0195788 | A1 * | 6/2019 | Liu ..................... | G01N 21/3554 |
| 2019/0277996 | A1 * | 9/2019 | Xiao ..................... | H01Q 1/521 |
| 2019/0394547 | A1 | 12/2019 | Lemons et al. | |
| 2020/0128720 | A1 * | 4/2020 | Cizek ..................... | G06Q 10/06 |
| 2020/0132655 | A1 * | 4/2020 | Kusiek ................... | G01N 33/24 |
| 2020/0167703 | A1 | 5/2020 | Tatge et al. | |

(56) References Cited

U.S. PATENT DOCUMENTS

2020/0178483 A1*  6/2020  Devecigil ............... G06F 16/51
2020/0286306 A1    9/2020  Rodriguez et al.

FOREIGN PATENT DOCUMENTS

WO      WO-2013083312 A1 *  6/2013   ............. A01B 59/00
WO      WO-2017202809 A1    11/2017

OTHER PUBLICATIONS

The Climate Corporation Transforms Data into Value with New Climate Fieldview Integrated Digital Ag Platform, (online) 3 pages. Posted Sep. 2, 2015.
The Climate Corporation Transforms Data into Value (online) 4 pgs. Posted Sep. 2, 2015.
Climate FieldView Drive Overview and Installation, (online PDF) 1 pg © 2016.
U.S. Appl. No. 18/213,788, filed Jun. 23, 2023, Rodriguez et al.
U.S. Appl. No. 17/380,630, filed Jul. 20, 2021, Rodriguez et al.
U.S. Appl. No. 16/808,149, filed Mar. 3, 2020, Rodriguez et al.
U.S. Appl. No. 29/735,370, filed May 20, 2020, Rodriguez et al.
U.S. Appl. No. 18/213,788: (a) Notice of Allowance dated Feb. 7, 2024. The instant application claims priority to U.S. Appl. No. 18/213,788.
U.S. Appl. No. 17/380,630: (a) Office Action dated Nov. 2, 2022; and (b) Notice of Allowance dated Feb. 14, 2023. The instant application claims priority to U.S. Appl. No. 17/380,630.
U.S. Appl. No. 16/808,149: (a) Notice of Allowance dated Apr. 4, 2021; and (b) Corrected Notice of Allowability dated Apr. 9, 2021. The instant application claims priority to U.S. Appl. No. 16/808,149.
PCT/US2020/020835: PCT International Search Report and Written Opinion (12 pages) of PCT Patent Application No. PCT/US2020/020835, dated Jul. 23, 2020. Both the instant application and PCT Patent Application No. PCT/US2020/020835 have a related priority claim.
U.S. Appl. No. 29/735,370: Office Action dated Dec. 16, 2021. Both U.S. Appl. No. 29/735,370 and the instant application have a related priority claim.
CA 3,101,819: (a) Official Communication dated Oct. 13, 2021; and (b) Requisition dated Sep. 28, 2022. Both the instant application and Canadian Patent Application No. 3,101,819 have a related priority claim.
EP 23166271.9: Extended European Search Report date Augst 14, 2023 (9 pgs.). Both EP23166271.9 and the instant application have a related priority claim.
EP 20766190.1: Extended European Search Report date Jun. 15, 2022 (6 pgs.). Both EP20766190.1 and the instant application have a related priority claim.
BR 1222022011482-2: Office Action dated Aug. 25, 2022. BR1222022011482-2 and the instant application have a related priority claim.
BR1120200232934-8: Office Action dated Mar. 15, 2022. Brazilian Patent Application No. BR1120200232934-8 has a priority claim in common with the instant application.
BR 122021021431-0: Office Action dated Mar. 21, 2023; and Office Action dated Jul. 28, 2023. Brazilian Patent Application No. BR122021021431-0 has a priority claim in common with the instant application.

* cited by examiner portable computing device 12 farm equipment 10 to wireless drive unit 14 push & twist coupling receptacles 50 connector 20 top view side view bottom view outer housing 52 non-conductive end cap 54 end cap graphics layer 56 (optional)

circuitry housing 58 circuitry mounting & mating connections 60 align, twist, & locking piece 62 core assembly structure 55 mating coupling structure 57 protective connector 22 core assembly 64 of wireless drive unit non-conductive end cap 54 end cap graphics layer 56 (optional)

circuitry housing 58 wireless drive unit circuitry 25 circuitry mounting & mating connections 60 assembled wireless
drive unit 14 female connector 20 of farm
equipment 10 assembled wireless drive unit 14 female connector 20 of farm equipment 10

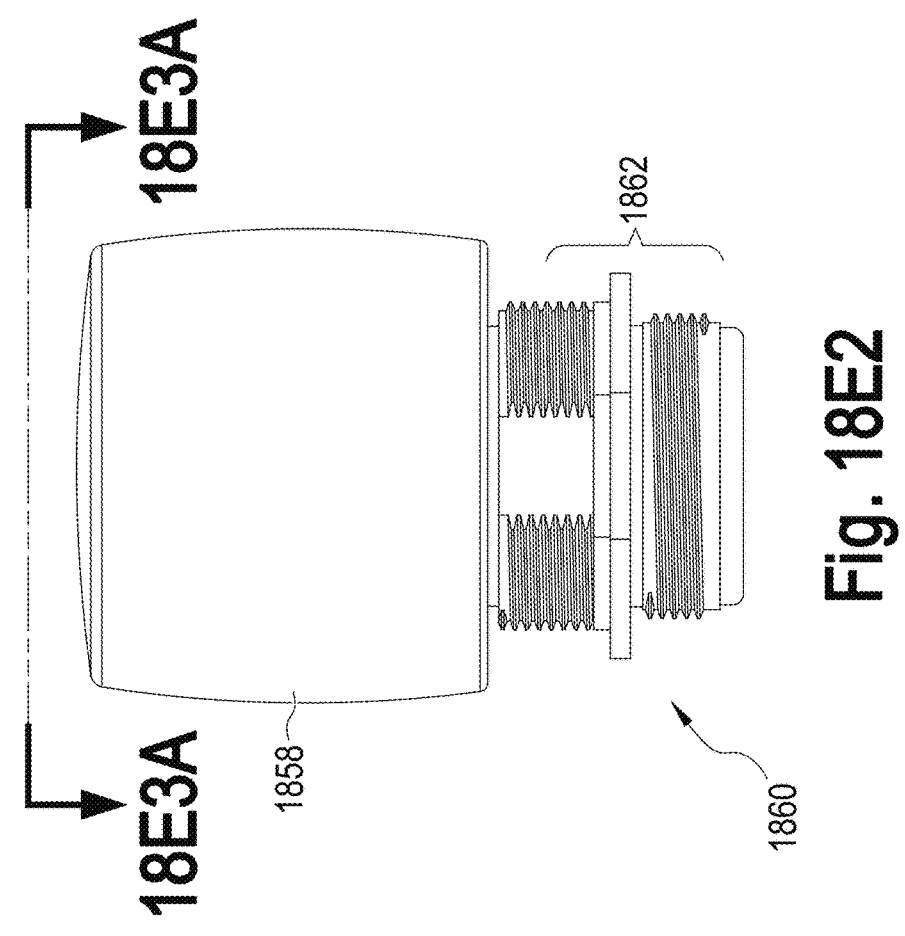
Fig. 18E2
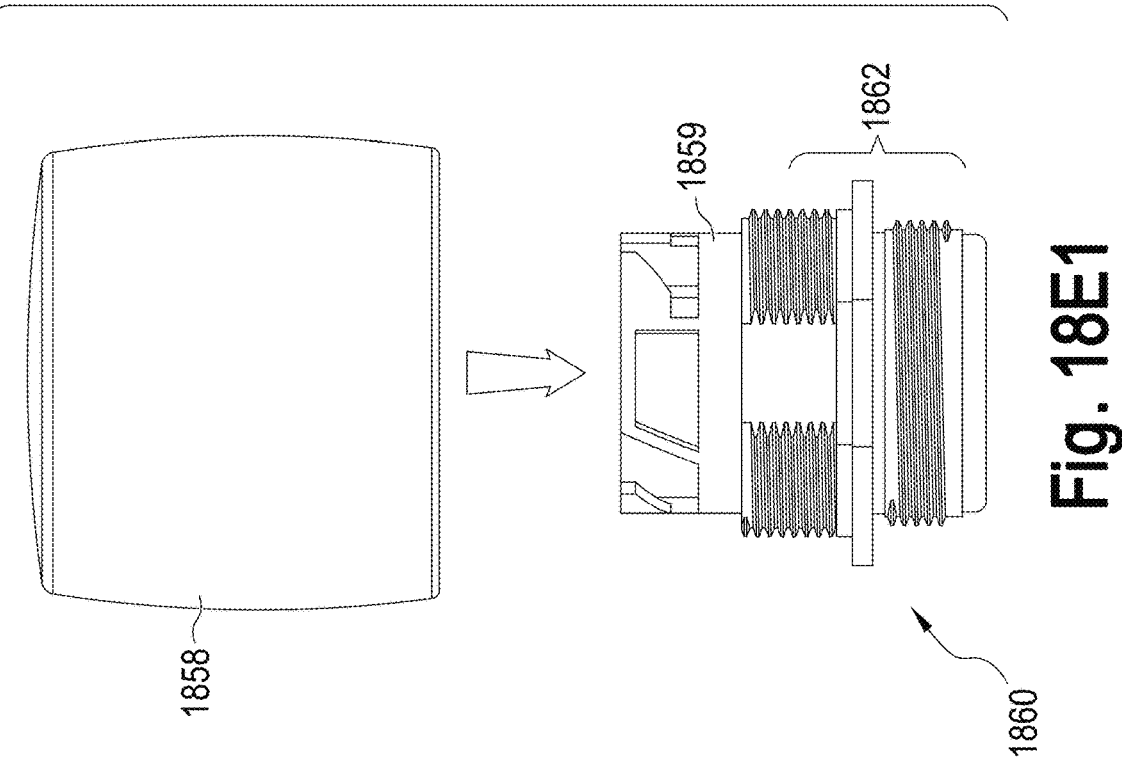
Fig. 18E1

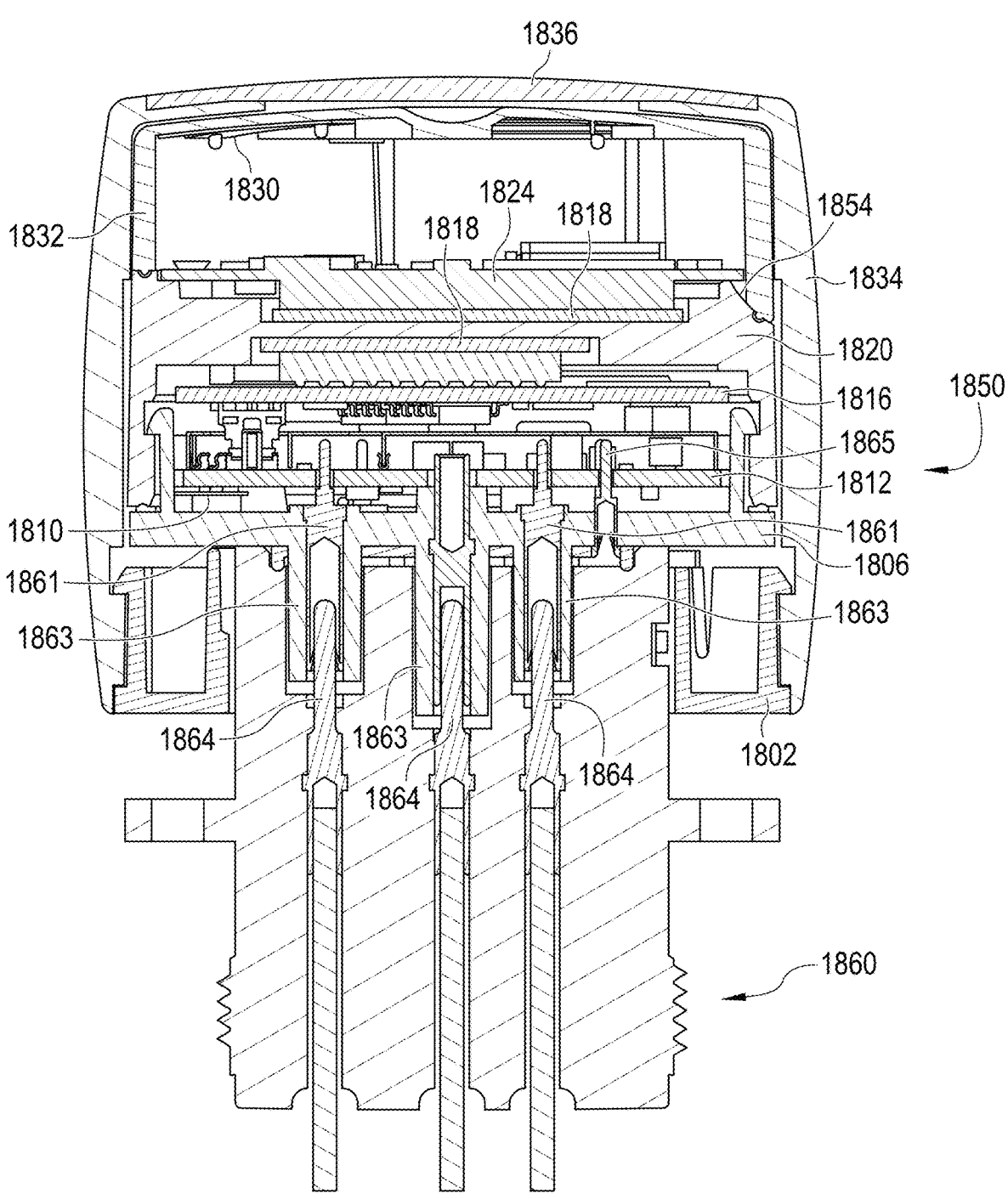
Fig. 18E3A

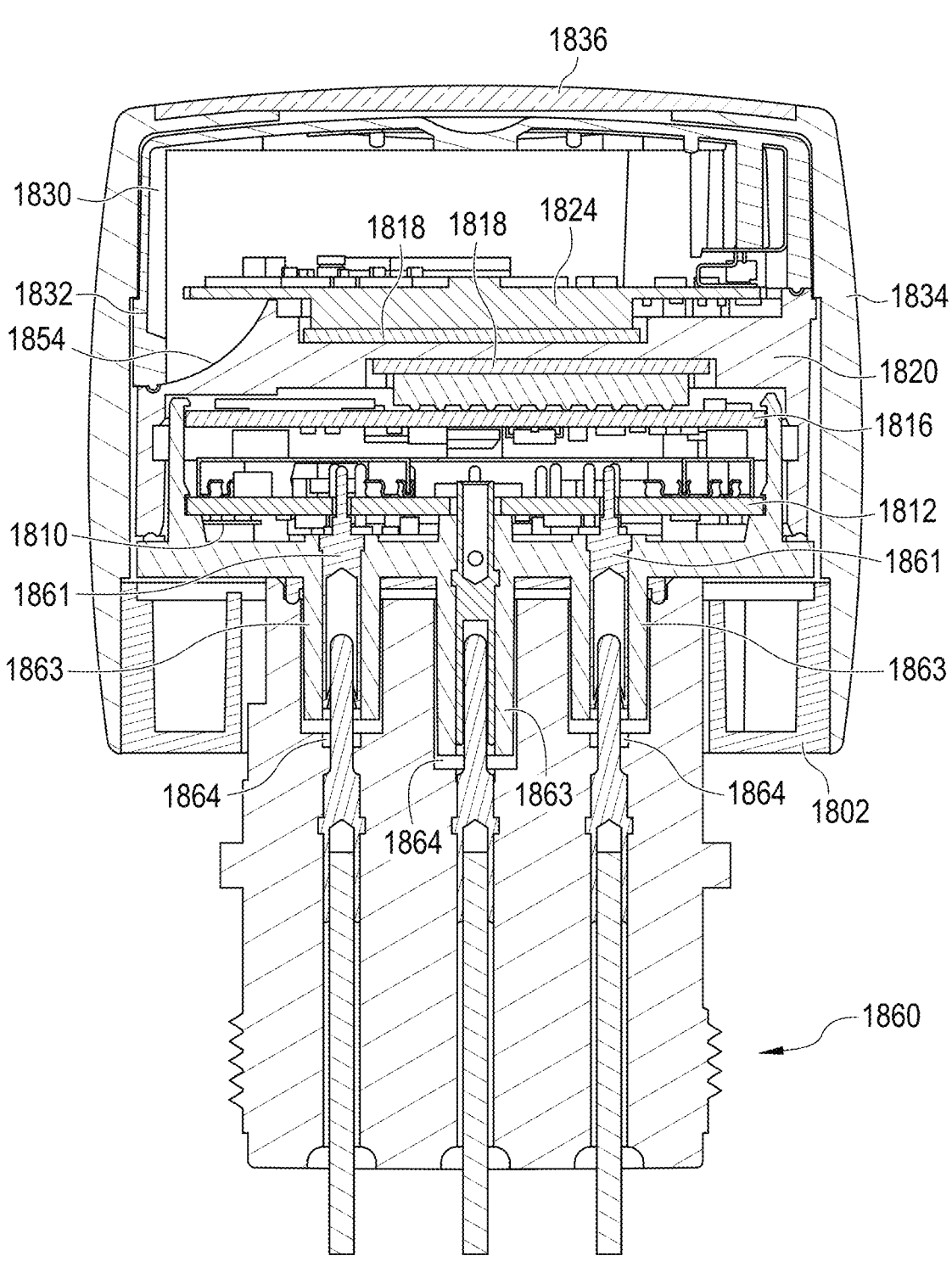
Fig. 18E3B

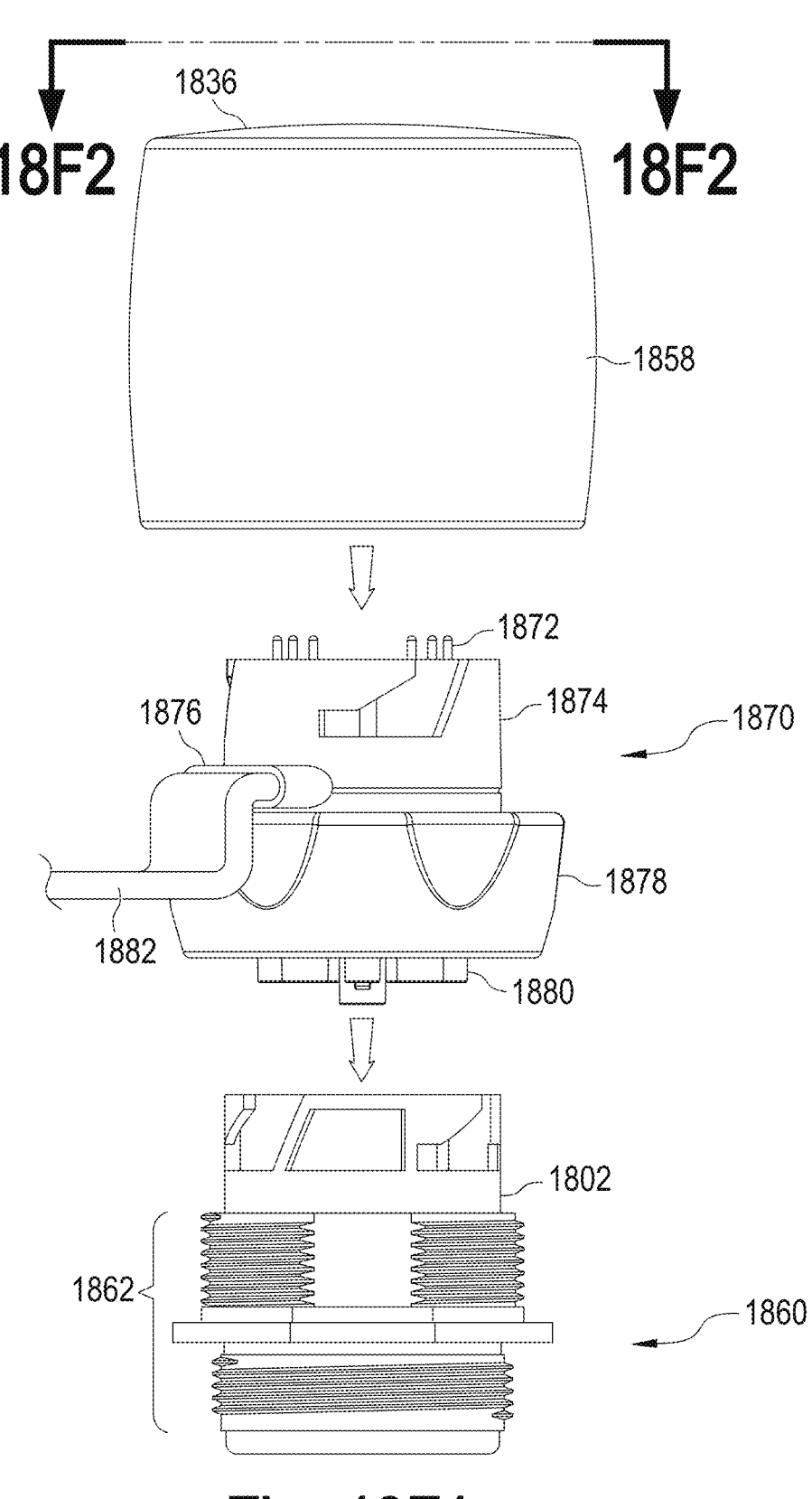
Fig. 18F1

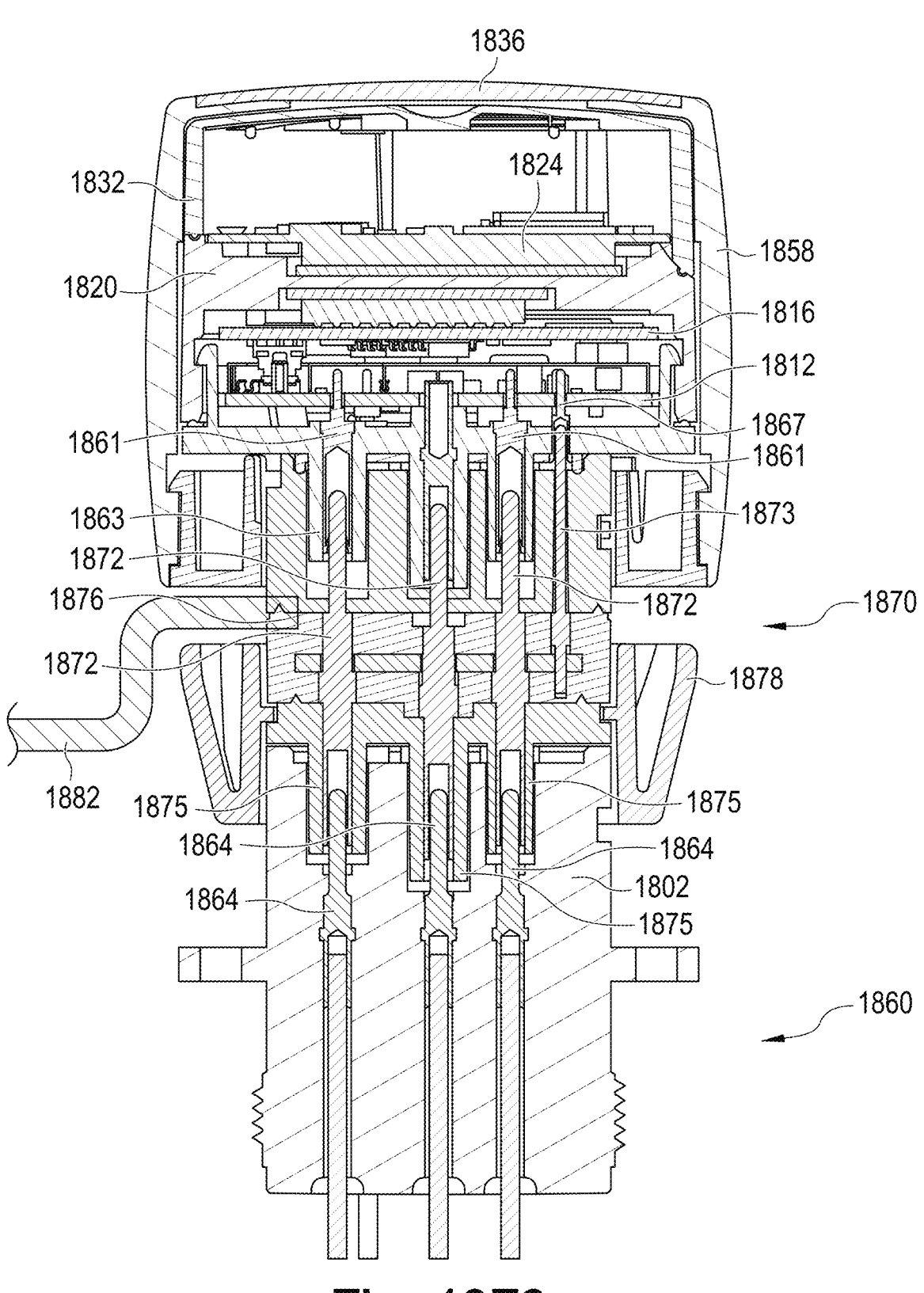
Fig. 18F2

1900

1908    1906

1912    1910

1902    1904

1914    1916

19C    19C 1950    1952

1954

1958    1960

1956

Air out    1962    1964    Air in

Figure 23:
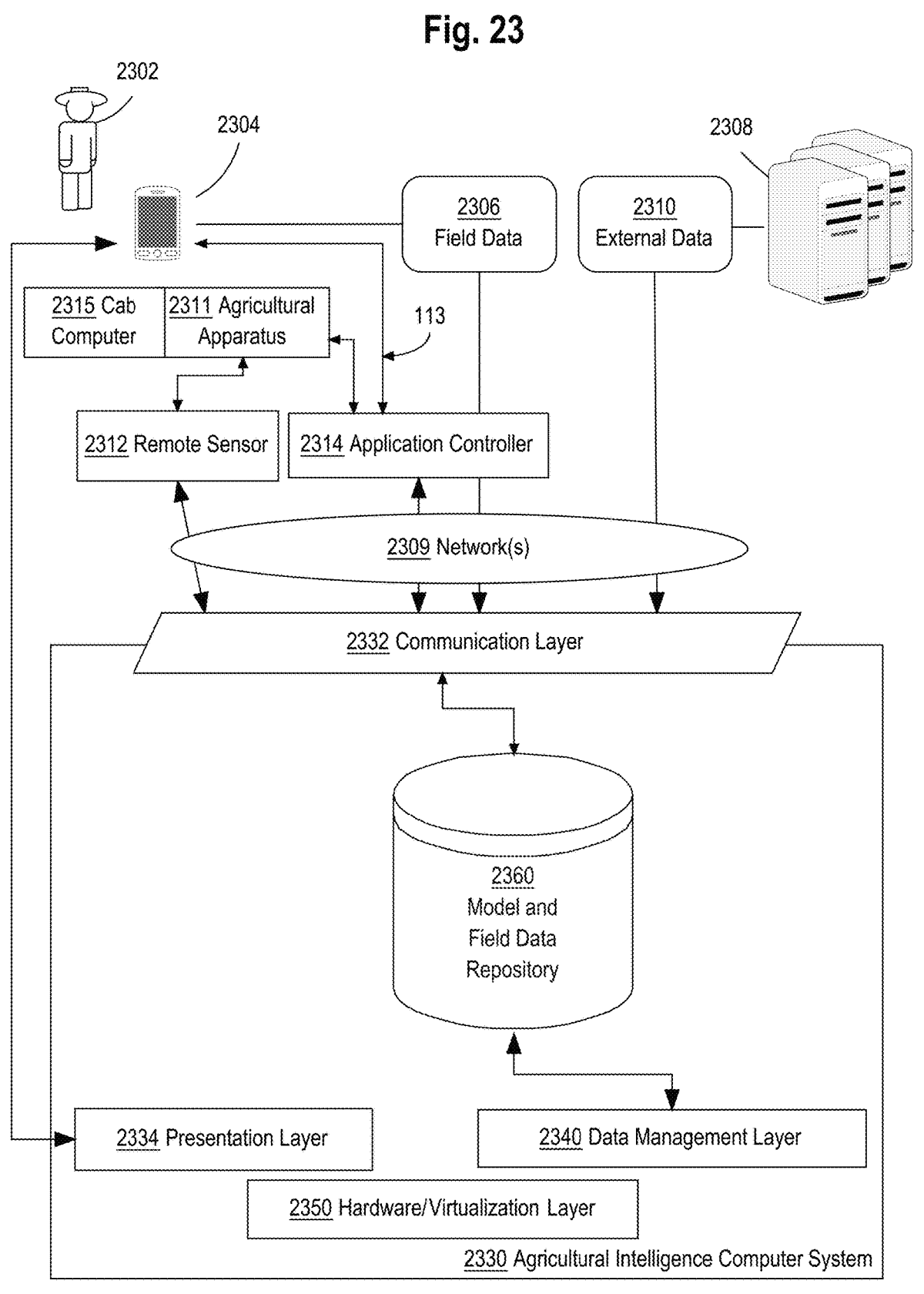

2306
Field Data

2310
External Data

2315 Cab
Computer

2311 Agricultural
Apparatus

113

2312 Remote Sensor

2314 Application Controller

2309 Network(s)

2332 Communication Layer

2360
Model and
Field Data
Repository

2334 Presentation Layer

2340 Data Management Layer

2350 Hardware/Virtualization Layer

2330 Agricultural Intelligence Computer System

Fig. 24

DATA STORAGE AND TRANSFER DEVICE FOR AN AGRICULTURAL INTELLIGENCE COMPUTING SYSTEM

CROSS-REFERENCE TO RELATED APPLICATIONS

This application is a continuation of U.S. patent application Ser. No. 18/213,788, filed Jun. 23, 2023, which is a continuation of U.S. patent application Ser. No. 17/380,630, filed Jul. 20, 2021, which is a divisional of U.S. patent application Ser. No. 16/808,149, filed Mar. 3, 2020, which claims the benefit of, and priority to, U.S. Provisional Patent Application No. 62/813,629, filed Mar. 4, 2019. The entire disclosure of each of the above applications is incorporated herein by reference.

COPYRIGHT NOTICE

FIELD OF THE DISCLOSURE

One technical field of the present disclosure is electronic data transfer. Another technical field of the disclosure is data storage devices for use with field agricultural equipment such as tractors, harvesters and other mobile equipment or implements. Another technical field is connectors for attaching electronic devices to mobile equipment, especially ruggedized connectors. Another technical field is wireless data communication devices for farm equipment.

BACKGROUND

Agriculture is known to include cultivation of plants to sustain and enhance human life. The cultivation of plants includes executing numerous steps of the agriculture lifecycle, such as, land management, irrigation, fertilization, planting, and harvesting. Effectiveness of the agriculture lifecycle may depend upon process control of the execution of the numerous steps and further depend upon numerous conditions, such as, available sunlight, water availability, temperature ranges, wind speeds, soil type, soil nutrients, and other factors.

Computing devices are known to gather data, store the data, process the data, and communicate the data. An example of a computing device may be an embedded farming equipment electronic, a smart phone, a tablet computer, a laptop computer, a personal computer, a storage server, and/or a data processing server. Basically, any device that includes a computing unit, one or more interfaces, and a memory system may be deemed a computing device.

As is further known, computing devices may be utilized to gather data associated with the agriculture lifecycle and to process the gathered data. Such processed data may be utilized to understand cause and effect relationships associated with the effectiveness of the agriculture lifecycle. An example is the device of U.S. Pat. No. 9,609,112.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The appended claims may serve as a summary of the disclosure.

BRIEF DESCRIPTION OF THE DRAWINGS

In the drawings:

FIG. 18E1 is a plan view of an apparatus that includes the core assembly of FIG. 18B enclosed in a housing, and a connector of a vehicle or an agricultural implement, showing a relationship between the core assembly and the connector.

FIG. 18E2 is a plan view of the apparatus of FIG. 18E1, showing the core assembly connected to the connector of the vehicle or the agricultural implement.

FIG. 18E3A is a section view of the apparatus of FIG. 18E2 taken along the line 18E3-18E3 of FIG. 18E2, showing the connector of the vehicle or agricultural implement in phantom.

FIG. 18E3B is another section view of the apparatus similar to FIG. 18E3A and rotated relative to FIG. 18E3A.

FIG. 18F1 is a perspective view of an apparatus that includes the core assembly of FIG. 18B enclosed in a housing, an adapter, and the connector of FIG. 18E1, showing relationships between the core assembly, the adapter, and the connector.

FIG. 18F2 is a section view of the apparatus of FIG. 18F1 in an assembled form, taken along the line 18F2-18F2 of FIG. 18F1, showing the connector of the vehicle or agricultural implement in phantom.

FIG. 23 illustrates an example computer system that is configured to perform the functions described herein, shown in a field environment with other apparatus with which the system may interoperate.

FIG. 24 is a block diagram that illustrates a computer system upon which an embodiment of the invention may be implemented.

DETAILED DESCRIPTION

Figure 1:
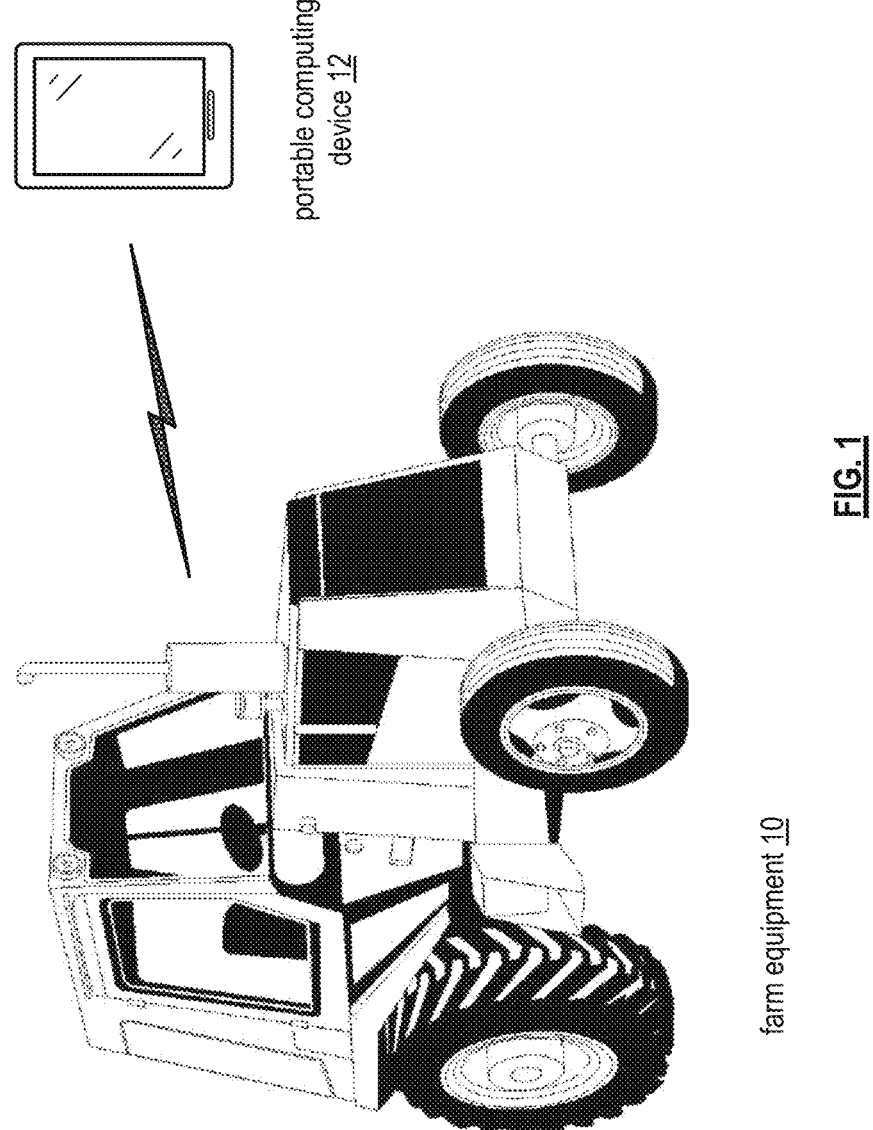
FIG. 1 is a diagram of an example of farm equipment wirelessly communicating with a portable computing device in accordance with the present invention.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are disclosed in sections according to the following outline:

1. GENERAL OVERVIEW
2. DATA STORAGE AND TRANSFER DEVICES
  2.1. EXAMPLE WIRELESS COMMUNICATIONS DEVICES
  2.2. EXAMPLE DUAL-BAND ANTENNA AND THERMALLY CONDUCTIVE HOUSING
  2.3. EXAMPLE GROUND CLIP STRUCTURE
  2.4. EXAMPLE ROLLER CONTACT STRUCTURE
3. ADDITIONAL DATA STORAGE AND TRANSFER DEVICES
  3.1. EXAMPLE WIRELESS COMMUNICATIONS DEVICES
  3.2. EXAMPLE COOLING MECHANISMS
  3.3. EXAMPLE CABLE ADAPTERS
  3.4. EXAMPLE ANTENNA STRUCTURE
4. EXAMPLE AGRICULTURAL INTELLIGENCE COMPUTER SYSTEM
  4.1. STRUCTURAL OVERVIEW
  4.2. APPLICATION PROGRAM OVERVIEW
  4.3. DATA INGEST TO THE COMPUTER SYSTEM
5. IMPLEMENTATION EXAMPLE-HARDWARE OVERVIEW
6. ADDITIONAL EXAMPLES
7. TERMINOLOGY AND OTHER ASPECTS OF DISCLOSURE

1. GENERAL OVERVIEW

Various embodiments of an apparatus for storing data and communicating data between an agricultural implement and a computing device are disclosed. In some embodiments, the apparatus includes a non-conductive housing, an antenna coupled to the non-conductive housing, a first integrated circuit coupled to the antenna, a thermally and electrically conductive housing coupled to the first integrated circuit, at least one ground clip coupled to the thermally and electrically conductive housing, at least one second integrated circuit coupled to the at least one ground clip, a memory coupled to the second integrated circuit and arranged to at least temporarily store digital communications between the agricultural implement and the computing device; and a connector communicatively coupled to the memory and arranged to mate with a connector of the vehicle or the agricultural implement. The thermally and electrically conductive housing is disposed between the first integrated circuit and the at least one second integrated circuit to electromagnetically isolate the first integrated circuit from the second integrated circuit.

In some embodiments, a disclosed apparatus includes a wireless drive unit; a thermally and electrically conductive housing for a wireless drive unit, affixed to a non-conductive cap that permits admission of radio-frequency radiation to an antenna within the cap; an antenna; a multi-band radio-frequency antenna apparatus; a ground clip; a rotatable housing for a wireless drive unit, comprising a plurality of spaced-apart roller contacts each in rolling contact with a corresponding plurality of circular circuit traces of a circuit board; a rotatable housing for a wireless drive unit, comprising a plurality of spaced-apart roller contacts each in rolling contact with a corresponding plurality of circular circuit traces of a circuit board, and a coiled, extensible cable coupling elements of the apparatus; all as shown and described in any one or more of the drawing figures and/or any one or more paragraphs of the description.

In some embodiments, a protective connector includes a core assembly structure, mating pins and a mating coupling structure. The core assembly structure has circuitry mounted therein. The mating coupling structure substantially encases the core assembly structure and mates with another connector such that the mating pins of the protective connector are electrically coupled to pins of the other connector. The mating coupling structure is mechanically free-moving with respect to the core assembly structure such that forces applied to the mating coupling structure to mate the protective connector to the other connector are not applied to the circuitry within the core assembly structure.

2. DATA STORAGE AND TRANSFER DEVICES

2.1. Example Wireless Communications Devices

FIG. 1 is a diagram of an example of farm equipment 10 wirelessly communicating with a portable computing device 12. The farm equipment 10 may be a tractor, a seed planter, a fertilizer dispenser, a soil tiller, a harvesting machine, and/or any other type of motorized equipment that facilitates the planting, growing, tending, and/or harvesting of an agriculture crop. The portable computing device 12 may be a cellular telephone, a computer tablet, a laptop computer, a computer, and/or any device that includes a processing module, memory, a wireless transceiver, and a user interface.

In an example of operation, the farm equipment 10 is equipped with a wireless drive unit 14 (not shown and is discussed in one or more subsequent figures) that enables the farm equipment 10 to wirelessly communicate with the portable computing device 12. When in wireless communication, the farm equipment 10 can share data with the portable computing device 12 regarding various aspects of farming. For example, the farm equipment captures data (e.g., location information, speed information, terrain information, planting information, fertilizing information, harvesting information, etc.) and provides it to the portable computing device. The portable computing device analyzes the data locally and/or sends the collected data to a processing server (not shown) for analysis.

As another example, the portable computing device 12 sends the farm equipment 10 an agricultural prescription, which is a recommendation regarding one or more agricultural functions (e.g., planting, growing, tending, and/or harvesting). For instance, the agricultural prescription may be a plan for planting a certain crop (e.g., when to plant, what to plant, how to plant, plant spacing, etc.). In another instance, the agricultural prescription may be a plan for tending to a crop (e.g., when to water and how much; what fertilizer to use, when to use, and how much to use; what nutrients to add to the soil, when to use, and how much to use; when to weed; etc.). These are two of a plurality of agricultural prescriptions that can be generated from collected data and other sources of data (e.g., weather, technical reports, etc.).

Figure 2:
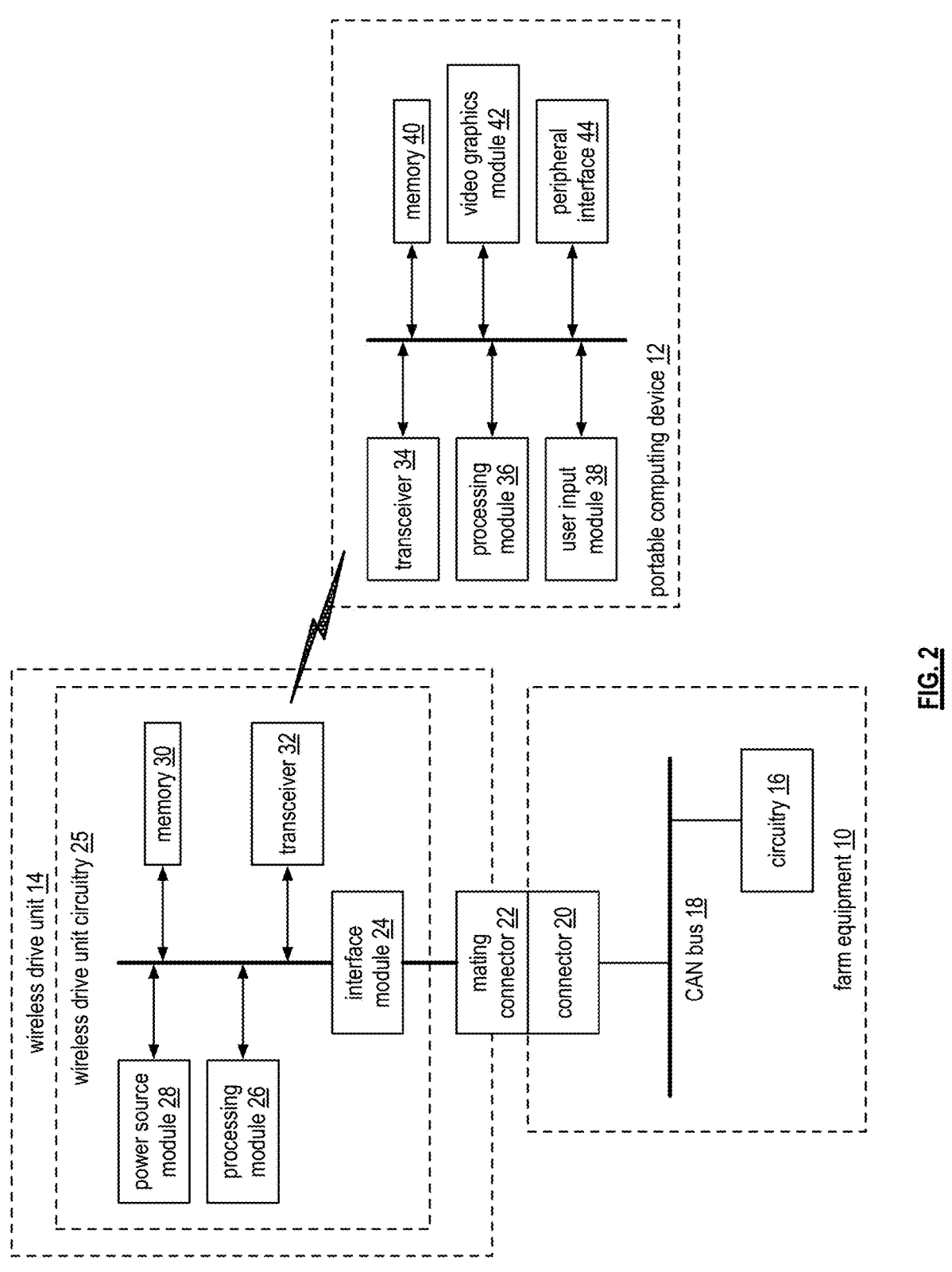
FIG. 2 is a schematic block diagram of an embodiment of farm equipment wirelessly communicating with a portable computing device in accordance with the present invention.

FIG. 2 is a schematic block diagram of an embodiment of farm equipment 10 wirelessly communicating with a portable computing device 12. The farm equipment 10 is shown to include a CAN (controller area network) bus 18 (and/or other type of bus structure), circuitry 16, and a connector 20. The circuitry 16 may include one or more of GPS receiver, sensors, on-board computer, engine control unit, regulators, diagnostic modules, etc. The connector 20 may be a female connector such as a 9-pin DEUTSCH connector.

The portable computing device 12 includes a processing module 36, memory 40, a transceiver 34, a video graphics module 42, a user input module 38, and a peripheral interface 44. The transceiver 34 may be a Bluetooth transceiver, a ZigBee transceiver, a WLAN transceiver, a cellular communications transceiver, and/or any other type of wireless communications transceiver. The user input module 38 may be a keypad, a touch screen, a microphone, and/or any other mechanism for a user to input data, commands, etc., into the portable computing device. The memory includes one or more of read only memory, random access memory, one or more hard drives, solid state memory, and/or cloud storage. The video graphics module 42 is a processing module dedicated for video graphics processing on a video display (not shown). The peripheral interface 44 couples to one or more peripheral devices (e.g., hard drive, USB interface, network interface, flash drive interface, cloud storage interface, etc.).

A wireless drive unit 14 is connected to the connector of the farm equipment 10 and provides the wireless connectivity to the portable computing device 12. The wireless drive unit 14 includes circuitry 25 that, in itself, includes a mating connector 22, an interface module 24, a processing module 26, a transceiver 32, memory 30, and a power source module 28. The transceiver 32 is a corresponding transceiver to the transceiver within the portable computing device. As such, the transceiver may be a Bluetooth transceiver, a ZigBee transceiver, a WLAN transceiver, a cellular communications transceiver, and/or any other type of wireless communications transceiver. The power source module 28 may be a battery, a DC-to-DC converter, and/or any other circuit that provides a DC supply voltage to the components of the wireless drive unit. The interface module 24 may be a driver operating on the processing module to provide the desired signaling protocol with the CAN bus of the farm equipment.

Figures 3A, 3B, 3C, 3D:
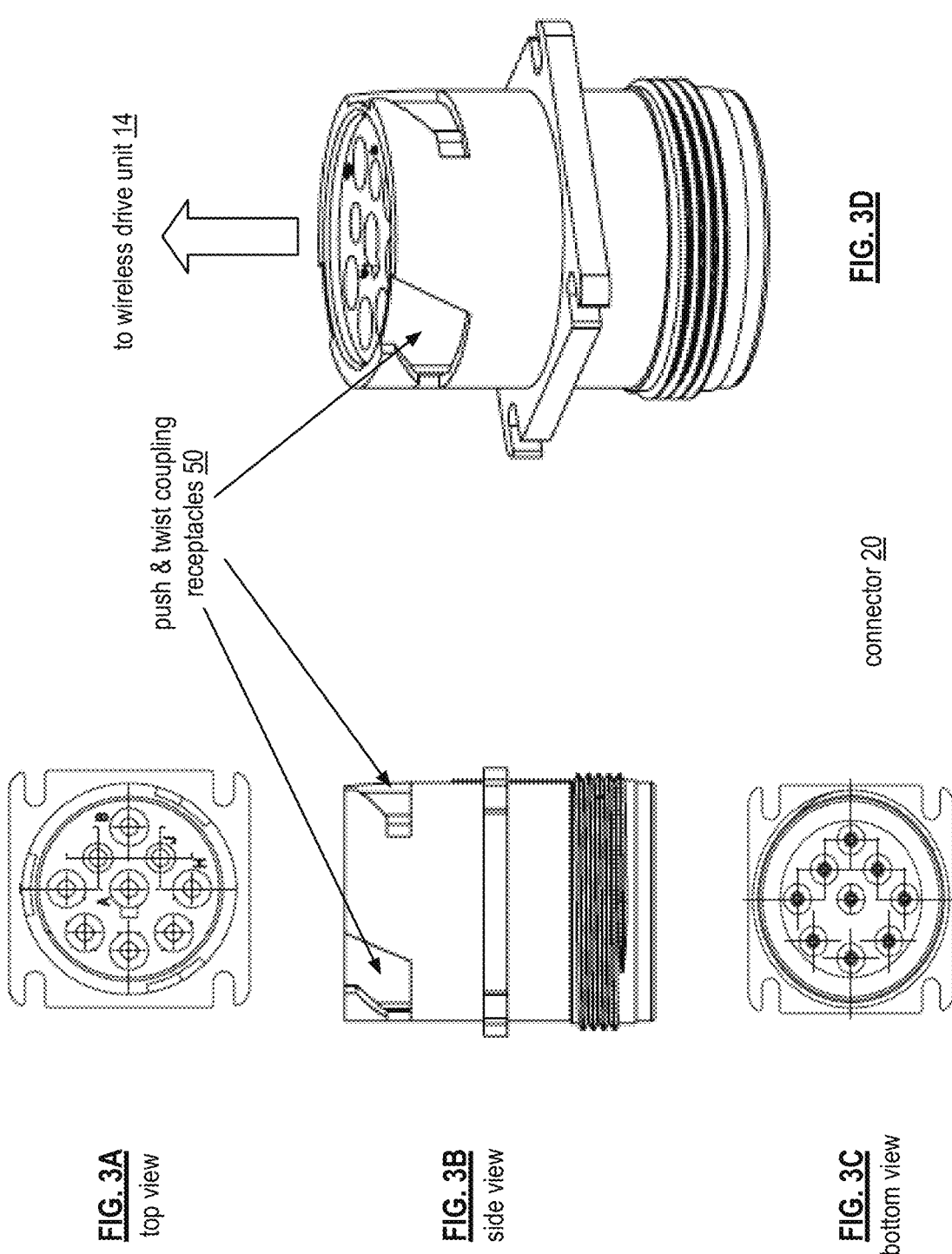
FIG. 3A, FIG. 3B, FIG. 3C, and FIG. 3D are diagrams of an embodiment of a connector used in farm equipment.

FIG. 3A, 3B, 3C, 3D are diagrams of an embodiment of a connector 20 used in farm equipment 10. The connector may be a 9-pin female DEUTSCH connector having, as shown in the top view of FIG. 3A, nine female pin receptacles. The threaded bottom portion of the connector, as shown in FIG. 3B and FIG. 3D, is for mechanically coupling to a threaded receptacle in the farming equipment 10. The connector further includes a series of push and twist coupling receptacles 50, as shown in FIG. 3B and FIG. 3D, for coupling to the mating connector 22 of the wireless drive unit 14.

Figure 4:
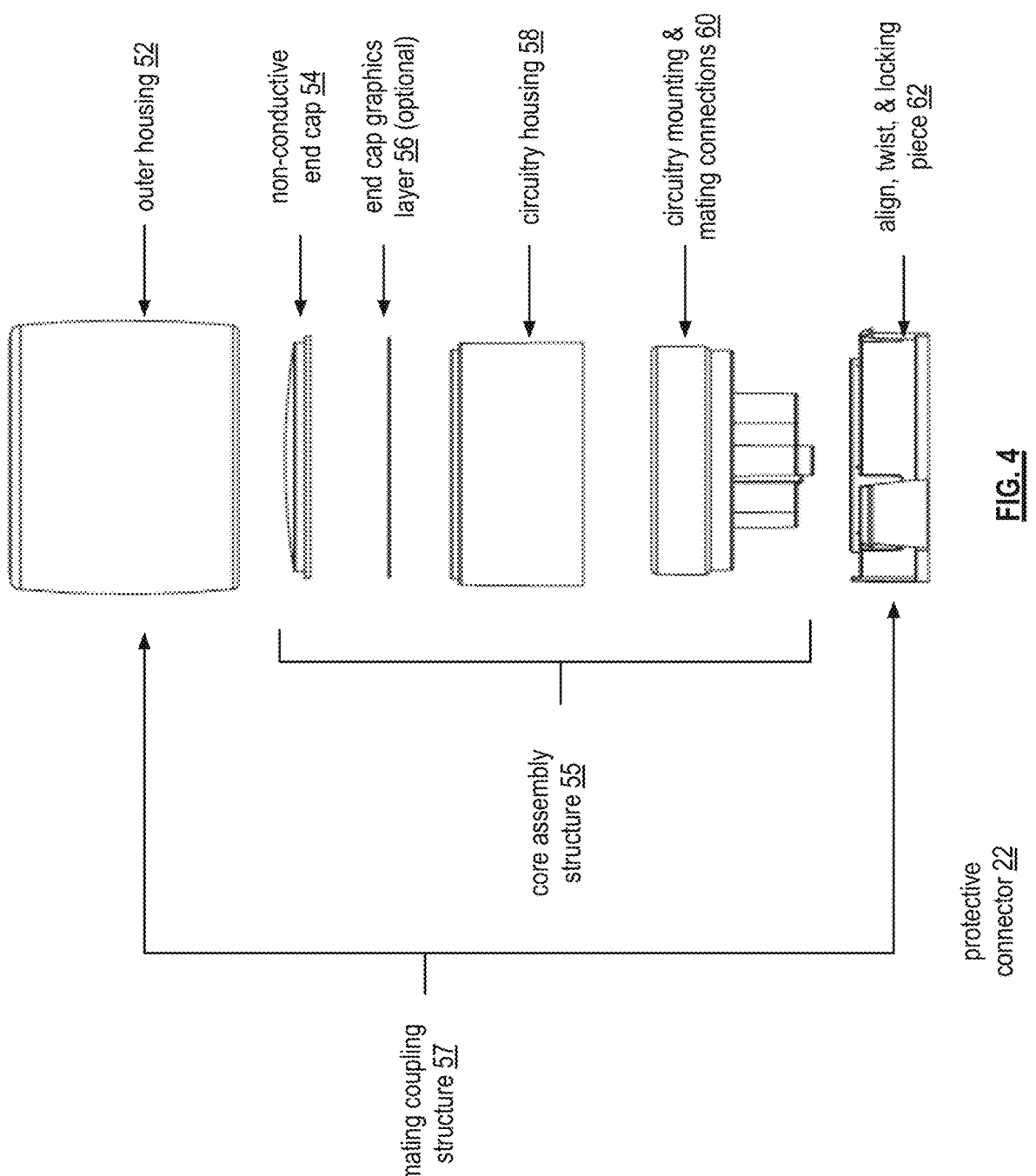
FIG. 4 is an exploded diagram of an embodiment of the mating connector of the wireless drive unit in accordance with the present invention.

FIG. 4 is an exploded diagram of an embodiment of the mating protective connector 22 of the wireless drive unit 14. The mating connector 22 includes a core assembly structure 55, mating pins, and a mating coupling structure 57. The circuitry 25 is mounted within the core assembly structure. The mating coupling structure substantially encases the core assembly structure and mates with a connector of the farm equipment such that the mating pins of the protective connector are electrically coupled to pins of the connector of the farm equipment. In addition, the mating coupling structure is mechanically free-moving with respect to the core assembly structure such that forces applied to the mating coupling structure to mate the protective connector to the connector of the farm equipment are not applied to the circuitry within the core assembly structure.

The mating coupling structure 57 includes an outer housing 52 and an align, twist, and locking piece 62. The core assembly structure 55 includes a non-conductive end cap 54, an optional end cap graphics layer 56, a circuitry housing 58, and a circuitry mounting and mating connections section 60. The outer housing 52 has a tubular shape, fits over the circuitry housing 58 and the circuitry mounting and mating connections section 60, and mechanically couples to the align, twist, and locking piece 62. The outer housing 52 and the align, twist, and locking piece 62 may each be constructed using one or more materials, such as aluminum, stainless steel, plastic, carbon fiber, etc.

Figure 5:
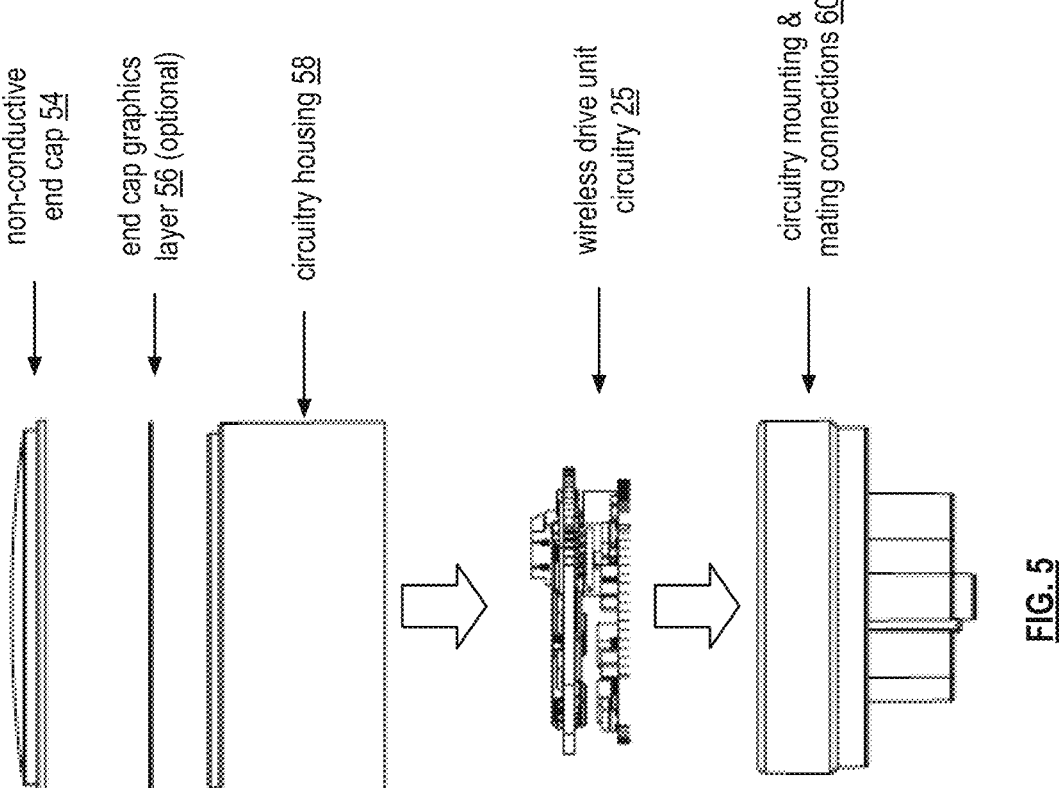
FIG. 5 is an exploded diagram of an example of mounting circuitry of the wireless drive unit in a housing a connector of the wireless drive unit in accordance with the present invention.

The combination of the non-conductive end cap 54, the optional end cap graphics layer 56, the circuitry housing 58, and the circuitry mounting and mating connections section 60 encase the circuitry of the wireless drive unit 14. For example, as shown in FIG. 5, the wireless drive unit circuitry 25 (e.g., the electrical components of the wireless drive unit as shown in FIG. 2) is mounted on one or more printed circuit boards that are securely fastened within the circuitry mounting and mating connections section 60. In addition, the circuitry mounting and mating connections section 60 establishes electrical connections between the pins of the mating connector and the wireless drive unit circuitry.

Figure 6:
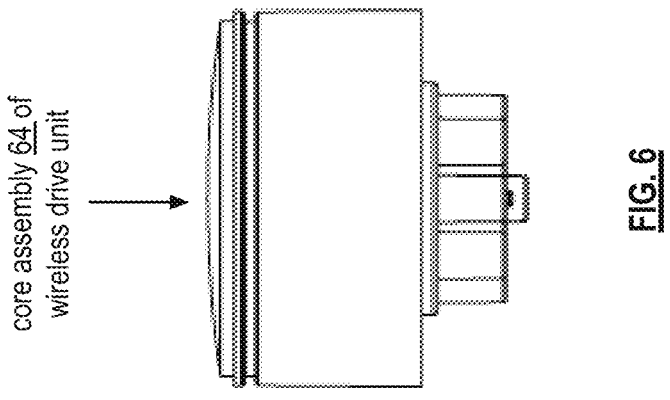
FIG. 6 is a diagram of an example of an assembled wireless drive unit in accordance with the present invention.

Once the wireless drive unit circuitry is securely mounted within the circuitry mounting and mating connections section 60, the circuitry housing 58, non-conductive end cap 54, and the optional end cap graphics layer 56 are coupled to the circuitry mounting and mating connections section 60. This core assembly 64 of the wireless drive unit provides a secure and non-pressure bearing container for the wireless drive unit circuitry. An example of the core assembly of the wireless drive unit is shown in FIG. 6.

The circuitry housing 58 has a tubular shape and may be constructed of one or more materials, such as aluminum, stainless steel, plastic, carbon fiber, etc. To enable the wireless drive unit 14 to wirelessly communicate, the non-conductive end cap 54 is made of a non-conductive material, such as plastic. For example, the non-conductive end cap 54 is comprised of a clear polycarbonate plastic and the graphics layer 56 includes a desired decal (e.g., company logo, a black finish, etc.).

Figures 7, 8:
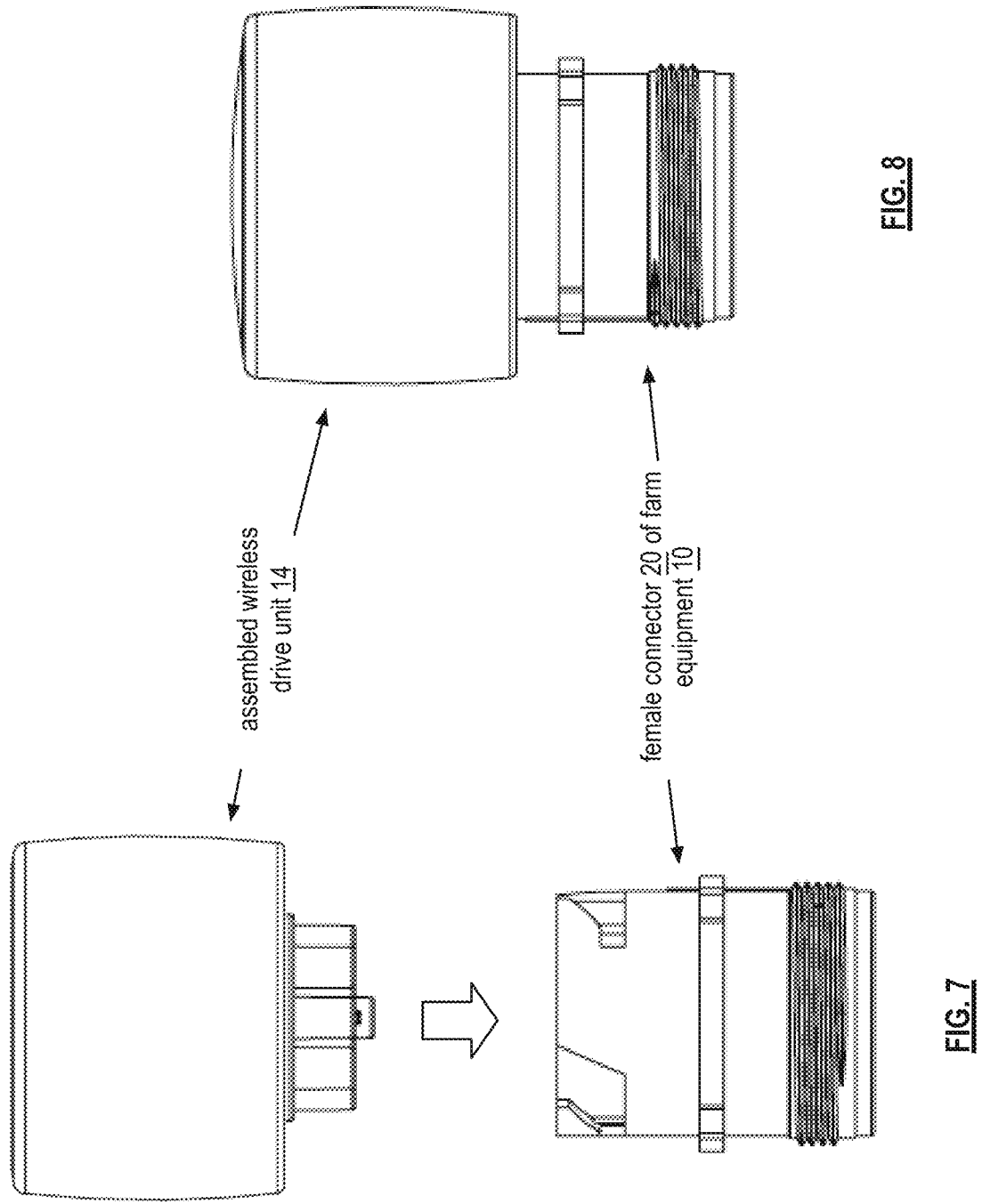
FIG. 7 is a diagram of an example of mating the assembled wireless drive unit to the connector of the farm equipment in accordance with the present invention.
FIG. 8 is a diagram of an example of the assembled wireless drive unit coupled to the connector of the farm equipment in accordance with the present invention.

The outer housing 52 fits over the core assembly 64 of the wireless drive unit 14 and couples to the align, twist, and locking piece 62 to secure the core assembly 64 of the wireless drive unit within the outer housing 52. The outer housing 52 and align, twist, and locking piece 62 freely rotate (at least ten degrees or more) around to the core assembly of the wireless drive unit to allow for a push and twist coupling with the female connector of the farm equipment. An example prior to coupling is shown in FIG. 7 and an example of being coupled is shown in FIG. 8.

With this connector structure for the wireless drive unit 14, when the mating pins are pushed into contact with the receptacles of the female connector of the farm equipment 10, very little, if any, force is applied to the circuitry. Further, when the outer housing 52 is rotated to lock the align, twist, and locking piece into the push and twist receptacles of the female connector, very little to no force is applied on the core assembly 64 of the wireless drive unit. This protects the circuitry and integrity of the connections between the connectors and adds to the longevity and durability of the wireless drive unit.

Figure 9:
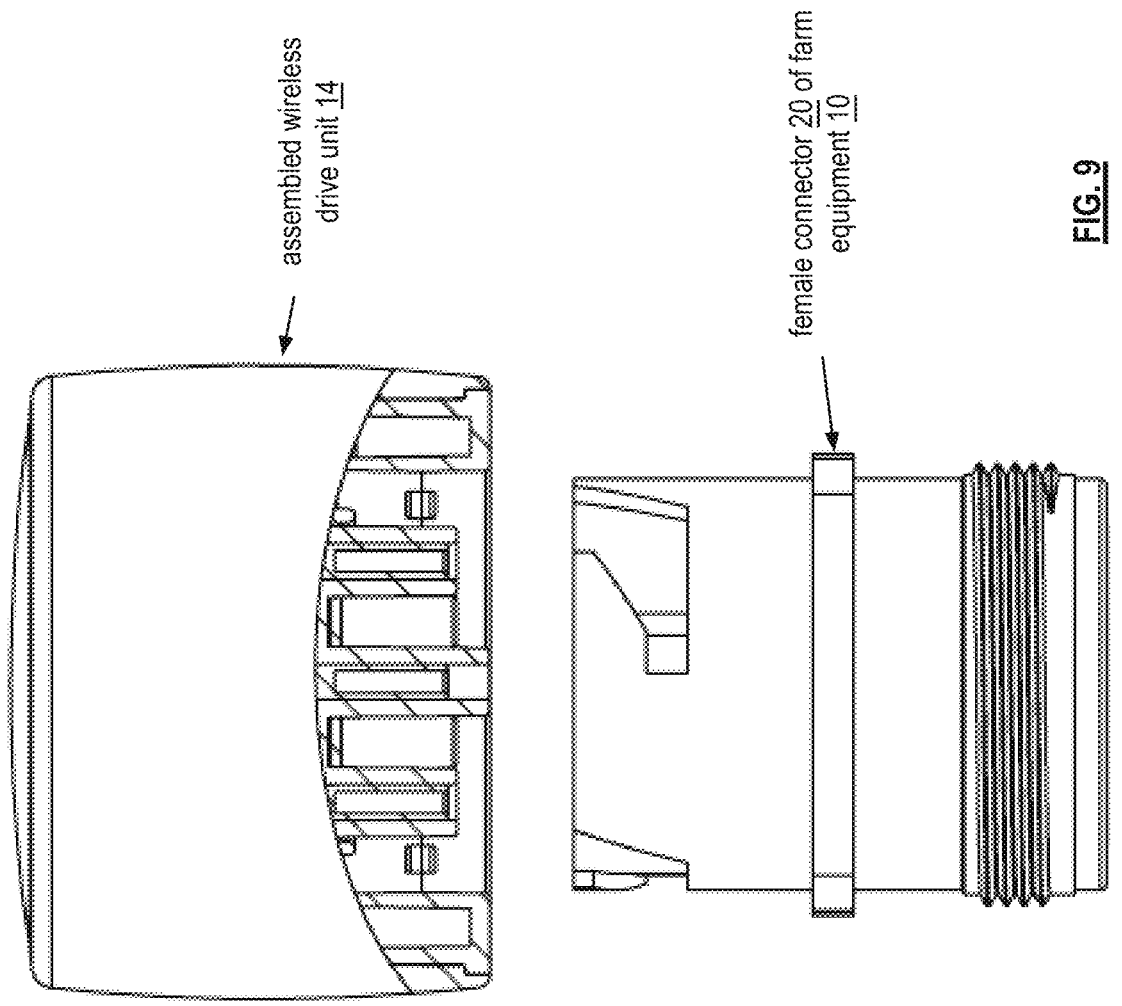
FIG. 9 is a cut-away view diagram of an example of the assembled wireless drive unit coupled to the connector of the farm equipment in accordance with the present invention.

FIG. 9 is a cut-away view diagram of an example of the assembled wireless drive unit 14 coupled to the connector 20 of the farm equipment 10. In this example, the outer housing 52 is partially cut away to illustrate the mating connector 22 of the core assembly and to illustrate a portion of the align, twist, and lock piece.

2.2. Example Dual-Band Antenna and Thermally Conductive Housing

Figure 10B:
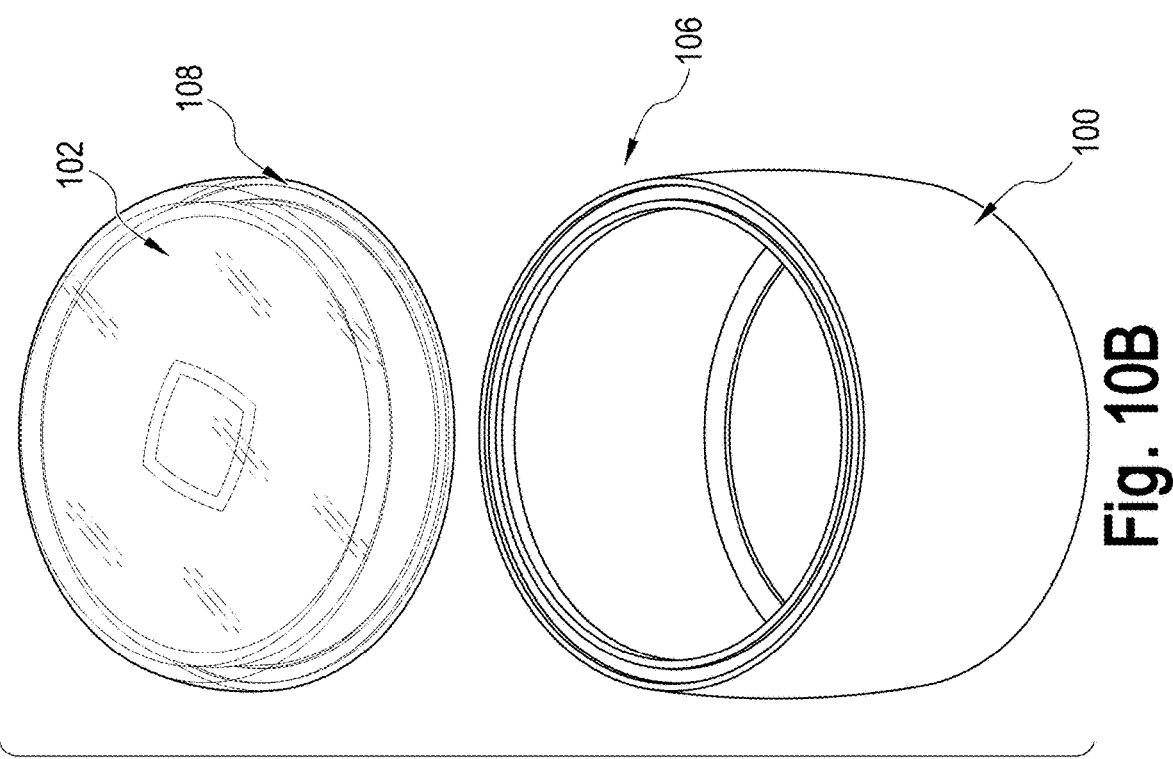
FIG. 10B illustrates the housing of FIG. 10A in an unassembled configuration.
Figure 10A:
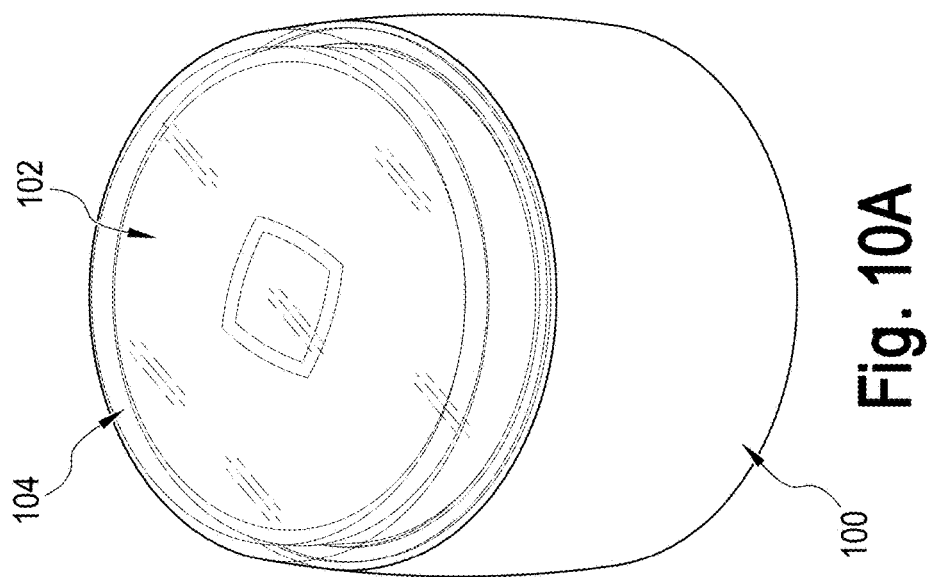
FIG. 10A illustrates an example housing that may be used in association with any of the connectors that have been described herein.
Figure 10C:
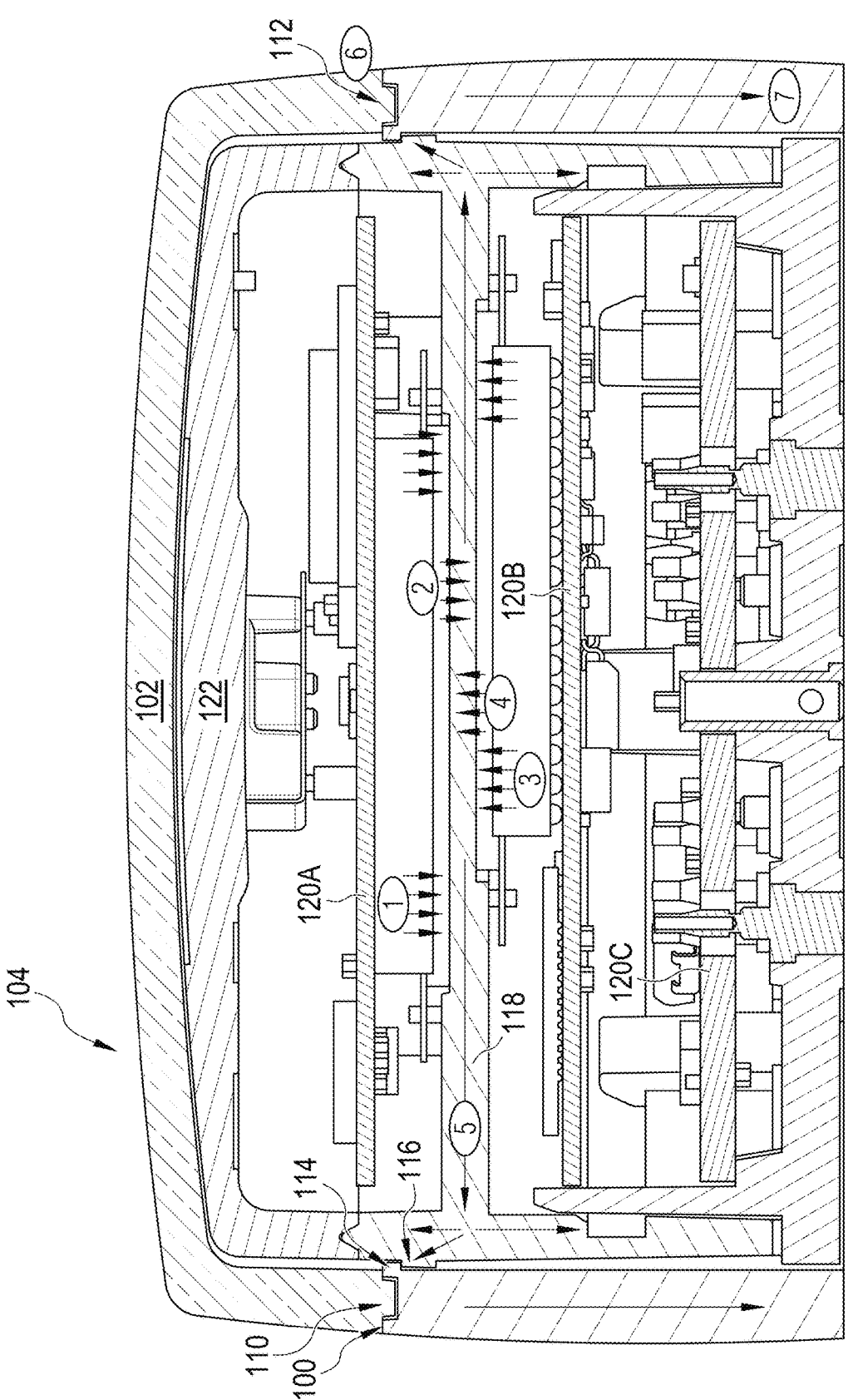
FIG. 10C is a section view of a housing and cap installed on a connector and showing parts of elements within the connector.

FIG. 10A illustrates an example housing that may be used in association with any of the wireless drive units that have been described herein. In an embodiment, a housing 100 is coupled to a cap 102. Cap 102 has a skirt that mates with housing 100. In combination, the housing 100 and cap 102 provide a rigid and protective outer covering for the wireless drive unit. FIG. 10B illustrates the housing of FIG. 10A in an unassembled configuration. FIG. 10C is a section view of housing 100 and cap 102 installed on a wireless drive unit and showing parts of elements within the wireless drive unit.

Referring first to FIG. 10A, in an embodiment, housing 100 is fabricated of plastic. In some embodiments, housing 100 is ultrasonically welded to cap 102. Housing 100 also could be conductive metal such as steel, copper or brass and cap 102 could be polystyrene, ABS plastic or other polymers and affixed to the housing using solvent-based cement or glue. Housing 100 comprises a generally hollow cylindrical or tubular element and cap 102 comprises a hollow cylinder terminating in a generally circular top face 104. Housing 100 may comprise an annular upwardly-facing circular perimeter that is formed with an annular recess 110 to engage a corresponding upstanding annular tenon 112 of an annular lower, downwardly-facing perimeter 108 of the cap 102. These surfaces permit affixation by a suitable fastener such as gluing; for example, the use of smoothly polished surfaces may facilitate affixing using cyanoacrylate adhesive, epoxy or other glues. In other embodiments, other types of fasteners may be used, including mechanical fasteners such as screws.

Furthermore, in an embodiment, housing 100 comprises an inwardly facing annular recess 114 that mates to a corresponding outwardly facing annular tenon 116 formed on a perimeter surface of an inner chassis 118. In an embodiment, chassis 118 is formed of conductive metal, serving as ground plane and/or heat sink for active electronic circuit elements that are affixed thereon using circuit boards 120A, 120B, 120C. Consequently, snug contact of the chassis 118 to the housing 100, facilitated by recess 114 and tenon 116, facilitates thermal transfer from active electronics to the ambient atmosphere in a space-efficient manner. In an embodiment, thermal transfer may follow at least the paths indicated by arrows 1, 2, 3, 4, 5 of FIG. 10C, such that heat is ultimately conducted to housing 100 and can dissipate to atmosphere outside the wireless drive unit. An inner antenna cover 122 may also be affixed to the chassis 118. The combination of these parts has been verified as a superior thermal solution and antenna protection solution due in part to the higher thermal conductivity of metal.

The foregoing structure may be used to protect a dual- or multi-band antenna that is used for wireless communication of the wireless drive unit to other computers while the wireless drive unit is operating in a field or other environment. Embodiments may be used for dual-band antennas to receive RF signals for agricultural use at frequencies in the 900 MHz range, cellular radiotelephone ranges, Wi-Fi range and for Bluetooth signals. Past attempts to achieve similar solutions have been limited by the required length or size of the antenna and achieving a multi-band antenna in a compact form factor, such as a unit only a few centimeters in diameter, have not succeeded.

Figure 10E:
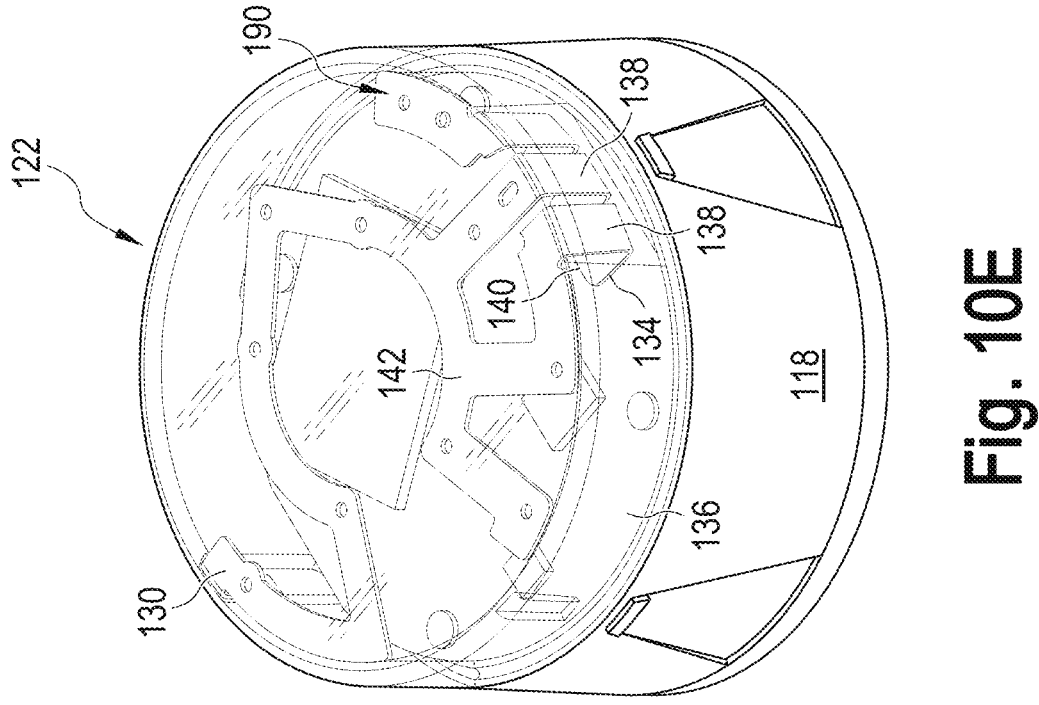
FIG. 10E illustrates the same structure as FIG. 10D in a different orientation that is rotated with respect to FIG. 10D.
Figure 10D:
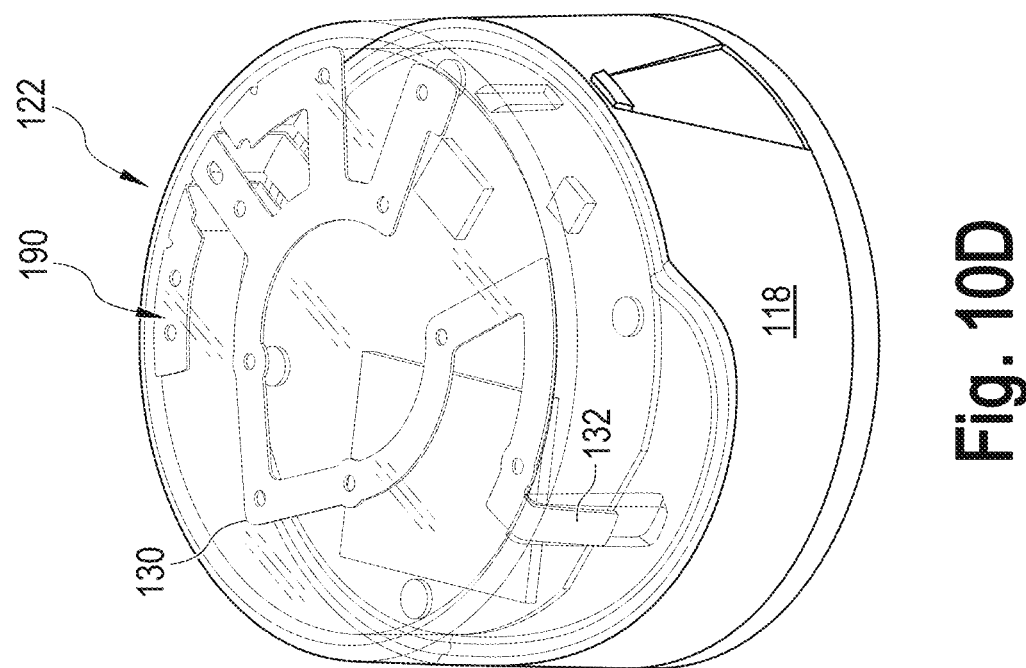
FIG. 10D illustrates the housing of FIG. 10A, FIG. 10B, and FIG. 10C in a transparent manner to further illustrate the structure of an example multi-band antenna.
Figure 10F:
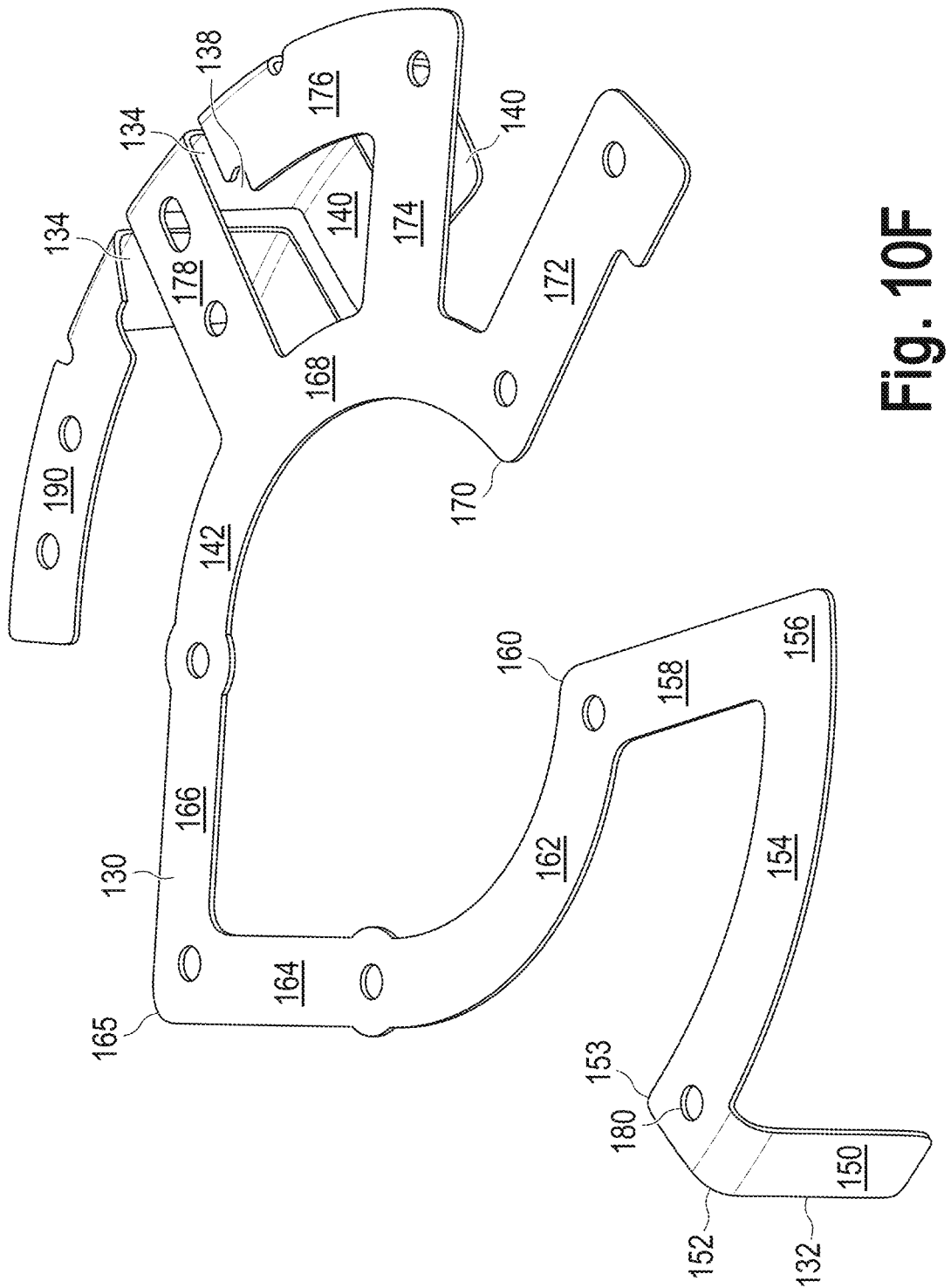
FIG. 10F illustrates an example multi-band antenna that may be used with a connector of FIG. 10A, FIG. 10B, FIG. 10C, FIG. 10D, and FIG. 10E.
Figure 10G:
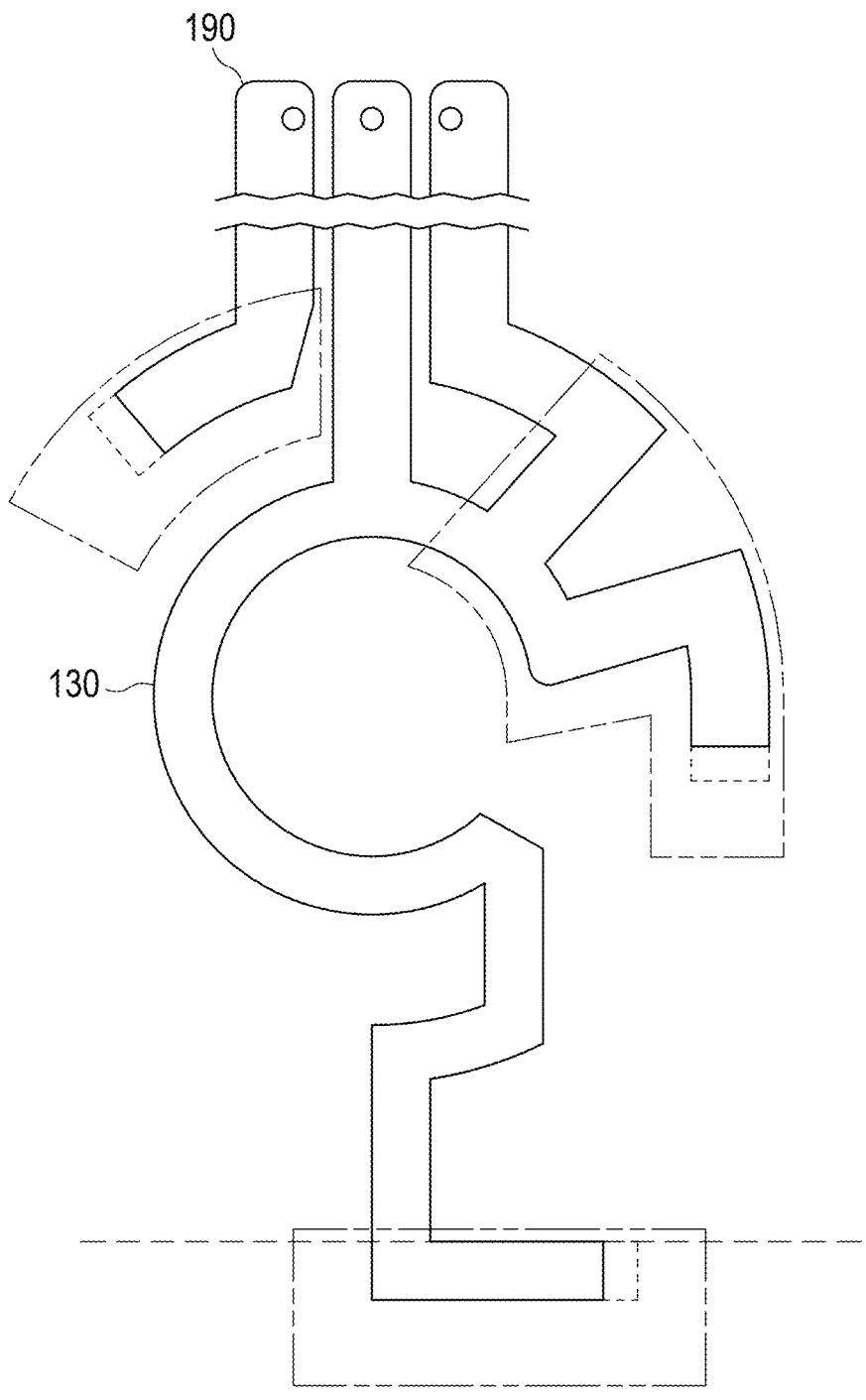
FIG. 10G is a top plan (flat) view of the antenna of FIG. 10F.
Figure 10H:
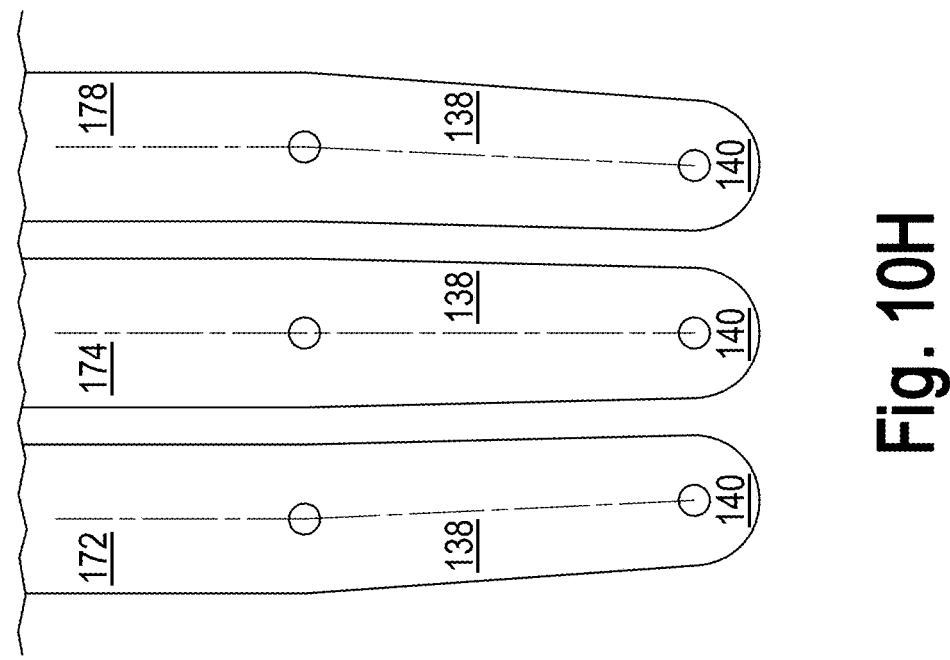
FIG. 10H is a partial top plan view of the antenna of FIG. 10F to illustrate details of certain elements.

FIG. 10D illustrates the housing of FIG. 10A, 10B, 10C in a transparent manner to further illustrate the structure of an example multi-band antenna. FIG. 10E illustrates the same structure as FIG. 10D in a different orientation that is rotated with respect to FIG. 10D. FIG. 10F illustrates an example multi-band antenna that may be used with a wireless drive unit of FIG. 10A, 10B, 10C, 10D, 10E. FIG. 10G is a top plan (flat) view of the antenna of FIG. 10F. FIG. 10H is a partial top plan view of the antenna of FIG. 10F to illustrate details of certain elements.

Referring first to FIG. 10D, FIG. 10E, in an embodiment, the inner antenna cover 122 may cover a multi-band, multi-segment antenna 130 having a distal end 132 that is not electrically connected and a plurality of proximal ends 134 that are electrically coupled to active radio-frequency circuitry of a circuit board 136 on the chassis 118. Each of the proximal ends 134 comprises an upstanding arm 138 that vertically separates a foot 140 of the proximal ends from the circuit board and causes a plurality of generally planar aligned upper elements 142 of the antenna 130 to fit just under an inside top surface of the inner antenna cover 122.

Referring now to FIG. 10F, in an embodiment, antenna 130 may be formed as a single or unitary element of conductive metal, such as stainless steel, beryllium copper, phosphor bronze, brass, copper, or other ferrous metal or alloy. In some embodiments, antenna 130 is die cut or stamped from larger sheet material and subjected to folding, drilling and/or milling operations to achieve the final shape shown in FIG. 10F. For example, 2 millimeter (mm) sheet copper may be used and die cut, milled, laser cut or CNC cut. In other embodiments, antenna 130 is manufactured using LDS (Laser Direct Structuring). Various embodiments may use different dimensioning and FIG. 10F should be regarded as not to scale and not imposing any particular thickness or other dimensioning.

Antenna 130 may comprise a plurality of spaced-apart mounting holes 180 that engage corresponding downwardly extending pins on an inside top face of the inner antenna cover 122 to affix, via thermal bonding (heat staking) or friction fit, the antenna against the inside top face in the arrangement shown in FIG. 10D, FIG. 10E. Other embodiments may use ultrasonic welding, glue, or snaps to affix the parts. The use of attachment points and positive affixing via thermal bonding retains the geometry of the antenna and inhibits movement, warping or other changes in shape or position that could affect resonance of the antenna.

In an embodiment, distal end 132 of antenna 130 comprises a generally rectangular arm 150 that ends in a right-angle bend 152 to join the arm 150 integrally with a first arcuate arm 154 at a right angle corner 153. In some embodiments, distal end 132, when installed in a wireless drive unit or housing, is positioned adjacent to but not conducting a heat sink element of the wireless drive unit. The first arcuate arm 154 has an opposite end 156 formed integrally at an approximate right angle to a lateral arm 158, which in turn is formed integrally at a second angled corner 160 to a second arcuate arm 162. Arms 154, 162 may have the same radius or arc or arm 154 may have a larger radius.

Second arcuate arm 162 is integrally formed, at an end opposite corner 160, to a second lateral arm 164 which joins a third lateral arm 166 at right-angle corner 165. Third lateral arm 166 transitions at an end 142, which is opposite the corner 165, to a third arcuate arm 168 from which terminal lateral arms 172, 174, 178 extend generally perpendicularly therefrom at points spaced apart on a perimeter of the third arcuate arm. A first terminal lateral arm 172 comprises a generally rectangular element terminating in a non-connected end. A second terminal lateral arm 174 is formed integrally with an inwardly turned arcuate arm 176 which further comprises one of the vertical elements 138 previously discussed and terminates in a horizontally extending foot 140 that may be conductively affixed to the circuit board 136. Similarly, a third terminal lateral arm 178 is formed integrally via a bend with a vertical element 138 that is formed integrally via another bend to a horizontal foot 140 that may be conductively affixed to the circuit board.

In some embodiments, a second antenna 190 may be provided that is not mechanically or electrically coupled to antenna 130 but has a separate structure and separate electrical connection to chassis 118 or a circuit board thereon. Second antenna 190 may be tuned for a second frequency band as compared to the structure of antenna 130 which has been found to provide good performance with a first frequency band that is different from the second frequency band.

In some embodiments, each element having a free end or an end coupled to a circuit board is formed having a radius at its ends rather than a squared-off or cutoff end. In one embodiment, ends terminate in 1 mm radius curved ends. Example elements with radiused ends include 150, 172, 190, and feet 140. Corners 153, 156, 165, 170 also may have radiused proximal and distal elements rather than having sharp, 90 degree angles or corners.

Referring now to FIG. 10G, a top plan view of an embodiment of the antennas of FIG. 10F is shown. FIG. 10G depicts example antennas 130, 190 in flat configuration prior to folding operations to yield the form of FIG. 10F. Furthermore, FIG. 10G depicts an embodiment in which corner 165 is omitted and elements 162, 164, 166, 168 form a continuous arcuate element. While the drawing figures do not express any particular dimensioning or geometry, the overall length of the modules from the point of contact to PCB, to the end of the element is important. However, a combination of thickness, width, bending and overall length that determines resonance at particular frequencies.

Referring now to FIG. 10H, a top plan view of elements 172, 174, 178 of FIG. 10F is shown. FIG. 10H depicts elements 172, 174, 178 of FIG. 10F in flat configuration prior to folding operations to yield the form of FIG. 10F. Furthermore, FIG. 10H depicts an embodiment in which elements 172, 174, 178 have an angled or flared arrangement with respect to one another.

The arrangement shown in this disclosure provides a dual-band or multi-band antenna that operates effectively and fits within a compact housing. The structure shown for antenna 130 incorporates multiple arms, arcs, corners and other elements that result in an effective linear dimension of an antenna that is far larger than the compact housing in which it is mounted. Furthermore, the antenna of this disclosure has been demonstrated to provide good perfor-
mance at cellular radiotelephone frequencies, enabling the
use of cellular data connectivity to agricultural equipment in
the field rather than relying on localized Wi-Fi access points
or hotspots, or other short-distance radio protocols.

2.3. Example Ground Clip Structure

Electronic apparatus commonly use ground wireless drive
units to establish a ground path from a circuit board trace to
a chassis, housing or other ground plane. In many situations,
grounding contacts are soldered to a printed circuit board
and have linear or straight geometry. However, compact
applications such as the wireless drive units and storage
devices of embodiments shown herein cannot accommodate
a linear geometry.

Figure 11A:
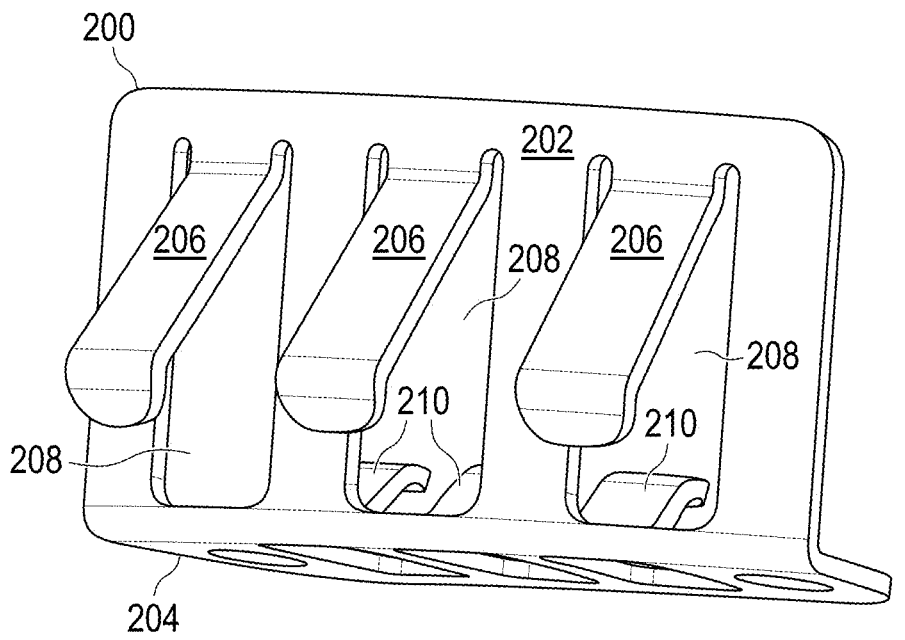
FIG. 11A is a perspective view from one side of a ground clip of one embodiment.
Figure 11B:
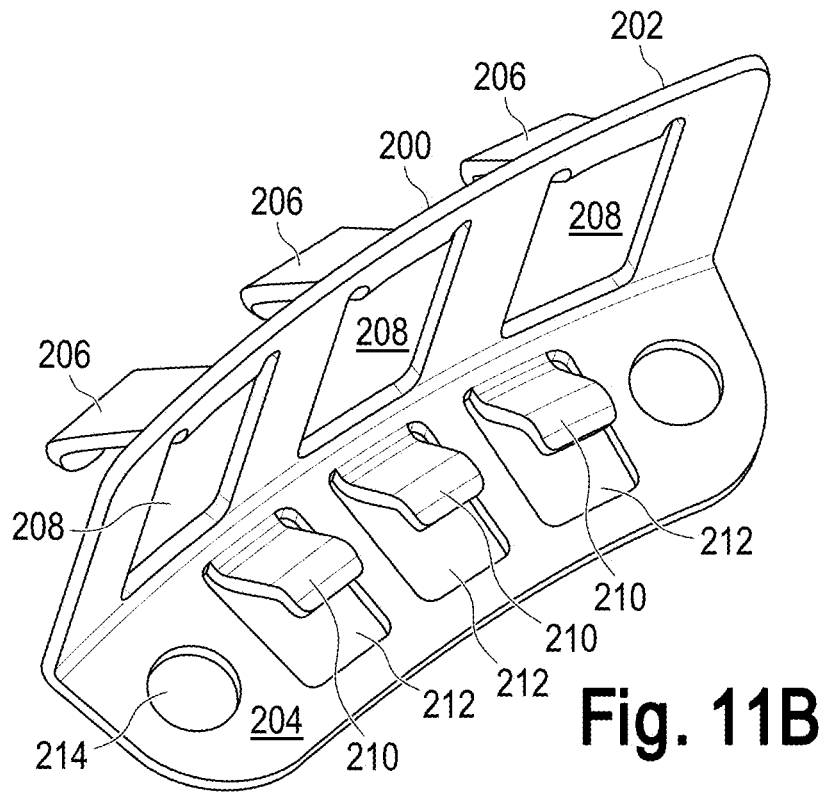
FIG. 11B is a perspective view from another side of the ground clip of FIG. 11A.
Figures 12, 13:
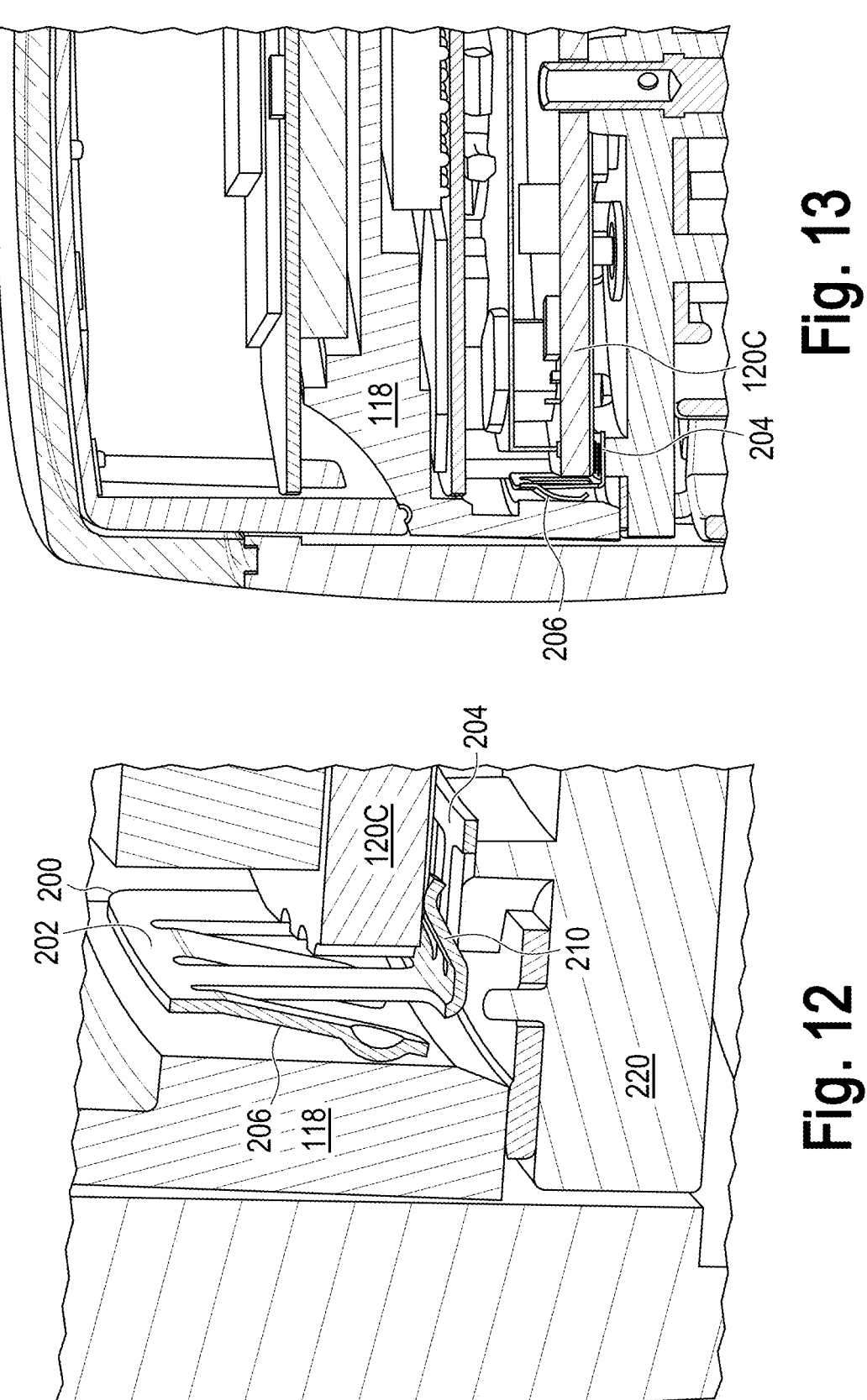
FIG. 12 is a partial cutaway perspective view of the ground clip of FIG. 11A in position with a chassis, circuit board and a heat sink or housing.
FIG. 13 is a partial cutaway perspective view of the ground clip of FIG. 11A in position with a chassis, circuit board and a heat sink or housing.
Figure 14:
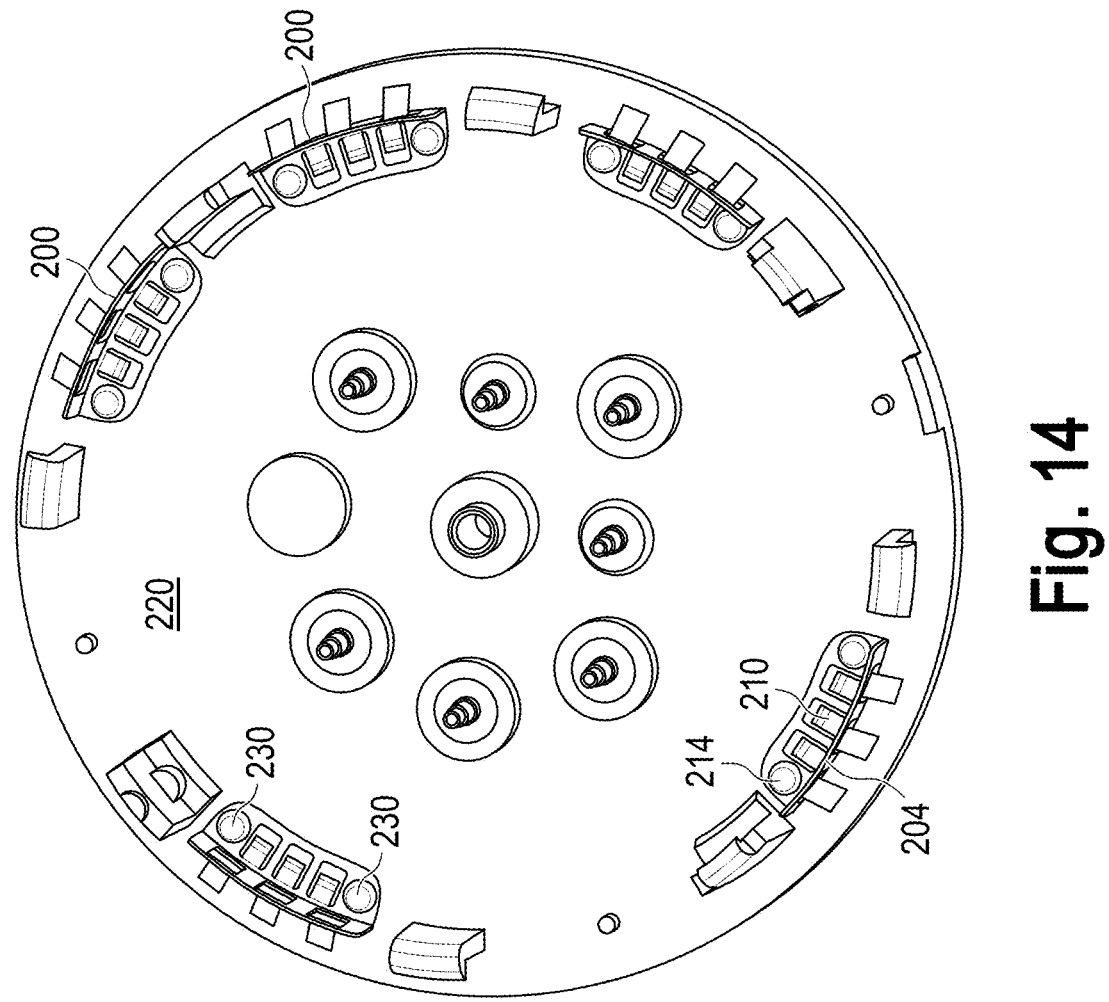
FIG. 14 is a top plan view of a chassis in which five (5) ground clips of FIG. 11A are installed via heat staking.

FIG. 11A is a perspective view from one side of a ground
clip of one embodiment. FIG. 11B is a perspective view
from another side of the ground clip of FIG. 11A. FIG. 12
is a partial cutaway perspective view of the ground clip of
FIG. 11A in position with a chassis, circuit board and a heat
sink or housing. FIG. 13 is a partial cutaway perspective
view of the ground clip of FIG. 11A in position with a
chassis, circuit board and a heat sink or housing. FIG. 14 is
a top plan view of a chassis in which five (5) ground clips
of FIG. 11A are installed via heat staking. Referring first to
FIG. 11A, in one embodiment, a ground clip 200 comprises
first wall 202 that is integrally formed with and joined to a
second wall 204 at an approximately right-angle bend. Thus,
walls 202, 204 are perpendicular, in one embodiment. In
some embodiments, ground clip 200 is formed of sheet
metal such as stainless steel, beryllium copper, phosphor
bronze, brass, copper, or other ferrous metal or alloy. Plating
with silver, gold or other conductive materials may be used.

In an embodiment, first wall 202 further comprises a
plurality of outwardly protruding fingers 206 each having a
first end that is integrally formed with wall 202 and a second
end that is free of the wall 202 and extends slightly out-
wardly therefrom. In some embodiments, fingers 206 may
be formed by subjecting wall 202, in sheet material form, to
punch, cut or stamp operations to create the fingers, leaving
recesses 208 after completing such operations. Each of the
free ends of fingers 206 may comprise a slightly bent and
radiused end. In this configuration, as other drawings will
show, inward pressure on fingers 206 will urge the fingers
toward the recesses under spring tension while keeping the
ground clip 200 in place.

Referring now to FIG. 11B, in an embodiment, second
wall 204 comprises upwardly protruding contacts 210 that
may be punched, cut or stamped from wall 204 in sheet
form, leaving second recesses 212 after such operations are
complete. Contacts 210 may have first ends that are inte-
grally formed with wall 204 and second ends that are free
and formed using a bend and/or radiusing. In this configu-
ration, contacts 210 form second spring elements that can
maintain positive contact with a surface under pressure, as
other drawings will show. Thus, both fingers 206 and
contacts 210 are formed in a manner to create at least some
compressibility or spring tension in use, and are formed
using materials with high conductance.

In an embodiment, second wall 204 further comprises one
or more holes 214 that may receive corresponding pins of a
chassis that may affix the ground clip 200 to the chassis via
heat staking the pins into and on the holes, as further
illustrated herein.

Referring now to FIG. 12, in an embodiment, in an
assembled position, the inner chassis 118 of the wireless
drive unit acts as a thermally and electrically conductive
heat sink and is affixed to a generally circular disc floor 220, which comprises insulative material such as thermoplastic.
A circuit board 120C is affixed to the floor 220 in contact
with wall 204 of ground clip 200 such that one or more
ground terminals of the circuit board are in physical and
electrical contact with at least one contact 210 of the ground
clip. Positive physical and electrical contact may be
achieved by affixing the circuit board 120C to floor 220 via
a plurality of upstanding pins that are thermally bonded to
the circuit board and dimensioned such that affixing the
circuit board requires downward pressure of the board
against the contacts 210, which pressure is opposed and
equalized via spring tension as the contacts are concurrently
urged upward in response.

Furthermore, in an embodiment, assembly of these ele-
ments causes fingers 206 of ground clip 200 to press snugly
against an inner face of the chassis 118, again due to spring
tension. In a disassembled state, fingers 206 are flexed
outwardly but installing the chassis 118 to the floor 220
requires using inward pressure to urge the fingers inward
thus causing them to firmly contact the inner face of the
chassis 118.

In this arrangement, fingers 206 extending from the
vertically positioned first wall 202 provide positive contact
with a heat sink in the form of chassis 118, and concurrently
the contacts 210 extending upwardly from the horizontally
oriented second wall 204 are forced in firm contact with
conductive ground terminals of the circuit board 120C.
Therefore, the ground terminals or ground plane of the
circuit board 120C achieve positive electrical conductivity
with the chassis 118 without requiring a direct physical
connection of the circuit board, which is horizontal, to the
chassis, which is generally vertical. Instead, the right-angle
orientation of ground clip 200 provides a physical and
geometrical transition between perpendicular surfaces while
concurrently providing positive electrical conductivity.

The same arrangement is illustrated in FIG. 13 in the
larger context of other elements of a wireless drive unit,
housing and chassis combination.

Referring now to FIG. 14, in an embodiment, floor 220
comprises a plurality of ground clips 200 of which five (5)
units are shown in FIG. 14 as an example. The five (5) units
are spaced apart around an approximate perimeter of the
floor 220; however, the specific positions of clips shown in
FIG. 14 is merely one example and not required in all
embodiments. Other embodiments could have three or fewer
clips.

One or more holes 214 in each ground clip 200 are seated
on corresponding upstanding pins 230, which are thermally
bonded or heat staked to the ground clips through the holes.
Other embodiments may use ultrasonic welding, glue, or
snaps to affix the parts. This approach permits rapid and
permanent affixing of the ground clips 200 to the floor 220
without the use of additional fasteners such as screws.
However, in other embodiments, rivets, screws or bolts
could be used to secure ground clips 200 to the floor.
Furthermore, the embodiments disclosed herein do not
require the use of direct surface mounting or soldering to
achieve a connection between a heat sink or large ground
plane and a circuit board. Typically, ground contacts are
soldered on boards and are vertical, but the embodiments
herein reduce the space needed on a circuit board for solder
pads, and also are orthogonal in orientation with respect to
the circuit board. Furthermore, the embodiments herein use
the rigidity of surrounding plastic or non-metal elements as
a foundation or base, promoting mechanical stability.
Embodiments are well suited to applications with compact
circuit boards in which space is at a premium and large ground pads are not desirable. The use of multiple grounding points can increase the robustness of ground contact and dissipation of current and heat.

2.4. Example Roller Contact Structure

Wireless drive units of the kind otherwise illustrated and described in this disclosure may be structured for rotatable connection to a computer, tractor, other agricultural machinery, or other apparatus. In some situations, it may be beneficial to provide a wireless drive unit that is capable of mechanical and electrical connection while providing 360-degree rotation about a central axis. In some embodiments, it may be necessary to provide 360-degree rotation, with mechanical connection, while communicating electronic signals by conductive means to external apparatus. An example includes a wireless drive unit that provides a USB, RS232 or other serial data connection to external apparatus.

Figure 15B:
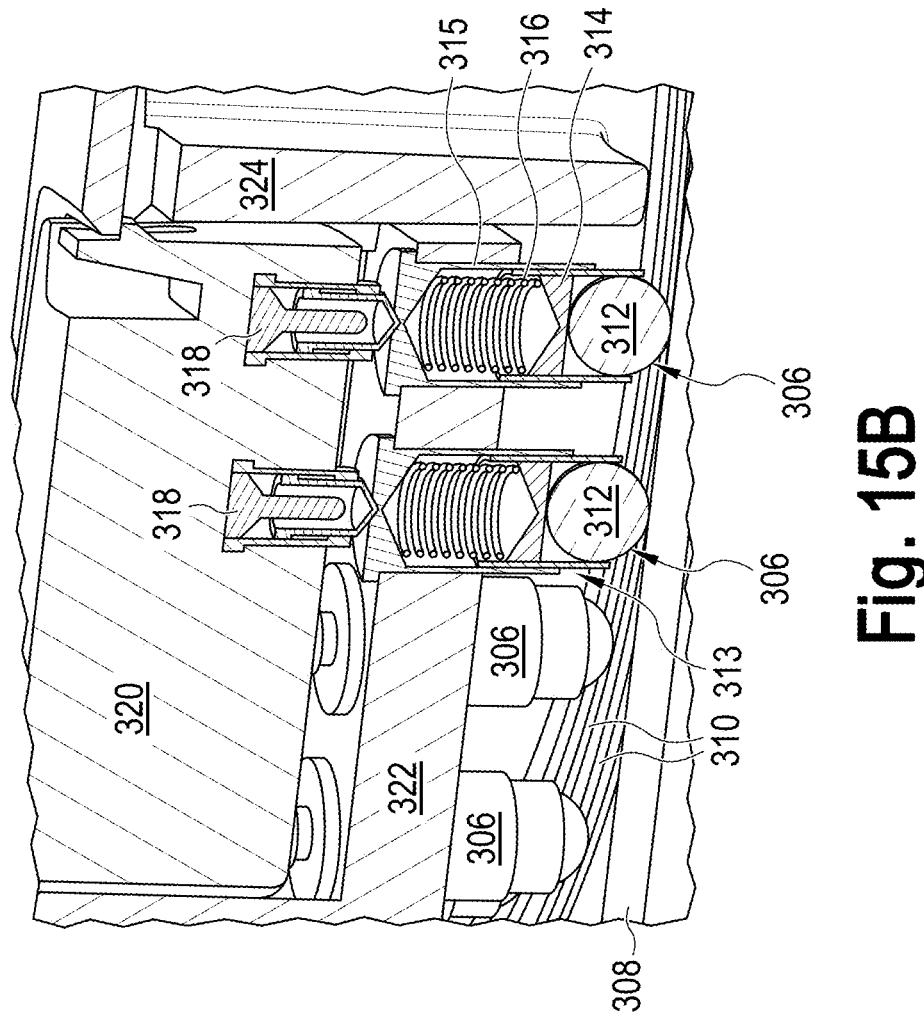
FIG. 15B is a part section, part perspective cutaway view of a portion of the connector of FIG. 15A showing details of example roller contacts.
Figure 15A:
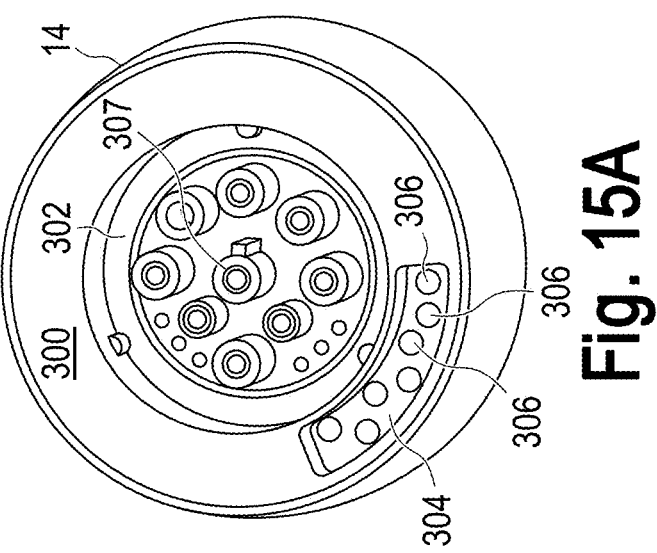
FIG. 15A illustrates a bottom plan view of a rotatable connector having a recess that exposes a plurality of roller contacts.

FIG. 15A illustrates a bottom plan view of a rotatable wireless drive unit having a recess that exposes a plurality of roller contacts. FIG. 15B is a part section, part perspective cutaway view of a portion of the wireless drive unit of FIG. 15A showing details of example roller contacts. Referring first to FIG. 15A, in one embodiment, a wireless drive unit 14 comprises an outer housing 300 that is rotatable with respect to a fixed body 302. Outer housing 300 features an inwardly depressed recess 304 through which a plurality of roller contacts 306 protrude and can mechanically and conductively contact corresponding circuit board traces or other conductors of another element. In an embodiment, each roller contact 306 is affixed in a position having a different radial distance from a center of that roller contact to the center point 307 of the body 302. Consequently, upon rotation of outer housing 300, each roller contact 306 will effectively trace a circle having a different diameter than any other roller contact. In the embodiment of FIG. 15A, seven (7) roller contacts are provided having seven different radial distances from center point 307. However, other embodiments may have more or fewer roller contacts.

Turning now to FIG. 15B, in an embodiment, each of the roller contacts 306 comprises a downwardly projecting ball 312 formed of conductive material. Contacts 306 may comprise pogo pins. Each ball 312 is snugly retained in the manner of a ball bearing within an upwardly and downwardly telescoping retainer tube 313 riding in an outer body 315. Within the outer body 315, a spring 316 is positioned to urge a plunger 314 downward to ride on ball 312 and maintain the ball in contact with a substrate 308 having a plurality of circular circuit traces 310. Spring 316 and plunger 314 are formed of conductive materials and thereby form a continuous electrically conductive path from ball 312 to a pin 318 affixed in a contact housing 320 in the form of pogo pins. Pins 318 may be soldered to wires that reach other elements of the outer housing 300, which are not shown.

In some embodiments, the roller contacts or pins, any secondary circuit board associated with roller contact housing 320 or other elements within the outer housing 300, and associated wires can be overmolded to provide a waterproof seal. For example, as seen in FIG. 15A, FIG. 15B, outer housing 300 and recess 304 can be molded onto body 315 of each roller contact 306 to fully isolate the pins 318, roller contact housing 320 and other internal elements from weather, dirt or other external factors.

With this arrangement, each of the roller contacts 306 is capable of riding on substrate 308 in contact with a different one of the circular circuit traces 310 as the outer housing 300 is continuously rotated through a full circle. Therefore, it is possible to achieve conductive transfer of electronic signals from active circuitry installed on the substrate 308 to other circuitry in the outer housing while permitting complete rotation about the center point 307.

Dimensioning is not provided in the drawing figures but no special limits are known on the size of the roller contacts 306. For example, balls 312 could be 1 mm, 2 mm, 3 mm and so forth with other elements sized to accommodate this dimensioning.

Figure 16:
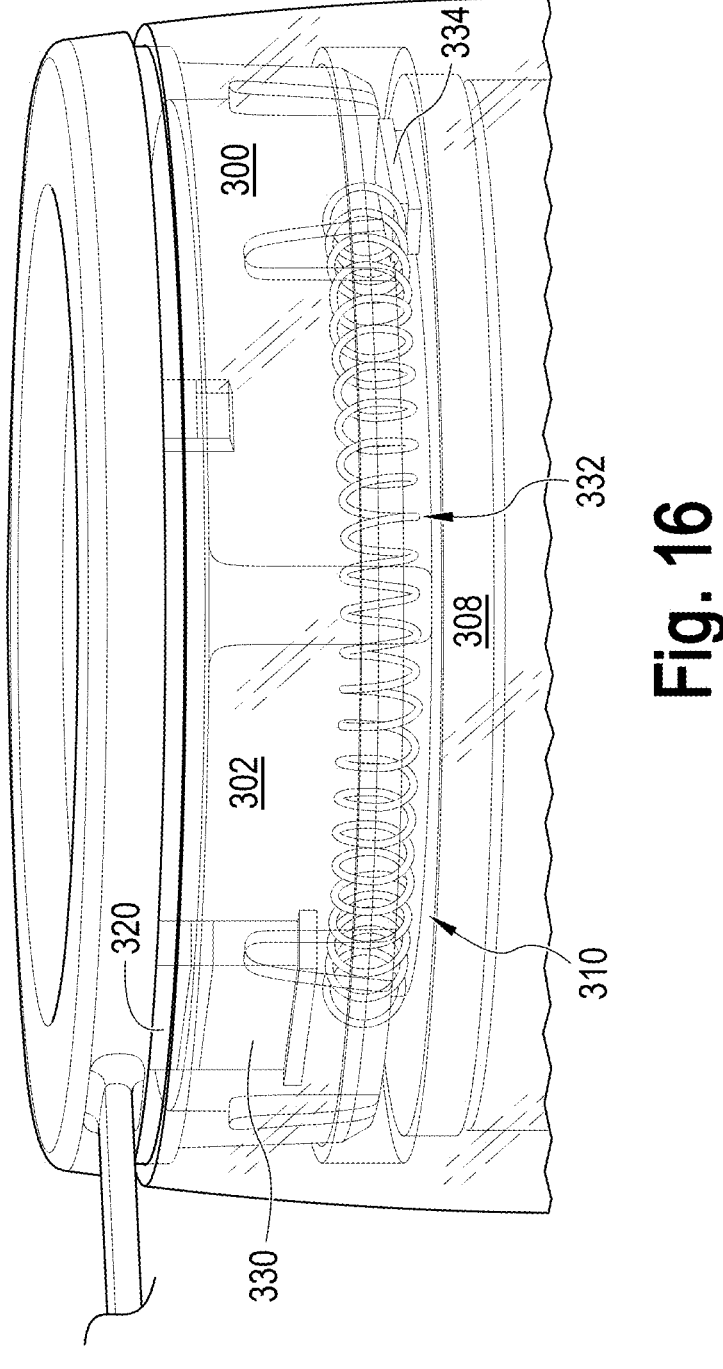
FIG. 16 is a partial transparent side elevation view of a connector illustrating a coiled wire connection between other elements of the connector.
Figures 17A, 17B:
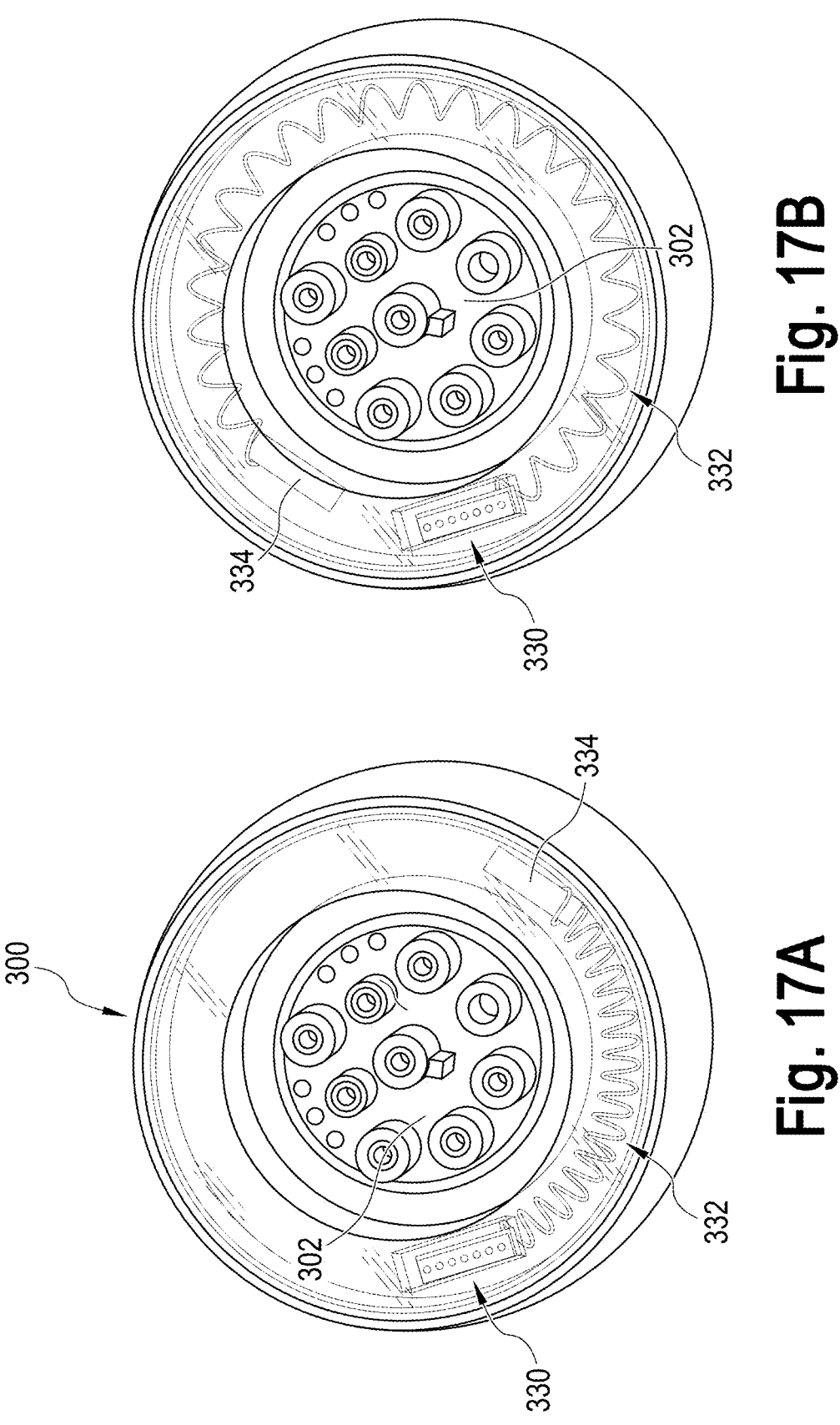
FIG. 17A is a bottom plan view of the connector of FIG. 16 in a first position of rotation.
FIG. 17B is a bottom plan view of the connector of FIG. 16 in a second position of rotation.

FIG. 16 is a partial transparent side elevation view of a wireless drive unit illustrating a coiled wire connection between elements of the wireless drive unit. FIG. 17A is a bottom plan view of the wireless drive unit of FIG. 16 in a first position of rotation. FIG. 17B is a bottom plan view of the wireless drive unit of FIG. 16 in a second position of rotation.

An outer housing 300, which is depicted in transparent manner, rotates around body 302. Roller contact housing 320 is affixed to outer housing 300, while a header 330 is affixed to body 302. The roller contact housing 320 has downwardly protruding roller contacts that ride on circular circuit traces 310 of substrate 308 to accomplish conduction of signals from the roller contact housing or outer housing 300 to the circuit traces and/or active circuitry on or below substrate 308 to which the circuit traces are electrically coupled. Typically, roller contact housing 320 and header 330 expose the same number of solder-type contacts.

Referring first to FIG. 16, in one embodiment, a length of coiled flexible wire cable 332 has a first end affixed to connector 334 and a second end affixed to the header 330. Cable 332 is a multi-conductor conductive cable having a plurality of individual conductors that are respectively coupled to distinct pins 318 of connector 334 and distinct conductors within the header 330.

With this arrangement, a conductive path is formed from header 330, via cable 332, to connector 334, to circuit traces 310 and then to active circuitry on or below the substrate 308. Furthermore, the outer housing 300 is capable of rotation about the body 302, and in response, cable 332 stretches or uncoils while maintaining conductive contact to the aforesaid elements. In this embodiment, the amount of rotation of the outer housing 300 is limited to less than 360 degrees or to that portion of rotation that can be achieved when the cable 332 has stretched to its maximum extent. The outer housing 300 may be formed with an annular perimeter channel in which the cable 332 rides to maintain separation of the cable and to maintain the cable in a generally circular geometry around a perimeter of the outer housing as the cable expands in length.

Referring now to FIG. 17A, FIG. 17B, the configuration of the foregoing elements is illustrated via plan views that show connector 334 in two different rotational positions with cable 332 in two different positions of extension. It should be noted that positions of body 302 and header 330 are unchanged in the two views. In FIG. 17A, connector 334 is relatively closer to the header 330 and therefore the cable 332 is only partly extended around a perimeter of the outer housing 300. In FIG. 17B, connector 334 is relatively further from the header 330 and therefore the cable 332 is nearly fully extended around the perimeter of the outer housing 300. It will be apparent that it is not possible to rotate connector 334 over or past the header 330 but that approximately 320-350 degrees of rotation can be provided.

The approach of these embodiments permits communication of electronic signals to outside apparatus using a compact housing with better protection from weather and simpler installation. There is no need for an external connector in a single position or to mate a compatible plug with that connector. Plugging operations sometimes result in damage to conductive pins but the roller approach of the present disclosure eliminates the need to mate pins to sockets. Furthermore, connection and rotation at all points is possible with some embodiments.

3. ADDITIONAL DATA STORAGE AND TRANSFER DEVICES

3.1. Example Wireless Communications Devices

Figure 18A:
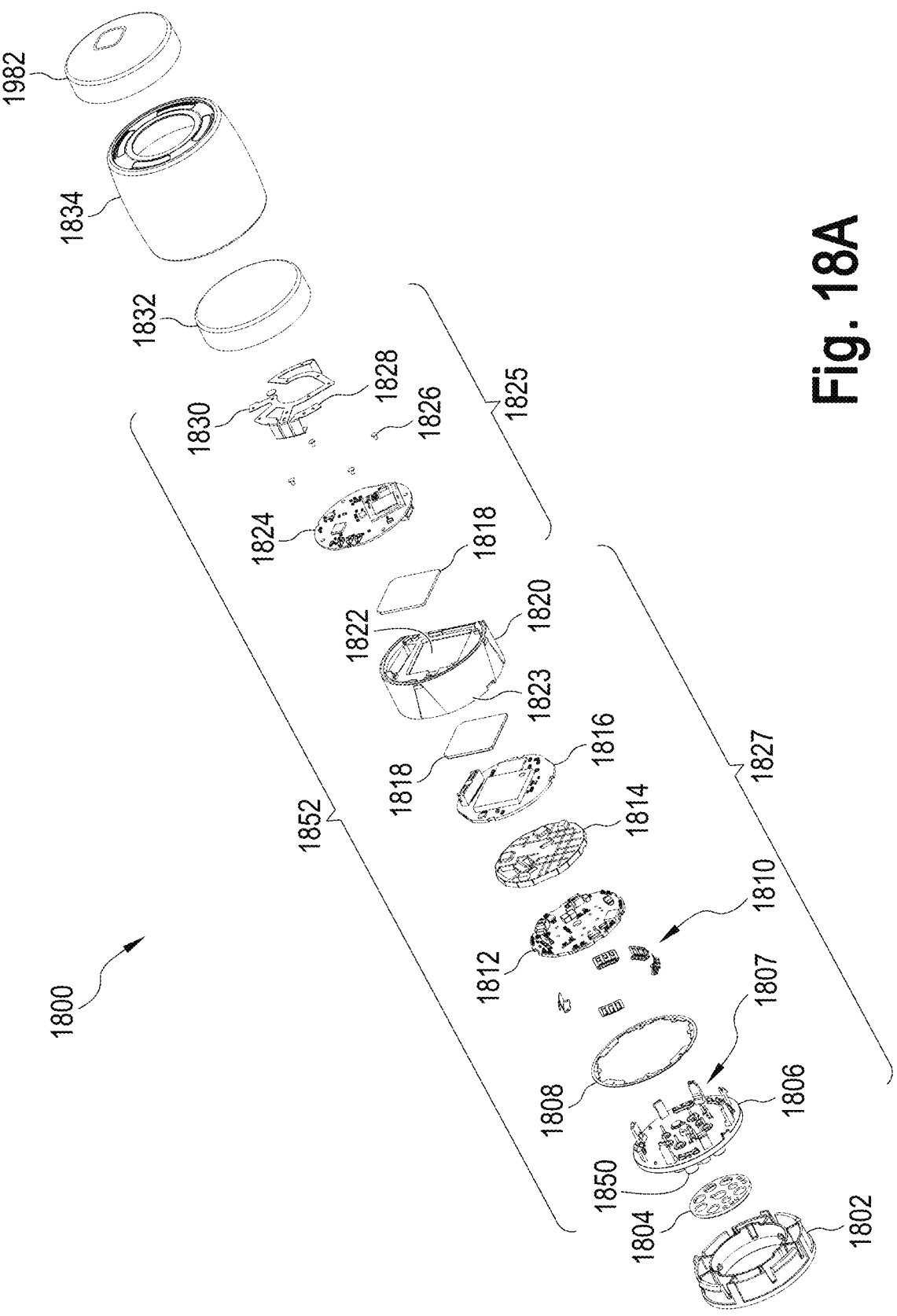
FIG. 18A is an exploded perspective view of an embodiment of a wireless drive unit that includes a core assembly, an implement connector, and a coupling structure, in an embodiment.

FIG. 18A is an exploded perspective view of an embodiment of a wireless drive unit 1800. Wireless drive unit 1800 includes an outer cap 1982, an outer housing 1834, a core assembly 1852, an implement connector 1850, and a coupling structure 1802, in an embodiment. In use, coupling structure 1802 mechanically couples wireless drive unit 1800 to a connector, such as connector 20 of FIG. 2, that may be attached to an agricultural implement, such as farm equipment 10.

In an embodiment, when coupling structure 1802 mates with a corresponding connector of a vehicle or an agricultural implement, implement connector 1850 establishes unidirectional or bidirectional electrical digital communication between wireless drive unit 1800 and one or more electronic components of the agricultural implement. For example, wireless drive unit 1800 may periodically receive data, such as digital imagery and/or sensor data, from a camera or other type of sensor installed on an agricultural implement or from a field sensor located remotely from the agricultural implement, via antennae 1828, 1830 and/or implement connector 1850, store the received data at least temporarily in memory, such as memory 30, and then transfer or forward the data to another computing device, such as a cloud storage device. In various embodiments, the wireless drive unit 1800 is equipped with memory in the range of about 4 Gigabytes to about 128 Gigabytes or more, depending on the requirements of a particular design.

Data stored in the memory of wireless drive unit 1800 is periodically forwarded or transferred by wireless drive unit 1800 to another computing device, such as a mobile computing device or a cloud server, using one or more wireless communication technologies. Data and/or computer program instructions, such as control parameters, may be periodically received by wireless drive unit 1800 from, for example, an agricultural intelligence system running on one or more remote computing devices.

The wireless drive unit 1800 may temporarily store data and/or instructions received from the agricultural intelligence system in its memory and periodically forward or transfer such data and/or instructions to a computing device located on or in the agricultural implement, via implement connector 1850 or antennae 1828, 1830. For example, the wireless drive unit 1800 may receive graphics data from an agricultural intelligence system and transfer the graphics data either wirelessly or by a wired connection to a display monitor located on the agricultural implement, which enables the display monitor to display, for instance, a graphical field map.

As another example, wireless drive unit 1800 may receive data and/or instructions for generating a digital field map, and transfer the data and/or instructions to a cab computer located in the agricultural implement, and the cab computer may cause a display monitor on or in the agricultural implement to display the digital field map. The cab computer and the display monitor may be combined into a unitary device, such as a tablet computer, laptop computer, smart phone, or another form of smart electronic device, in various embodiments.

In the embodiment of FIG. 18A, the wireless communication technologies include antennae 1828, 1830 and an integrated circuit of a first printed circuit board (PCB) 1824, to which antennae 1828, 1830 are electrically coupled. Antennae 1828, 1830 and first PCB 1824 are arranged to accommodate transfer and receipt of wireless communications using one or more radio frequencies and/or other frequencies of the electromagnetic spectrum. For example, antennae 1828, 1830 and first PCB 1824 may be capable of sending and receiving one or more of Wi-Fi, BLUETOOTH, and cellular communications.

When assembled, the components of core assembly 1852 are enclosed in an interior region defined by an outer cap 1836 or 1982, an outer housing 1834, an inner cap 1832, and coupling structure 1802. Coupling structure 1802 is similar to align, twist and locking piece 62 of FIG. 4, in an embodiment. Outer cap 1836 or 1982, outer housing 1834, inner cap 1832, and coupling structure 1802 are constructed using a non-conductive material, such as plastic, in an embodiment.

Core assembly 1852 itself includes two interior regions, 1825, 1827, which are physically separated and electromagnetically isolated and thermally isolated from each other by electrical and thermal shield 1820. In FIG. 18A, first interior region 1825 is defined by inner cap 1832 and a first surface 1822 of electrical and thermal shield 1820. Second interior region 1827 is defined by overmold or connector subassembly 1806 and a second surface 1823 of electrical and thermal shield 1820, where second surface 1823 is opposite first surface 1822.

First interior region 1825 includes first surface 1822, a thermal pad 1818, first PCB 1824, and antennae 1828, 1830. Antennae 1828, 1830 are coupled to first PCB 1824 by one or more fasteners, such as screws. First PCB 1824 includes circuitry for wireless communication.

Second interior region 1827 includes a drive unit connector sub-assembly 1807, which extends from a first side of overmold or connector sub-assembly 1806, a gasket 1808, a set of ground clips 1810, a second PCB 1812, a shield 1814, a third PCB 1816, a thermal pad 1818, and second surface 1823 of electrical and thermal shield 1820. In an embodiment, second PCB 1812 includes an integrated circuit that supplies and manages electrical power for wireless drive unit 1800 while third PCB 1816 includes an integrated circuit that functions as a controller for wireless drive unit 1800. In other embodiments, the integrated circuits of second and third PCBs 1812, 1816 are combined onto one printed circuit board rather than two separate printed circuit boards. Gasket 1808 is constructed using a water-proof or water-resistant material, such as rubber, in an embodiment.

In some embodiments, antennae 1828, 1830 are implemented as antennae 130, 190 shown in FIG. 10D, FIG. 10E, FIG. 10F, FIG. 10G, and/or FIG. 10H, described above. In other embodiments, antennae 1828, 1830 take the form of antenna 2200, shown in FIG. 22, described below. The shape, width, thickness, and end-to-end length of each of antennae 1828, 1830 are configured to meet particular frequency and/or resonance requirements and can be adjusted according to the needs of a particular implementation. Alternatively or in addition, the antenna assembly that includes antennae 1828, 1830 in FIG. 18A may include any number of individual antennae, each of which may be configured to receive and transmit a different frequency of radio frequency signals, for example.

When assembled, ground clips 1810 are coupled to and arranged about a perimeter of connector sub-assembly 1806, such that one or more contacts of a first end of each of ground clips 1810 electrically couple with PCB 1812 and one or more fingers of a second end of each of ground clips 1810 electrically engage a side surface of electrical and thermal shield 1820. The first and second ends of each ground clip 1810 are generally orthogonal. In some embodiments, ground clips 1810 are implemented as ground clips 200 shown in FIG. 11A and FIG. 11B, described above. In other embodiments, ground clips 1810 may take on different shapes and configurations as needed to meet the requirements of a particular design or implementation. In general, the configuration and arrangement of electrical and thermal shield 1820 and ground clips 1810 relative to PCBs 1812, 1816, 1824 enables electrical and thermal shield 1820 to be used as both a heat sink and a ground plane, so that the operation of integrated circuits of PCBs 1812, 1816 does not interfere with the wireless communication performance of PCB 1824 and antennae 1828, 1830.

Drive unit connector sub-assembly 1807 and implement connector 1850 are electrically coupled so that electrical signals received by implement connector 1850 from an agricultural implement or an adapter cable are transmitted to wireless drive unit 1800 via drive unit connector sub-assembly 1807. Drive unit connector sub-assembly 1807 is supported by and extends from a first side of overmold or connector sub-assembly 1806. Implement connector 1850 is supported by and extends from a second side of overmold or connector sub-assembly 1806. The first and second sides of overmold or connector sub-assembly 1806 are opposite one another such that implement connector 1850 faces an opposite direction from drive unit connector sub-assembly 1807. Taken together, the first and second sides of overmold or connector sub-assembly 1806 that support drive unit connector sub-assembly 1807 and implement connector 1850, respectively, may be referred to as a substrate. Implement connector 1850 is supported by a gasket 1804 and coupling structure 1802.

Figure 18B:
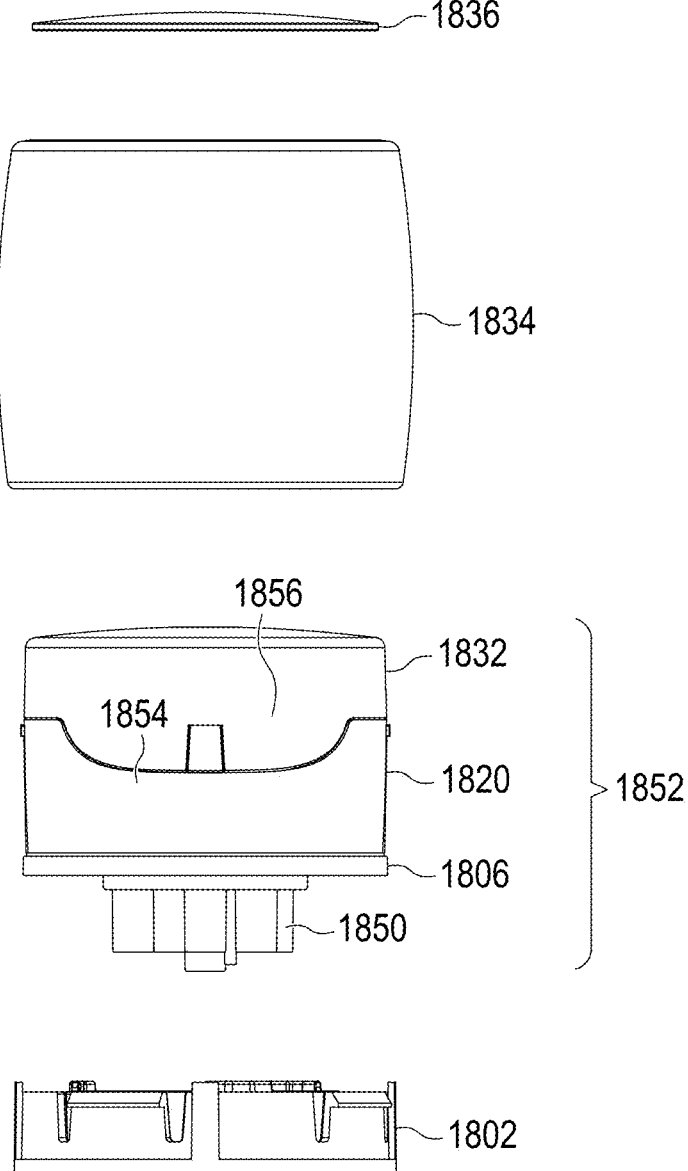
FIG. 18B is an exploded plan view of the wireless drive unit of FIG. 18A, with a core assembly shown in an assembled form.

FIG. 18B is an exploded plan view of the wireless drive unit of FIG. 18A, with core assembly 1852 shown in an assembled form, and showing an end cap 1836 as an alternative to outer cap 1982. When assembled, a concavely-shaped edge or surface 1854 of electrical and thermal shield 1820 mates with a corresponding convexly-shaped portion, edge or surface 1856 of inner cap 1832. In some embodiments, electrical and thermal shield 1820 is implemented as chassis 118, described above. Electrical and thermal shield 1820 and inner cap 1832 are supported by the first side of the substrate portion of overmold or connector sub-assembly 1806. Drive unit connector sub-assembly 1807 is also supported by the first side of the substrate portion of overmold or connector sub-assembly 1806 but is not visible in FIG. 18B because it is encircled by or enclosed within electrical and thermal shield 1820. When wireless drive unit 1800 is assembled, core assembly 1852 is encircled by or enclosed within outer housing 1834.

Figure 18C:
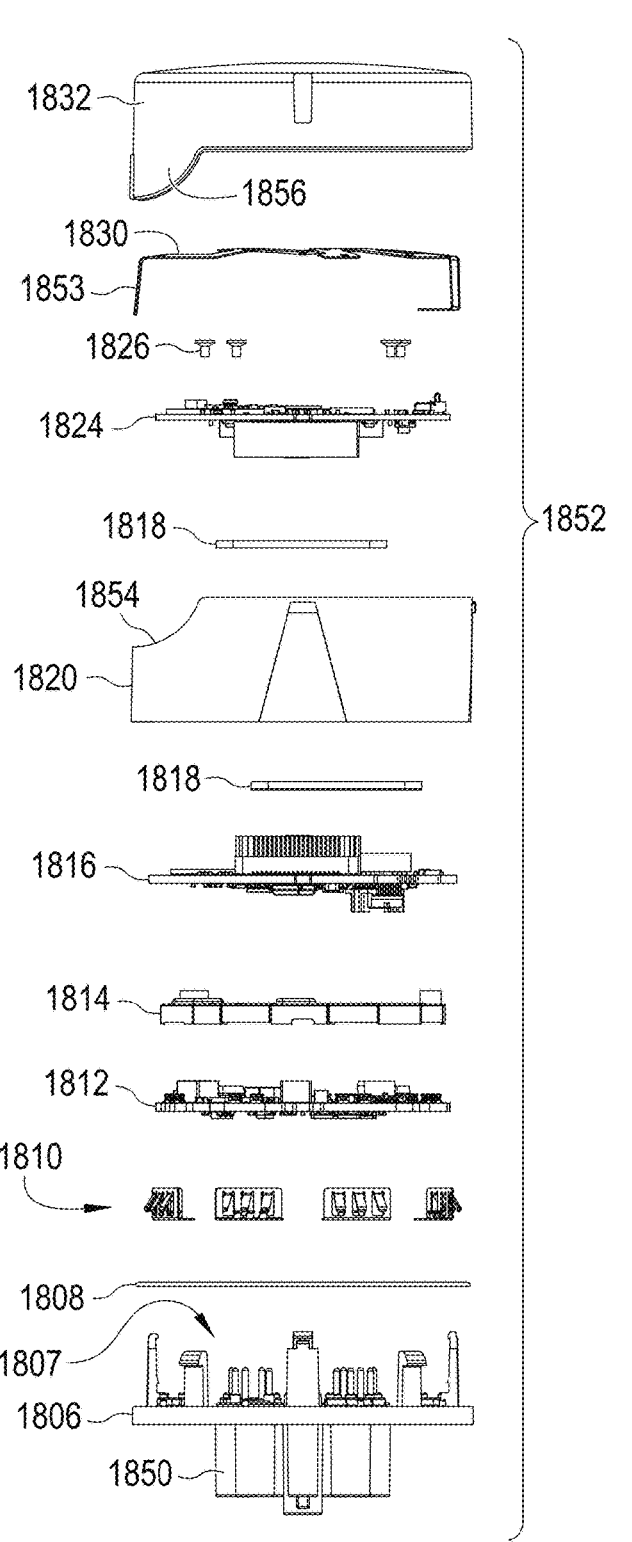
FIG. 18C is an exploded plan view of the core assembly of FIG. 18B.

FIG. 18C is an exploded plan view of the core assembly of FIG. 18B. FIG. 18C shows the relative spatial arrangement of connector sub-assembly 1806, including implement connector 1850 and drive unit connector sub-assembly 1807, gasket 1808, ground clips 1810, second PCB 1812, shield 1814, third PCB 1816, a first thermal pad 1818, electrical and thermal shield 1820, including concavely-shaped portion 1854, a second thermal pad 1818, first PCB 1824, fasteners 1826, antenna 1830, including a tail element 1853, and inner cap 1832, including convexly-shaped portion 1856. In some embodiments, second PCB 1812 contains a power integrated circuit, third PCB 1816 contains a control integrated circuit, and first PCB 1824 contains a wireless communication integrated circuit including circuitry for cellular, Wi-Fi, BLUETOOTH, or other wireless communication using the electromagnetic spectrum.

Figure 18D:
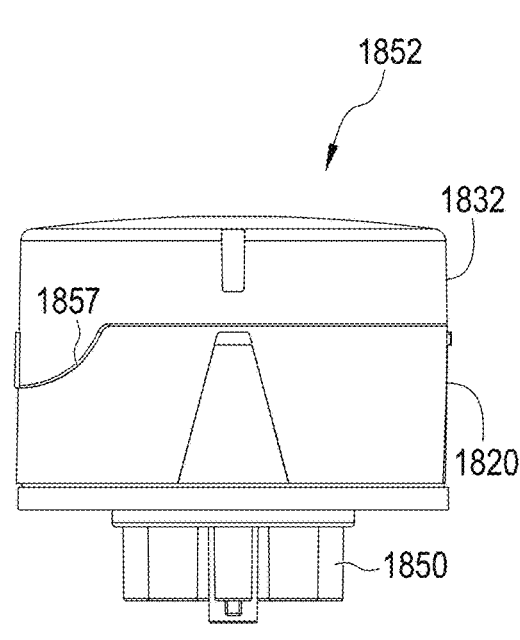
FIG. 18D is a perspective view of the assembled core assembly of FIG. 18B.

FIG. 18D is a perspective view of the assembled core assembly of FIG. 18B, rotated approximately 90 degrees Clockwise about a perpendicular axis through the center of core assembly 1852, relative to the view of FIG. 18B. Boundary 1857 indicates the intersection of convexly-shaped portion 1856 of cap 1832 with a concavely-shaped portion 1854 of electrical and thermal shield 1820. In an embodiment, the configuration of concavely shaped portion 1854, convexly-shaped portion 1856, and boundary 1857 allows clearance for tail element 1853 in the form of a minimal physical distance between the distal end of tail element 1853 and electrical and thermal shield 1820, so that tail element 1853 does not physically engage with electrical and thermal shield 1820. The minimal physical distance between tail element 1853 and electrical and thermal shield 1820 is determined, for example, based on the shape, size, and length of tail element 1853 as well as the design requirements for electrical and thermal shield 1820.

FIG. 18E1 is a plan view of an apparatus that includes the core assembly of FIG. 18B as well as coupling structure 1802 enclosed in a housing 1858, and a connector 1860 of a vehicle or an agricultural implement, showing a relationship between the core assembly and the connector 1860 of the vehicle or agricultural implement. Examples of vehicles and agricultural implements are given throughout this disclosure and include but are not limited to manned and unmanned land and aerial commercial and consumer vehicles. When the core assembly is enclosed in housing 1858, the interior regions of the core assembly are hermetically sealed to prevent water damage to the electrical components. As can be seen in FIG. 18E1, installation of housing 1858 over the core assembly results in the core assembly, including implement connector 1850, as well as the coupling structure 1802, being encircled by or enclosed within housing 1858.

FIG. 18E1 shows one example of a connector 1860 of a vehicle or an agricultural implement, which includes a coupling structure 1859 and threaded portion 1862. Coupling structure 1859 mechanically couples with coupling structure 1802; for example, in an align, twist and lock manner. FIG. 18E2 is a plan view of the apparatus of FIG. 18E1, showing the core assembly, enclosed within housing 1858, connected to the implement connector.

FIG. 18E3A is a section view of the apparatus of FIG. 18E2 taken along the line 18E3-18E3 of FIG. 18E2, showing the connector of the vehicle or agricultural implement in phantom. FIG. 18E3A shows outer cap 1836 in a snap- or press-fit relationship with a first portion of outer housing 1834, coupling structure 1802 in a snap- or press-fit relationship with a second portion of outer housing 1834, and connector sub-assembly 1806 supported by coupling structure 1802. In comparison to cap 102 of FIG. 10A, outer cap 1836 does not have a skirt and the mating line with outer housing 1834 is on a top portion of the assembly rather on the side of the assembly. Together, outer cap 1836, outer housing 1834, coupling structure 1802 and sub-assembly 1806 define an interior region that includes core assembly 1852.

Regarding core assembly 1852, FIG. 18E3A shows a first interior region defined by inner cap 1832 and a first surface of electrical and thermal shield 1820, and a second interior region defined by a second surface of electrical and thermal shield 1820 and connector sub-assembly 1806. The first interior region of the core assembly includes antenna 1830, first PCB 1824, and a first thermal pad 1818 which is supported by the first surface of electrical and thermal shield 1820. The second interior region of the core assembly includes a second thermal pad 1818, PCBs 1812 and 1816, a set of CAN (controller area network) bus pins 1861 and a set of serial pins 1865. In some embodiments, the set of CAN bus pins 1861 includes 9 pins and the set of serial pins 1865 includes 6 pins. FIG. 18E3A also shows implement connector 1850 extending from sub-assembly 1806 in a direction toward connector 1860 of the agricultural implement, including a set of receptacles or female connectors 1863. Each receptacle 1863 is sized and configured to receive a male connector or pin 1864 of connector 1860 and to achieve electrical connections between pins 1864 and pins 1861. FIG. 18E3B is another section view of the apparatus similar to FIG. 18E3A and rotated approximately 90 degrees about an axis running perpendicularly through the core assembly, relative to FIG. 18E3A.

FIG. 18F1 is a perspective view of an apparatus that includes the core assembly of FIG. 18B enclosed in a housing, an adapter, and the connector of FIG. 18E1, showing relationships between the core assembly, the adapter, and the connector. In FIG. 18F1, core assembly 1852 is not visible because it is enclosed within or encircled by housing 1858 and end cap 1836. Housing 1858 and cap 1836, and the components contained within housing 1858 and cap 1836 may be referred to as a wireless drive unit. An adapter 1870 is interposed between connector 1860 of a vehicle or an agricultural implement and the wireless drive unit.

Figure 21B:
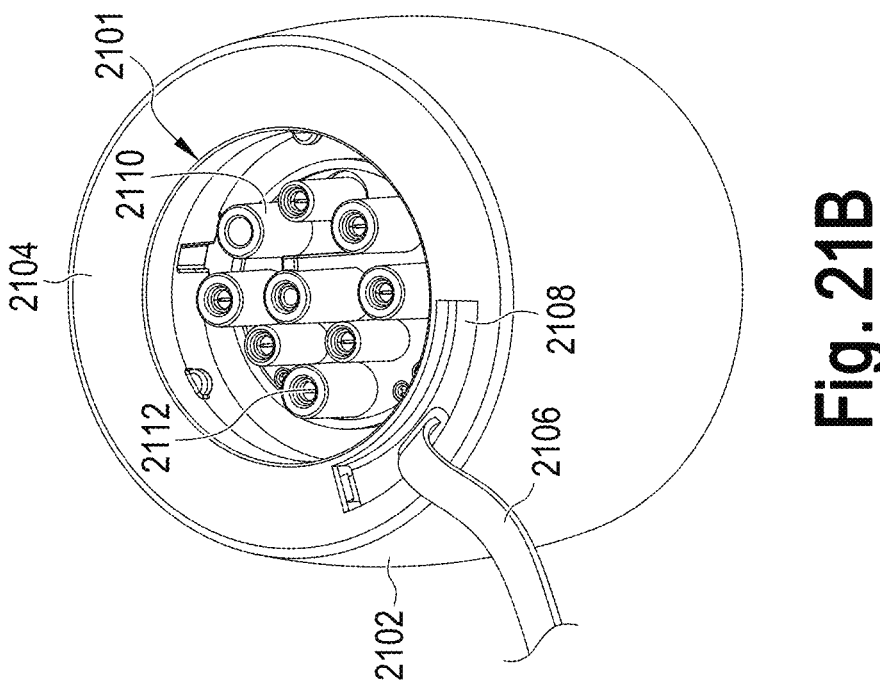
FIG. 21B is a perspective view of an implement-side connector portion of the embodiment of FIG. 21A.

A first body portion 1874 of adapter 1870 electrically and mechanically couples with implement connector 1850 of the wireless drive unit via a set of stationary pins 1872. A second body portion 1878 of adapter 1870, spaced apart from and opposite the first body portion 1874 of adapter 1870, supports an implement connector assembly 1880, which electrically and mechanically couples to connector 1860. Adapter 1870 includes a port 1876, which is capable of receiving a proximal end of an adapter cable 1882. Additional details of embodiments of adapter cable 1882 and adapter 1870 are shown in FIG. 21C and FIG. 21D, described below.

FIG. 18F2 is a section view of the apparatus of FIG. 18F1 in an assembled form, taken along the line 18F2-18F2 of FIG. 18F1, showing the connector of the vehicle or agricultural implement in phantom. As shown in FIG. 18F2, body portion 1878 of adapter 1870 has pins 1872, 1873 that can be received by receptacles 1863, 1867 of the wireless drive unit and receptacles 1875 that can receive pins 1864 of connector 1860. FIG. 18F2 also shows adapter cable 1882 connected to port 1876.

3.2. Example Cooling Mechanisms

Figure 19A:
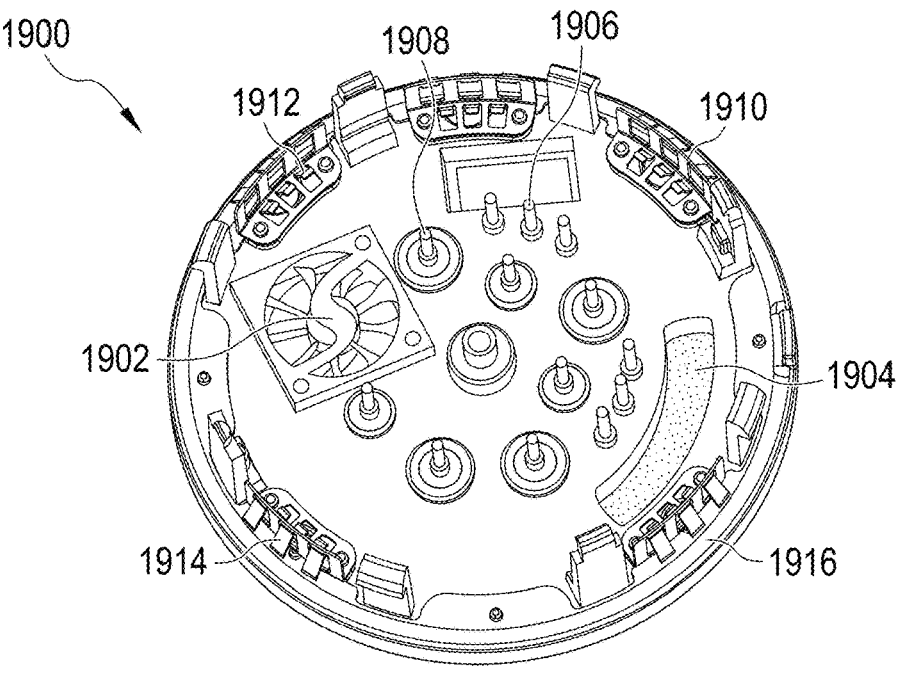
FIG. 19A is a perspective view showing a drive unit-side connector portion of a connector sub-assembly of a core assembly of a wireless drive unit, in an embodiment.

FIG. 19A is a perspective view showing a drive unit-side connector portion of a connector sub-assembly of a core assembly of a wireless drive unit, in an embodiment. Connector sub-assembly 1900 is another embodiment of connector sub-assembly 1806. Connector sub-assembly 1900 includes a substrate 1916, which supports serial pins 1906, CAN bus pins 1908, ground clips 1910, contacts 1912, and fingers 1914, as well as a cooling mechanism that includes a fan 1902 and an air inlet covered by a mesh filter 1904. In an embodiment, fan 1902 is a micro-sized fan, for example, a fan approximately the size of a dime, which is capable of removing heat from a very small enclosed space such as interior regions of the core assembly. Cooling mechanism

1902, 1904 aids in the release to the atmosphere of thermal energy collected by electrical and thermal shield 1820.

Figure 19B:
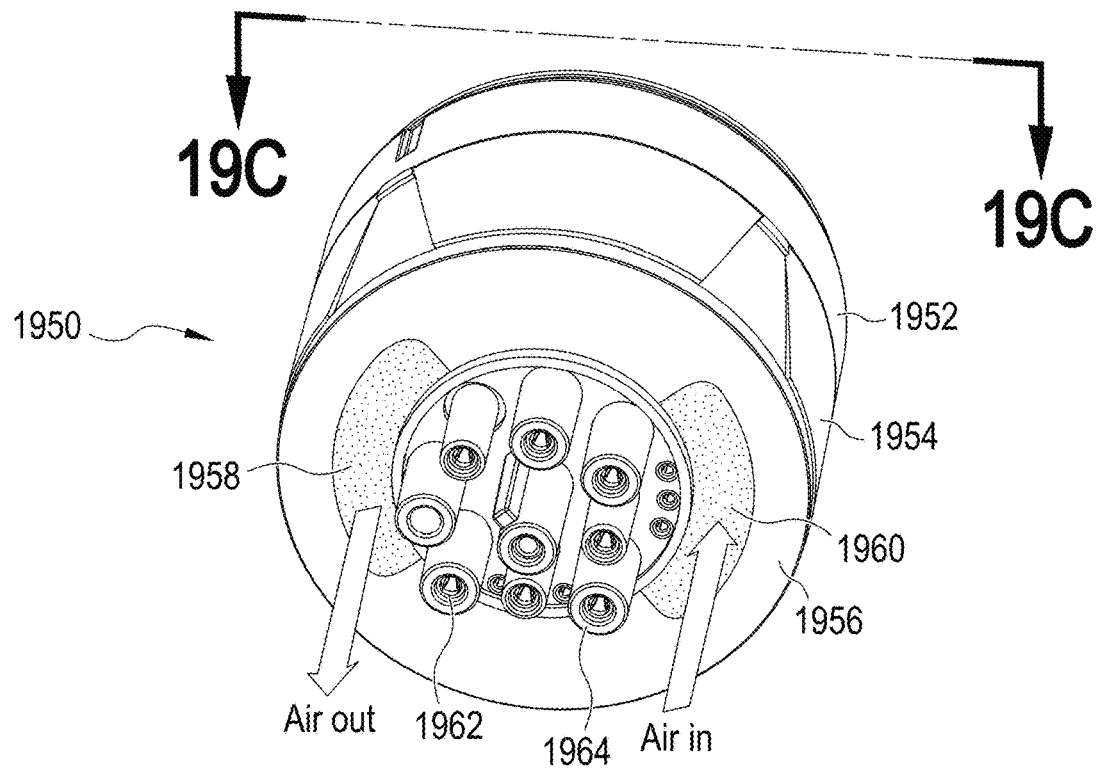
FIG. 19B is a perspective view of a core assembly showing an implement-side connector portion of the connector sub-assembly of FIG. 19A.

FIG. 19B is a perspective view of a core assembly showing an implement-side connector portion of the connector sub-assembly of FIG. 19A. Implement connector assembly 1950 includes a substrate 1956 which supports a set of connector pins 1962 and alignment posts 1964. Connector pins 1962 are made of an electrically conductive material while posts 1964 are constructed using a non-conductive material. Substrate 1956 also includes a fluid inlet 1960 and a fluid outlet 1958, which allow fluid to be circulated through a portion of the core assembly without damaging its electrical components. Substrate 1956 supports an electrical and thermal shield 1954, which may be implemented in a similar manner as electrical and thermal shield 1820, and an inner cap 1952, which may be implemented in a similar manner as inner cap 1832.

Figure 19C:
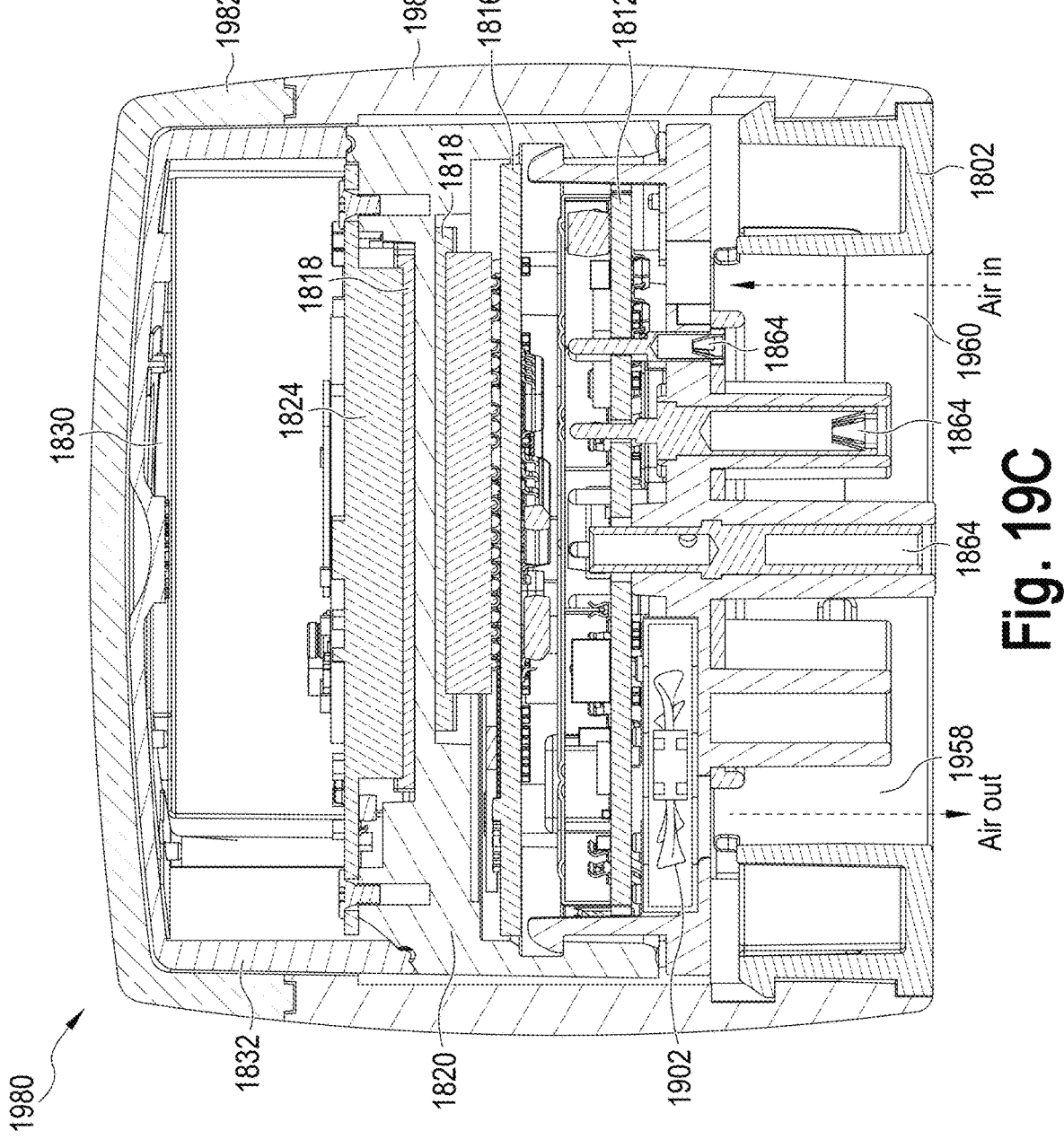
FIG. 19C is a section view of the core assembly of FIG. 19B, taken along the line 19C-19C of FIG. 19B.

FIG. 19C is a section view of a wireless drive unit including the core assembly of FIG. 19B taken along the line 19C-19C of FIG. 19B. Wireless drive unit 1980 includes an outer cap 1982 and an outer housing 1984 enclosing the components of the core assembly including fan 1902, fluid inlet 1960 and fluid outlet 1968.

Figure 20:
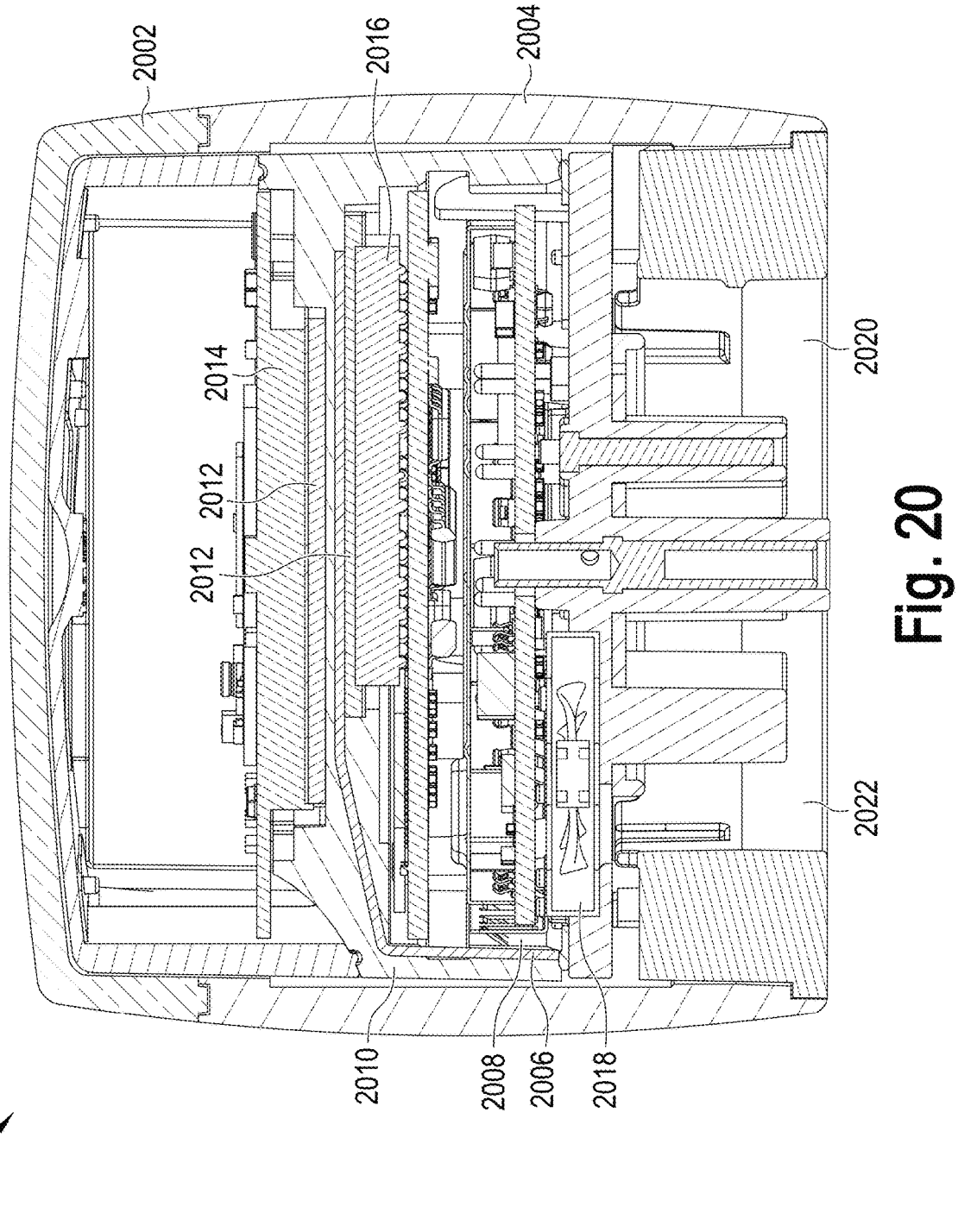
FIG. 20 is a section view of another core assembly similar to the core assembly of FIG. 19B.

FIG. 20 is a section view of a wireless drive unit including another core assembly similar to the core assembly of FIG. 19B. The wireless drive unit 2000 includes an outer cap 2002 and an outer housing 2004 enclosing the components of the core assembly including a fan 2018, fluid inlet 2020, fluid outlet 2022, a heat pipe 2006, and a cooling area 2008 for the dissipation of heat collected by heat pipe 2006. Heat pads 2012 are each adjacent to a PCB 2014, 2016. Heat pipe 2006 is in or near the electrical and thermal shield 2010 and adjacent to one of the heat pads 2012, for example, the heat pad 2012 which is adjacent to PCB 2016. PCB 2014 contains a modem for wireless communication, such as a cellular modem, while PCB 2016 contains a central processing unit. Both PCBs 2014, 2016 are sources of heat, and so heat pipe 2006 is disposed between PCBs 2014, 2016 in order to dissipate the heat generated by PCBs 2014, 2016 and release the heat to the atmosphere through cooling area 2008. Heat pipe 2006 is sized according to the size of the wireless drive unit 2000. For example, an off-the-shelf light pipe may be used in some embodiments, while other embodiments may use a custom-manufactured light pipe as the heat pipe 2006.

Cooling mechanisms such as those shown in FIG. 19A, FIG. 19B, FIG. 19C and FIG. 20 achieve cooling by circulating fluid through portions of the core assembly. In the embodiments of FIG. 19A, FIG. 19B, and FIG. 19C, the cooling fluid is air. In the embodiment of FIG. 20, a liquid is used as the cooling fluid. In FIG. 20, the cooling fluid flows through a liquid zone, which is disposed about an outer perimeter of the heat pipe. In an embodiment, the liquid zone includes a mesh material such as a porous wick structure, and the cooling fluid travels through the mesh by osmosis. Heat from surrounding components of the core assembly causes the cooling fluid in the heat pipe to vaporize and flow through a vapor zone of the heat pipe. The vapor zone is enclosed within and concentric with the liquid zone, in an embodiment. Cooling fluid then causes the vapor to condense and release latent heat through the cooling area. In general, any suitable fluid may be used as the cooling fluid in accordance with the requirements of a particular design.

3.3. Example Cable Adapters

Figure 21A:
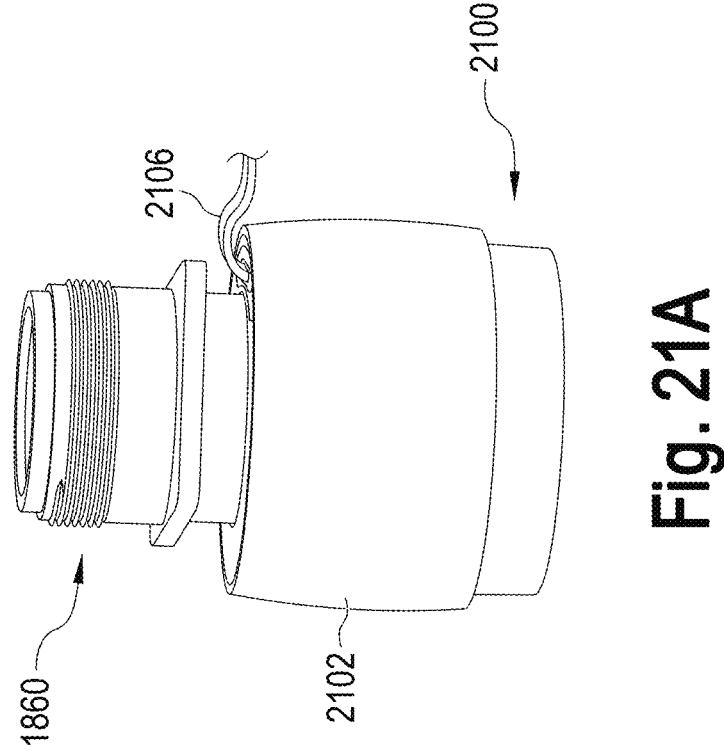
FIG. 21A is a perspective view of another embodiment of the apparatus of FIG. 18F1 in an assembled form, including a connected cable.
Figure 21C:
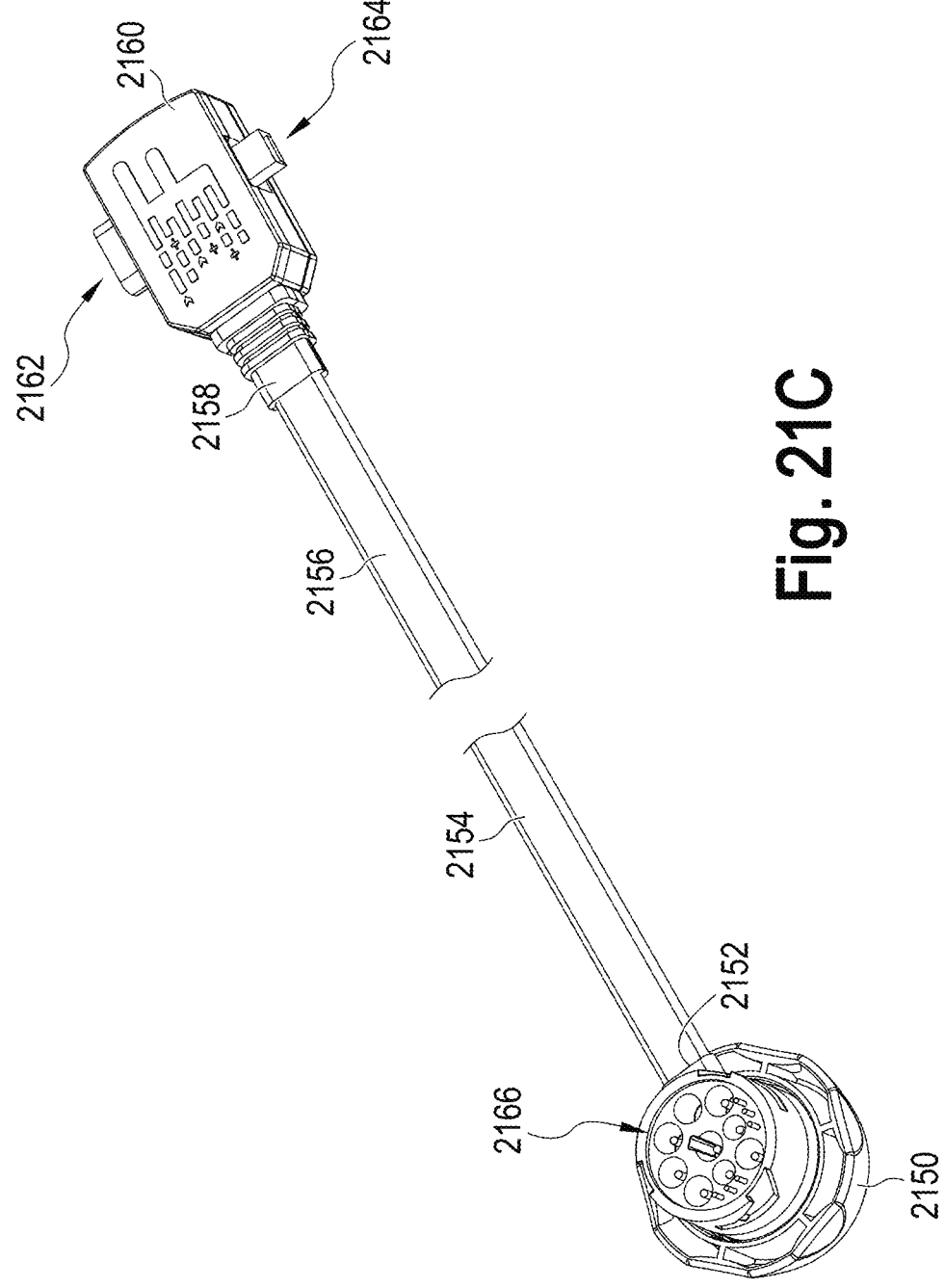
FIG. 21C is a perspective view of an adapter assembly including an adapter and a cable, with the cable shown having a portion cut away.
Figure 21D:
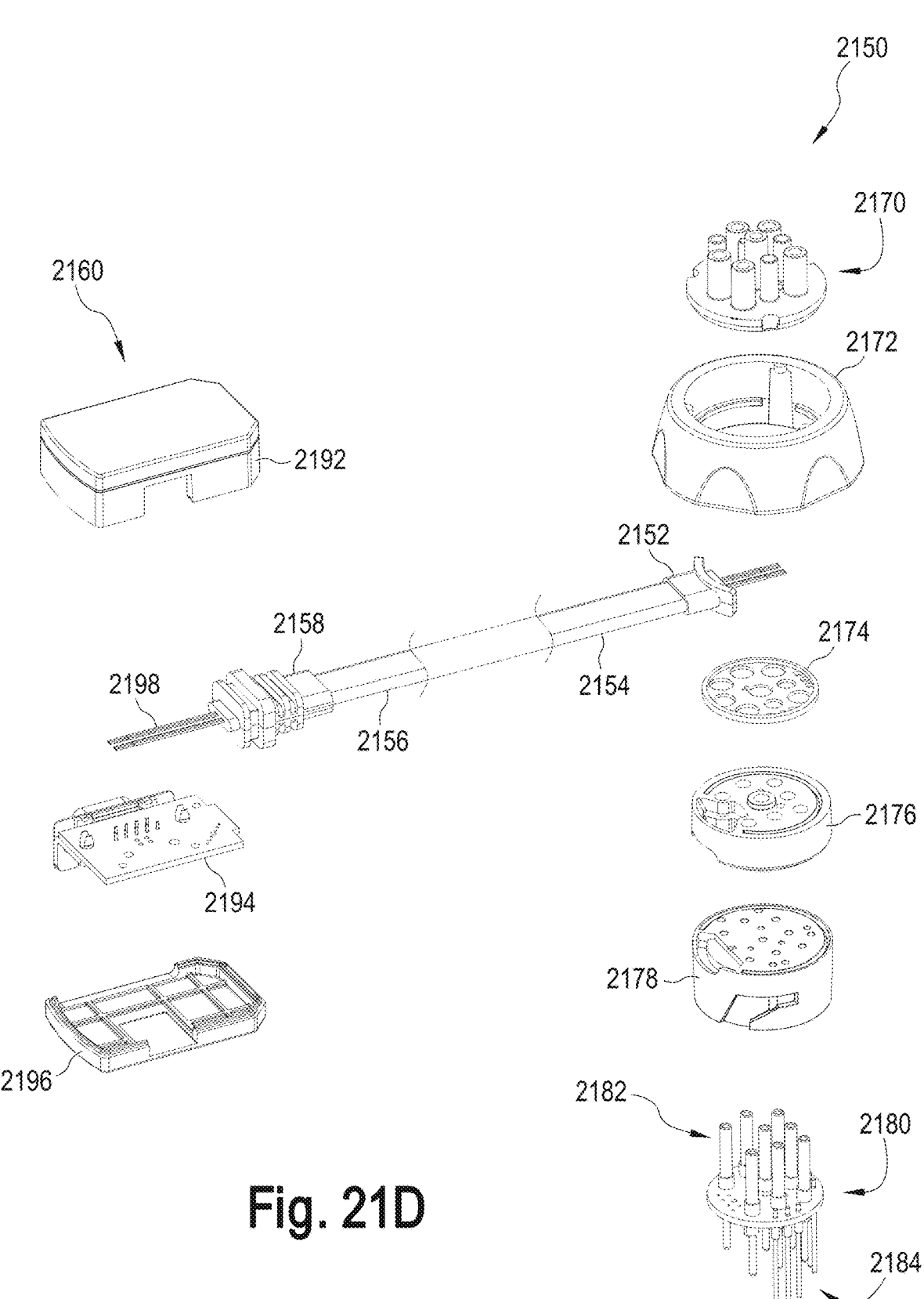
FIG. 21D is an exploded perspective view of the adapter assembly of FIG. 21C.

FIG. 21A is a perspective view of another embodiment of the apparatus of FIG. 18F1 in an assembled form, including a connected cable. Apparatus 2100 is shown coupled to connector 1860 of a vehicle or agricultural implement. Housing 2102 is similar to housing 1858 and encircles or encloses a variation of adapter 1870 in which cable 2106 connects to the adapter in a different manner than shown in FIG. 18F1.

FIG. 21B is a perspective view of an implement-side connector portion of the embodiment of FIG. 21A. As shown in FIG. 21B, an arcuately-shaped or crescent-shaped overmold 2108 is coupled to an end of cable 2106 and mates with a corresponding slot of adapter surface 2104. Overmold 2108 establishes electrical connectivity with the adapter using a set of rolling pins and corresponding circular traces in a similar manner as shown in FIG. 15A and FIG. 15B, described above. Adapter surface 2104 is adjacent to an implement-side connector sub-assembly 2101, which includes a set of pins 2112 and alignment posts 2110.

FIG. 21C is a perspective view of an adapter cable assembly including an adapter and a cable, with the cable shown having a portion cut away. The adapter assembly of FIG. 21C includes an adapter body 2150, and an adapter cable coupled thereto, including a proximal end 2152 of the adapter cable, adapter cable portions 2154, 2156, a strain relief 2158, a housing or distal end 2160 of the adapter cable, and a set of serial communications interfaces supported by housing 2160, including, for example, an RS-232 connector 2162 and USB (Universal Serial Bus) connector 2164. A proximal end 2152 may be configured using, for example, a DEUTSCH style connector. When the adapter cable is coupled to adapter body 2150 and adapter body is coupled to both a wireless drive unit and a connector of a vehicle or agricultural implement, the adapter cable enables bi-directional electronic communications between devices that may be connected to either or both of connectors 2162, 2164, and the wireless drive unit and/or the connector of the vehicle or agricultural implement.

FIG. 21D is an exploded perspective view of the adapter cable assembly of FIG. 21C, shown in a reverse orientation relative to FIG. 21C. The exploded view of adapter 2150 shows components of the implement-side connector 2166, which are supported by adapter body portions 2172, 2174, 2176, 2178. The components of the implement-side connector 2166 include a set of pins 2182 and alignment posts 2170. Pins 2182 are supported by a first side of a substrate 2180 while another set of pins 2184 are supported by a second side of substrate 2180 which opposes the first side of substrate 2180. Pins 2184 are part of a drive unit-side connector assembly.

Pins 2182 are configured to achieve electrical communication with a connector of a vehicle or agricultural implement while pins 2184 are configured to achieve electrical communication with a wireless drive unit as described herein. Pins 2182, 2184 are correspondingly coupled to or aligned with one another via substrate 2180 to achieve serial communication between electronic devices that may be connected to connectors 2162, 2164, such as display devices, cab computers and/or other computing devices that may be located in or on a vehicle or an agricultural implement or vehicle, and wireless drive unit and/or the vehicle or agricultural implement to which the wireless drive unit is connected. In an embodiment, pins 2182 are serial pins configured for both RS-232 and USB connectivity with the wireless drive unit. Distal end housing 2160 of adapter cable 2154, 2156 includes outer housing portions 2192, 2196, substrate 2194, and electrical connectors 2198.

Figure 21E:
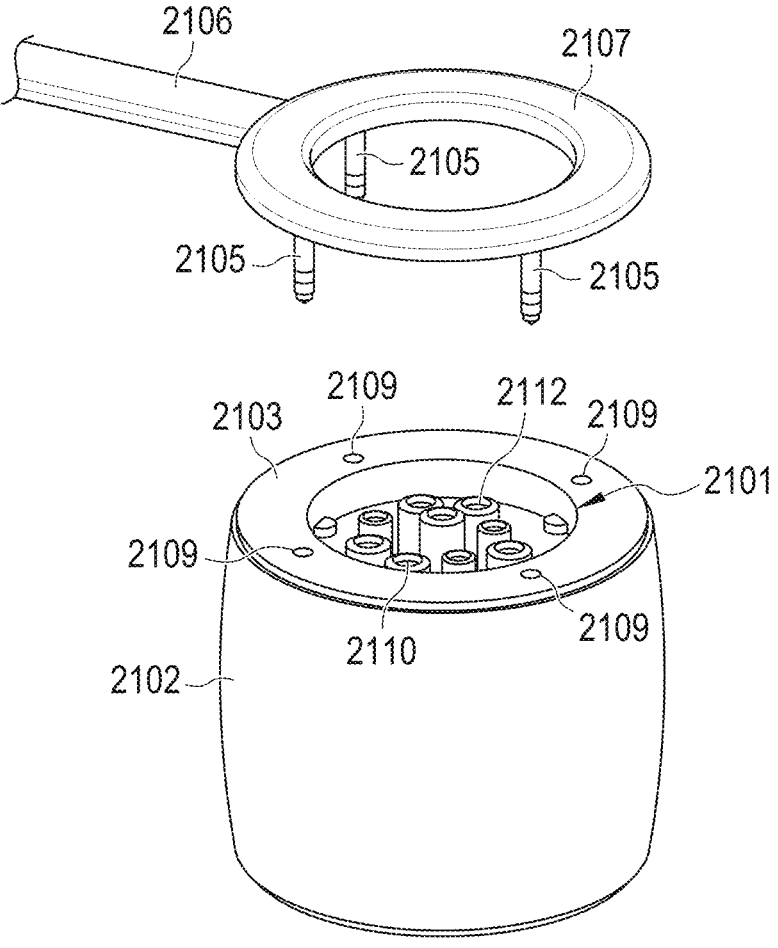
FIG. 21E is a perspective view of another embodiment of an adapter assembly.

FIG. 21E is a perspective view of another embodiment of an adapter assembly similar to the adapter assembly of FIGS. 15A and 15B and the adapter assembly of FIGS. 21A and 21B, using a different variation of the serial connection. In FIG. 21E, outer housing 2102 encloses the components of a wireless drive unit including implement-side connector sub-assembly 2101. Housing 2012 has an inner sleeve having a surface 2103. Annular or donut-shaped surface 2103 contains a set of circular traces arranged about a circumference of surface 2013 to receive or mate with corresponding pins 2105. Pins 2105 are similarly arranged about a circumference of annular adapter member 2107 to which adapter cable 2106 is attached. Whereas the arrangement of the adapter assembly of FIGS. 21A and 21B may contain a larger number of pins (for example, 7 pins) positioned close to one another within the recess defined in the inner sleeve that receives the arcuately- or crescent-shaped overmold, the adapter assembly of FIG. 21E utilizes a smaller number of pins (for example, 4 pins) that are spaced further apart from one another and are located outside of the inner sleeve.

3.4. Example Antenna Structure

Figure 22:
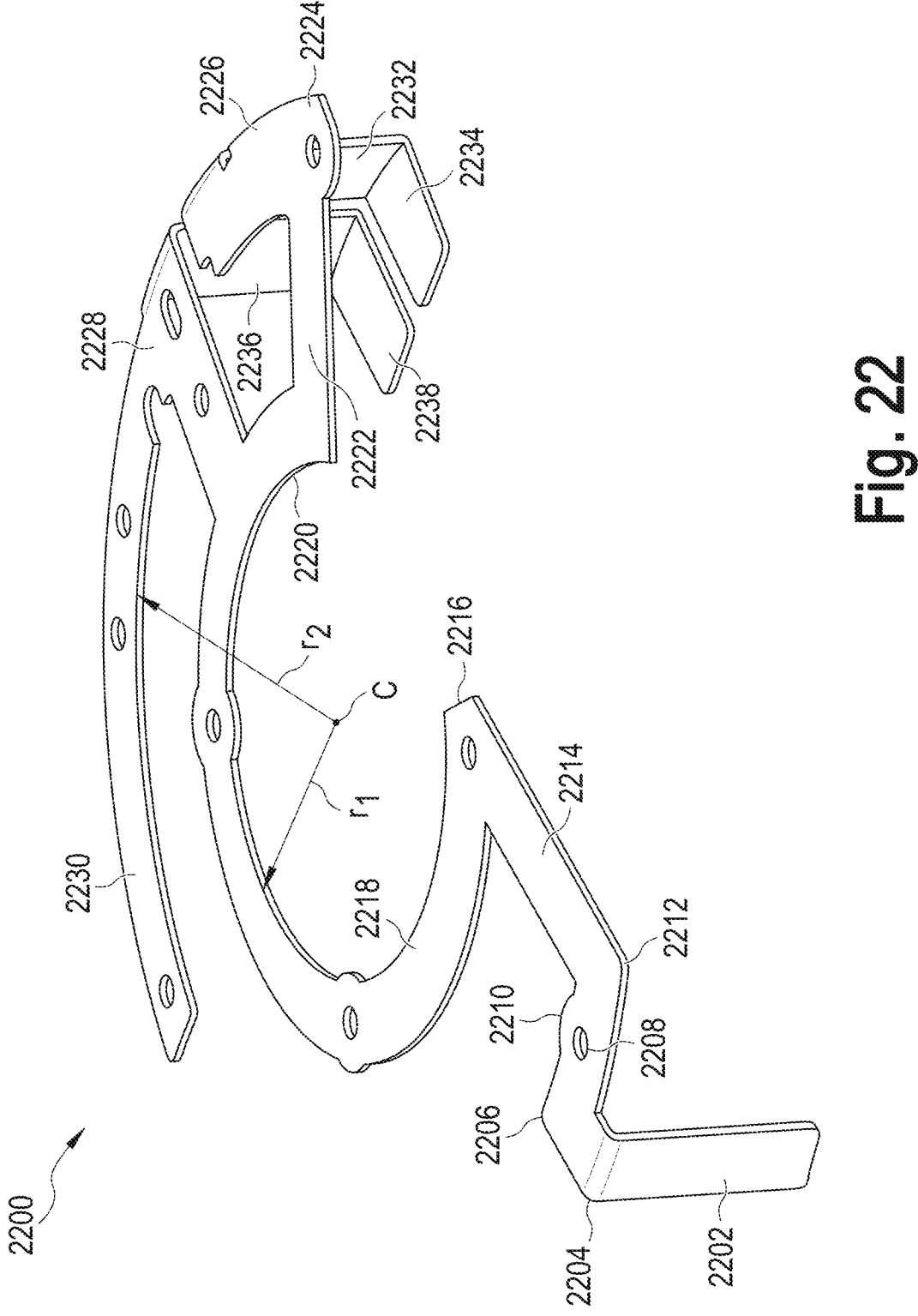
FIG. 22 is a perspective view of another embodiment of the antenna of FIG. 10F.

FIG. 22 is a perspective view of another embodiment of the antenna of FIG. 10F. As regarding the various embodiments of antennae disclosed herein, terminology used to refer to portions of one embodiment may be used interchangeably to refer to similar portions of any other embodiment. Antenna 2200 is constructed using an electrically conductive material and, in an embodiment, is a single integral piece. Antenna 2200 includes a tail element 2202, finger elements 2234, 2238, arcuate elements 2218, 2220, 2230, 2226, and non-arcuate elements 2210, 2214, 2222, 2228, 2236, 2232 located between finger elements 2234, 2238 and tail element 2202. Tail element 2202 is orthogonal to both the finger elements 2234, 2238 and the arcuate elements 2218, 2220, 2230, 2226. Arcuate elements 2218, 2220, 2230, 2226 are not coplanar with finger elements 2234, 2238.

When antenna 2200 is installed in a wireless drive unit as described herein, each of finger elements 2234, 2238 is coupled to the first integrated circuit and capable of transmitting and receiving signals of a different radio frequency. Tail element 2202 is aligned with but spaced from concavely-shaped portion 1854 of electrical and thermal shield 1820, so that tail element 2202 is not in physical contact with concavely-shaped portion 1854 when the wireless drive unit is assembled.

Arcuate elements 2218, 2220, 2230, 2226 are coupled to or integral with non-arcuate elements non-arcuate elements 2210, 2214, 2222, 2228, 2236, 2232. Arcuate elements 2218, 2220, 2230, 2226 are coplanar with non-arcuate elements 2210, 2214, 2222, 2228. Non-arcuate elements 2232, 2236 are orthogonal to finger elements 2234, 2238 and couple finger elements 2234, 2238 to the coplanar portions of antenna 2200. Arcuate element 2230 is concentrically arranged with either or both of arcuate elements 2218, 2220 such that a radius $r_1$ extending from an imaginary center point C to arcuate element 2218 or 2220 is shorter in length than a radius $r_2$ similarly extending from the center point C to arcuate element 2230 or 2226.

A joint 2204 couples tail element 2202 orthogonally to corner portion 2206. Non-arcuate element 2210 couples corner portion 2206 to corner portion 2212. Non-arcuate element 2210 includes an aperture 2208 through which a fastener may be inserted to secure antenna 2200 to a housing, such as the cap 1832, of the core assembly. Corner portion 2212 couples non-arcuate element 2210 to non-arcuate element 2214 at an angle in the range of about 90 degrees. Corner portion 2216 couples non-arcuate element 2214 to arcuate element 2218 at approximately an acute angle. The dimensions of the various sub-elements of antenna 2200 to conform to the form factor of the core assembly and are variable to adapt to various configurations of the core assembly. For example, in an embodiment, a width of the various sub-elements is in the range of about 4 millimeters plus or minus about 0.1 millimeters, and a thickness of the various sub-elements is in the range of about $8/1000$ to $10/1000$ of an inch.

Each finger 2234, 2238 essentially corresponds to a different antenna that has a different length. A first length extending from an end of finger 2234 to an end of tail element 2202 defines a first length, which is configured to achieve a first set of frequency and resonance performance requirements. A second length extending from an end of finger 2238 to an end of arcuate element 2230 defines a second length, which is configured to achieve a second set of frequency and resonance performance requirements. In general, varying the width, thickness, or length of any element of antenna 2200 can alter the RF performance or adapt the antenna to a different frequency band.

4. EXAMPLE AGRICULTURAL INTELLIGENCE COMPUTER SYSTEM

4.1. Structural Overview

FIG. 23 illustrates an example computer system that is configured to perform the functions described herein, shown in a field environment with other apparatus with which the system may interoperate. In one embodiment, a user 2302 owns, operates or possesses a field manager computing device 2304 in a field location or associated with a field location such as a field intended for agricultural activities or a management location for one or more agricultural fields. The field manager computing device 2304 is programmed or configured to provide field data 2306 to a vehicle or an agricultural intelligence computer system 2330 via one or more networks 2309.

Examples of field data 2306 include (a) identification data (for example, acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range), (b) harvest data (for example, crop type, crop variety, crop rotation, whether the crop is grown organically, harvest date, Actual Production History (APH), expected yield, yield, crop price, crop revenue, grain moisture, tillage practice, and previous growing season information), (c) soil data (for example, type, composition, pH, organic matter (OM), cation exchange capacity (CEC)), (d) planting data (for example, planting date, seed(s) type, relative maturity (RM) of planted seed(s), seed population), (e) fertilizer data (for example, nutrient type (Nitrogen, Phosphorous, Potassium), application type, application date, amount, source, method), (f) chemical application data (for example, pesticide, herbicide, fungicide, other substance or mixture of substances intended for use as a plant regulator, defoliant, or desiccant, application date, amount, source, method), (g) irrigation data (for example, application date, amount, source, method), (h) weather data (for example, precipitation, rainfall rate, predicted rainfall, water runoff rate region, temperature, wind, forecast, pressure, visibility, clouds, heat index, dew point, humidity, snow depth, air quality, sunrise, sunset), (i) imagery data (for example, imagery and light spectrum information from a vehicle or an agricultural apparatus sensor, camera, computer, smartphone, tablet, unmanned aerial vehicle, planes or satellite), (j) scouting observations (photos, videos, free form notes, voice recordings, voice transcriptions, weather conditions (temperature, precipitation (current and over time), soil moisture, crop growth stage, wind velocity, relative humidity, dew point, black layer)), and (k) soil, seed, crop phenology, pest and disease reporting, and predictions sources and databases.

A data server computer 2308 is communicatively coupled to the agricultural intelligence computer system 2330 and is programmed or configured to send external data 2310 to the agricultural intelligence computer system 2330 via the network(s) 2309. The external data server computer 2308 may be owned or operated by the same legal person or entity as the agricultural intelligence computer system 2330, or by a different person or entity such as a government agency, non-governmental organization (NGO), and/or a private data service provider. Examples of external data include weather data, imagery data, soil data, or statistical data relating to crop yields, among others. External data 2310 may consist of the same type of information as field data 2306. In some embodiments, the external data 2310 is provided by an external data server 2308 owned by the same entity that owns and/or operates the agricultural intelligence computer system 2330. For example, the agricultural intelligence computer system 2330 may include a data server focused exclusively on a type of data that might otherwise be obtained from third party sources, such as weather data. In some embodiments, an external data server 2308 may actually be incorporated within the system 2330.

An agricultural apparatus 2311 may have one or more remote sensors 2312 fixed thereon, which sensors are communicatively coupled either directly or indirectly via agricultural apparatus 2311 to the agricultural intelligence computer system 2330 and are programmed or configured to send sensor data to agricultural intelligence computer system 2330. Examples of agricultural apparatus 2311 include tractors, combines, harvesters, planters, trucks, fertilizer equipment, aerial vehicles including unmanned aerial vehicles, and any other item of physical machinery or hardware, typically mobile machinery, and which may be used in tasks associated with agriculture. In some embodiments, a single unit of apparatus 2311 may comprise a plurality of sensors 2312 that are coupled locally in a network on the apparatus; controller area network (CAN) is example of such a network that can be installed in combines, harvesters, sprayers, and cultivators. Application controller 2314 is communicatively coupled to agricultural intelligence computer system 2330 via the network(s) 2309 and is programmed or configured to receive one or more scripts that are used to control an operating parameter of an agricultural vehicle or implement from the agricultural intelligence computer system 2330. For instance, a controller area network (CAN) bus interface may be used to enable communications from the agricultural intelligence computer system 2330 to the agricultural apparatus 2311, such as how any of the disclosed embodiments of wireless drive units, including but not limited to wireless drive unit 14, wireless drive unit 1800 and/or the CLIMATE FIELDVIEW DRIVE, available from The Climate Corporation, San Francisco, California, are used. Sensor data may consist of the same type of information as field data 2306. In some embodiments, remote sensors 2312 may not be fixed to an agricultural apparatus 2311 but may be remotely located in the field and may communicate with network(s) 2309.

The apparatus 2311 may comprise a cab computer 2315 that is programmed with a cab application, which may comprise a version or variant of the mobile application for device 2304 that is further described in other sections herein. In an embodiment, cab computer 2315 comprises a compact computer, often a tablet-sized computer or smartphone, with a graphical screen display, such as a color display, that is mounted within an operator's cab of the apparatus 2311. Cab computer 2315 may implement some or all of the operations and functions that are described further herein for the mobile computer device 2304.

The network(s) 2309 broadly represent any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The sensors 2312, controller 2314, external data server computer 2308, and other elements of the system each comprise an interface compatible with the network(s) 2309 and are programmed or configured to use standardized protocols for communication across the networks such as TCP/IP, Bluetooth, CAN protocol and higher-layer protocols such as HTTP, TLS, and the like.

Agricultural intelligence computer system 2330 is programmed or configured to receive field data 2306 from field manager computing device 2304, external data 2310 from external data server computer 2308, and sensor data from remote sensor 2312. Agricultural intelligence computer system 2330 may be further configured to host, use or execute one or more computer programs, other software elements, digitally programmed logic such as FPGAs or ASICs, or any combination thereof to perform translation and storage of data values, construction of digital models of one or more crops on one or more fields, generation of recommendations and notifications, and generation and sending of scripts to application controller 2314, in the manner described further in other sections of this disclosure.

In an embodiment, agricultural intelligence computer system 2330 is programmed with or comprises a communication layer 2332, presentation layer 2334, data management layer 2340, hardware/virtualization layer 2350, and model and field data repository 2360. "Layer," in this context, refers to any combination of electronic digital interface circuits, microcontrollers, firmware such as drivers, and/or computer programs or other software elements.

Communication layer 2332 may be programmed or configured to perform input/output interfacing functions including sending requests to field manager computing device 2304, external data server computer 2308, and remote sensor 2312 for field data, external data, and sensor data respectively. Communication layer 2332 may be programmed or configured to send the received data to model and field data repository 2360 to be stored as field data 2306.

Presentation layer 2334 may be programmed or configured to generate a graphical user interface (GUI) to be displayed on field manager computing device 2304, cab computer 2315 or other computers that are coupled to the system 2330 through the network(s) 2309. The GUI may comprise controls for inputting data to be sent to agricultural intelligence computer system 2330, generating requests for models and/or recommendations, and/or displaying recommendations, notifications, models, and other field data.

Data management layer 2340 may be programmed or configured to manage read operations and write operations involving the repository 2360 and other functional elements of the system, including queries and result sets communicated between the functional elements of the system and the repository. Examples of data management layer 2340 include JDBC, SQL server interface code, and/or HADOOP interface code, among others. Repository 2360 may comprise a database. As used herein, the term "database" may refer to either a body of data, a relational database management system (RDBMS), or to both. As used herein, a database may comprise any collection of data including hierarchical databases, relational databases, flat file databases, object-relational databases, object oriented databases, distributed databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

When field data 2306 is not provided directly to the agricultural intelligence computer system via one or more agricultural machines or agricultural machine devices that interacts with the agricultural intelligence computer system, the user may be prompted via one or more user interfaces on the user device (served by the agricultural intelligence computer system) to input such information. In an example embodiment, the user may specify identification data by accessing a map on the user device (served by the agricultural intelligence computer system) and selecting specific CLUs that have been graphically shown on the map. In an alternative embodiment, the user 2302 may specify identification data by accessing a map on the user device (served by the agricultural intelligence computer system 2330) and drawing boundaries of the field over the map. Such CLU selection or map drawings represent geographic identifiers. In alternative embodiments, the user may specify identification data by accessing field identification data (provided as shape files or in a similar format) from the U.S. Department of Agriculture Farm Service Agency or other source via the user device and providing such field identification data to the agricultural intelligence computer system.

In an example embodiment, the agricultural intelligence computer system 2330 is programmed to generate and cause displaying a graphical user interface comprising a data manager for data input. After one or more fields have been identified using the methods described above, the data manager may provide one or more graphical user interface widgets which when selected can identify changes to the field, soil, crops, tillage, or nutrient practices. The data manager may include a timeline view, a spreadsheet view, and/or one or more editable programs.

Hardware/virtualization layer 2350 comprises one or more central processing units (CPUs), memory controllers, and other devices, components, or elements of a computer system such as volatile or non-volatile memory, non-volatile storage such as disk, and I/O devices or interfaces as illustrated and described, for example, in connection with FIG. 4. The layer 2350 also may comprise programmed instructions that are configured to support virtualization, containerization, or other technologies.

For purposes of illustrating a clear example, FIG. 1 shows a limited number of instances of certain functional elements. However, in other embodiments, there may be any number of such elements. For example, embodiments may use thousands or millions of different mobile computing devices 2304 associated with different users. Further, the system 2330 and/or external data server computer 2308 may be implemented using two or more processors, cores, clusters, or instances of physical machines or virtual machines, configured in a discrete location or co-located with other elements in a datacenter, shared computing facility or cloud computing facility.

4.2. Application Program Overview

In an embodiment, the implementation of the functions described herein using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

In an embodiment, user 2302 interacts with agricultural intelligence computer system 2330 using field manager computing device 2304 configured with an operating system and one or more application programs or apps; the field manager computing device 2304 also may interoperate with the agricultural intelligence computer system independently and automatically under program control or logical control and direct user interaction is not always required. Field manager computing device 2304 broadly represents one or more of a smartphone, PDA, tablet computing device, laptop computer, desktop computer, workstation, or any other computing device capable of transmitting and receiving information and performing the functions described herein. Field manager computing device 2304 may communicate via a network using a mobile application stored on field manager computing device 2304, and in some embodiments, the device may be coupled using a cable 2313 or connector to the sensor 2312 and/or controller 2314. A particular user 2302 may own, operate or possess and use, in connection with system 2330, more than one field manager computing device 2304 at a time.

The mobile application may provide client-side functionality, via the network to one or more mobile computing devices. In an example embodiment, field manager computing device 2304 may access the mobile application via a web browser or a local client application or app. Field manager computing device 2304 may transmit data to, and receive data from, one or more front-end servers, using web-based protocols or formats such as HTTP, XML and/or JSON, or app-specific protocols. In an example embodiment, the data may take the form of requests and user information input, such as field data, into the mobile computing device. In some embodiments, the mobile application interacts with location tracking hardware and software on field manager computing device 2304 which determines the location of field manager computing device 2304 using standard tracking techniques such as multilateration of radio signals, the global positioning system (GPS), Wi-Fi positioning systems, or other methods of mobile positioning. In some cases, location data or other data associated with the device 2304, user 2302, and/or user account(s) may be obtained by queries to an operating system of the device or by requesting an app on the device to obtain data from the operating system.

In an embodiment, field manager computing device 2304 sends field data 2306 to agricultural intelligence computer system 2330 comprising or including, but not limited to, data values representing one or more of: a geographical location of the one or more fields, tillage information for the one or more fields, crops planted in the one or more fields, and soil data extracted from the one or more fields. Field manager computing device 2304 may send field data 2306 in response to user input from user 2302 specifying the data values for the one or more fields. Additionally, field manager computing device 2304 may automatically send field data 2306 when one or more of the data values becomes available to field manager computing device 2304. For example, field manager computing device 2304 may be communicatively coupled to remote sensor 2312 and/or application controller 2314 which include an irrigation sensor and/or irrigation controller. In response to receiving data indicating that application controller 2314 released water onto the one or more fields, field manager computing device 2304 may send field data 2306 to agricultural intelligence computer system 2330 indicating that water was released on the one or more fields. Field data 2306 identified in this disclosure may be input and communicated using electronic digital data that is communicated between computing devices using parameterized URLs over HTTP, or another suitable communication or messaging protocol.

A commercial example of the mobile application is CLIMATE FIELDVIEW, commercially available from The Climate Corporation, San Francisco, California. The CLIMATE FIELDVIEW application, or other applications, may be modified, extended, or adapted to include features, functions, and programming that have not been disclosed earlier than the filing date of this disclosure. In one embodiment, the mobile application comprises an integrated software platform that allows a grower to make fact-based decisions for their operation because it combines historical data about the grower's fields with any other data that the grower wishes to compare. The combinations and comparisons may be performed in real time and are based upon scientific models that provide potential scenarios to permit the grower to make better, more informed decisions.

4.3. Data Ingest to the Computer System

In an embodiment, external data server computer 2308 stores external data 2310, including soil data representing soil composition for the one or more fields and weather data representing temperature and precipitation on the one or more fields. The weather data may include past and present weather data as well as forecasts for future weather data. In an embodiment, external data server computer 2308 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil.

In an embodiment, remote sensor 2312 comprises one or more sensors that are programmed or configured to produce one or more observations. Remote sensor 2312 may be aerial sensors, such as satellites, vehicle sensors, planting equipment sensors, tillage sensors, fertilizer or insecticide application sensors, harvester sensors, and any other implement capable of receiving data from the one or more fields. In an embodiment, application controller 2314 is programmed or configured to receive instructions from agricultural intelligence computer system 2330. Application controller 2314 may also be programmed or configured to control an operating parameter of an agricultural vehicle or implement. For example, an application controller may be programmed or configured to control an operating parameter of a vehicle, such as a tractor, planting equipment, tillage equipment, fertilizer or insecticide equipment, harvester equipment, or other farm implements such as a water valve. Other embodiments may use any combination of sensors and controllers, of which the following are merely selected examples.

The system 2330 may obtain or ingest data under user 2302 control, on a mass basis from a large number of growers who have contributed data to a shared database system. This form of obtaining data may be termed "manual data ingest" as one or more user-controlled computer operations are requested or triggered to obtain data for use by the system 2330. As an example, the CLIMATE FIELDVIEW application, commercially available from The Climate Corporation, San Francisco, California, may be operated to export data to system 2330 for storing in the repository 2360.

For example, seed monitor systems can both control planter apparatus components and obtain planting data, including signals from seed sensors via a signal harness that comprises a CAN backbone and point-to-point connections for registration and/or diagnostics. Seed monitor systems can be programmed or configured to display seed spacing, population and other information to the user via the cab computer 2315 or other devices within the system 2330. Examples are disclosed in U.S. Pat. No. 8,738,243 and US Pat. Pub. 20150094916, and the present disclosure assumes knowledge of those other patent disclosures.

Likewise, yield monitor systems may contain yield sensors for harvester apparatus that send yield measurement data to the cab computer 2315 or other devices within the system 2330. Yield monitor systems may utilize one or more remote sensors 2312 to obtain grain moisture measurements in a combine or other harvester and transmit these measurements to the user via the cab computer 2315 or other devices within the system 2330.

In an embodiment, examples of sensors 2312 that may be used with any moving vehicle or apparatus of the type described elsewhere herein include kinematic sensors and position sensors. Kinematic sensors may comprise any of speed sensors such as radar or wheel speed sensors, accelerometers, or gyros. Position sensors may comprise GPS receivers or transceivers, or Wi-Fi-based position or mapping apps that are programmed to determine location based upon nearby Wi-Fi hotspots, among others.

In an embodiment, examples of sensors 2312 that may be used with tractors or other moving vehicles include engine speed sensors, fuel consumption sensors, area counters or distance counters that interact with GPS or radar signals, PTO (power take-off) speed sensors, tractor hydraulics sensors configured to detect hydraulics parameters such as pressure or flow, and/or and hydraulic pump speed, wheel speed sensors or wheel slippage sensors. In an embodiment, examples of controllers 2314 that may be used with tractors include hydraulic directional controllers, pressure controllers, and/or flow controllers; hydraulic pump speed controllers; speed controllers or governors; hitch position controllers; or wheel position controllers provide automatic steering.

In an embodiment, examples of sensors 2312 that may be used with seed planting equipment such as planters, drills, or air seeders include seed sensors, which may be optical, electromagnetic, or impact sensors; downforce sensors such as load pins, load cells, pressure sensors; soil property sensors such as reflectivity sensors, moisture sensors, electrical conductivity sensors, optical residue sensors, or temperature sensors; component operating criteria sensors such as planting depth sensors, downforce cylinder pressure sensors, seed disc speed sensors, seed drive motor encoders, seed conveyor system speed sensors, or vacuum level sensors; or pesticide application sensors such as optical or other electromagnetic sensors, or impact sensors. In an embodiment, examples of controllers 2314 that may be used with such seed planting equipment include: toolbar fold controllers, such as controllers for valves associated with hydraulic cylinders; downforce controllers, such as controllers for valves associated with pneumatic cylinders, airbags, or hydraulic cylinders, and programmed for applying downforce to individual row units or an entire planter frame; planting depth controllers, such as linear actuators; metering controllers, such as electric seed meter drive motors, hydraulic seed meter drive motors, or swath control clutches; hybrid selection controllers, such as seed meter drive motors, or other actuators programmed for selectively allowing or preventing seed or an air-seed mixture from delivering seed to or from seed meters or central bulk hoppers; metering controllers, such as electric seed meter drive motors, or hydraulic seed meter drive motors; seed conveyor system controllers, such as controllers for a belt seed delivery conveyor motor; marker controllers, such as a controller for a pneumatic or hydraulic actuator; or pesticide application rate controllers, such as metering drive controllers, orifice size or position controllers.

In an embodiment, examples of sensors 2312 that may be used with tillage equipment include position sensors for tools such as shanks or discs; tool position sensors for such tools that are configured to detect depth, gang angle, or lateral spacing; downforce sensors; or draft force sensors. In an embodiment, examples of controllers 2314 that may be used with tillage equipment include downforce controllers or tool position controllers, such as controllers configured to control tool depth, gang angle, or lateral spacing.

In an embodiment, examples of sensors 2312 that may be used in relation to apparatus for applying fertilizer, insecticide, fungicide and the like, such as on-planter starter fertilizer systems, subsoil fertilizer applicators, or fertilizer sprayers, include: fluid system criteria sensors, such as flow sensors or pressure sensors; sensors indicating which spray head valves or fluid line valves are open; sensors associated with tanks, such as fill level sensors; sectional or system-wide supply line sensors, or row-specific supply line sensors; or kinematic sensors such as accelerometers disposed on sprayer booms. In an embodiment, examples of controllers 2314 that may be used with such apparatus include pump speed controllers; valve controllers that are programmed to control pressure, flow, direction, pulse width modulation (PWM) and the like; or position actuators, such as for boom height, subsoiler depth, or boom position.

In an embodiment, examples of sensors 2312 that may be used with harvesters include yield monitors, such as impact plate strain gauges or position sensors, capacitive flow sensors, load sensors, weight sensors, or torque sensors associated with elevators or augers, or optical or other electromagnetic grain height sensors; grain moisture sensors, such as capacitive sensors; grain loss sensors, including impact, optical, or capacitive sensors; header operating criteria sensors such as header height, header type, deck plate gap, feeder speed, and reel speed sensors; separator operating criteria sensors, such as concave clearance, rotor speed, shoe clearance, or chaffer clearance sensors; auger sensors for position, operation, or speed; or engine speed sensors. In an embodiment, examples of controllers 2314 that may be used with harvesters include header operating criteria controllers for elements such as header height, header type, deck plate gap, feeder speed, or reel speed; separator operating criteria controllers for features such as concave clearance, rotor speed, shoe clearance, or chaffer clearance; or controllers for auger position, operation, or speed.

In an embodiment, examples of sensors 2312 that may be used with grain carts include weight sensors, or sensors for auger position, operation, or speed. In an embodiment, examples of controllers 2314 that may be used with grain carts include controllers for auger position, operation, or speed.

In an embodiment, examples of sensors 2312 and controllers 2314 may be installed in unmanned aerial vehicle (UAV) apparatus or "drones." Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus; other electromagnetic radiation emitters and reflected electromagnetic radiation detection apparatus. Such controllers may include guidance or motor control apparatus, control surface controllers, camera controllers, or controllers programmed to turn on, operate, obtain data from, manage and configure any of the foregoing sensors. Examples are disclosed in U.S. Pat. No. 9,922,405 and the present disclosure assumes knowledge of that other patent disclosure.

In an embodiment, sensors 2312 and controllers 2314 may be affixed to soil sampling and measurement apparatus that is configured or programmed to sample soil and perform soil chemistry tests, soil moisture tests, and other tests pertaining to soil. For example, the apparatus disclosed in U.S. Pat. Nos. 8,767,194 and 8,712,148 may be used, and the present disclosure assumes knowledge of those patent disclosures.

In an embodiment, sensors 2312 and controllers 2314 may comprise weather devices for monitoring weather conditions of fields. For example, the apparatus disclosed in International Publication No. WO2016/176355 may be used, and the present disclosure assumes knowledge of those patent disclosures.

5. IMPLEMENTATION EXAMPLE-HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 24:
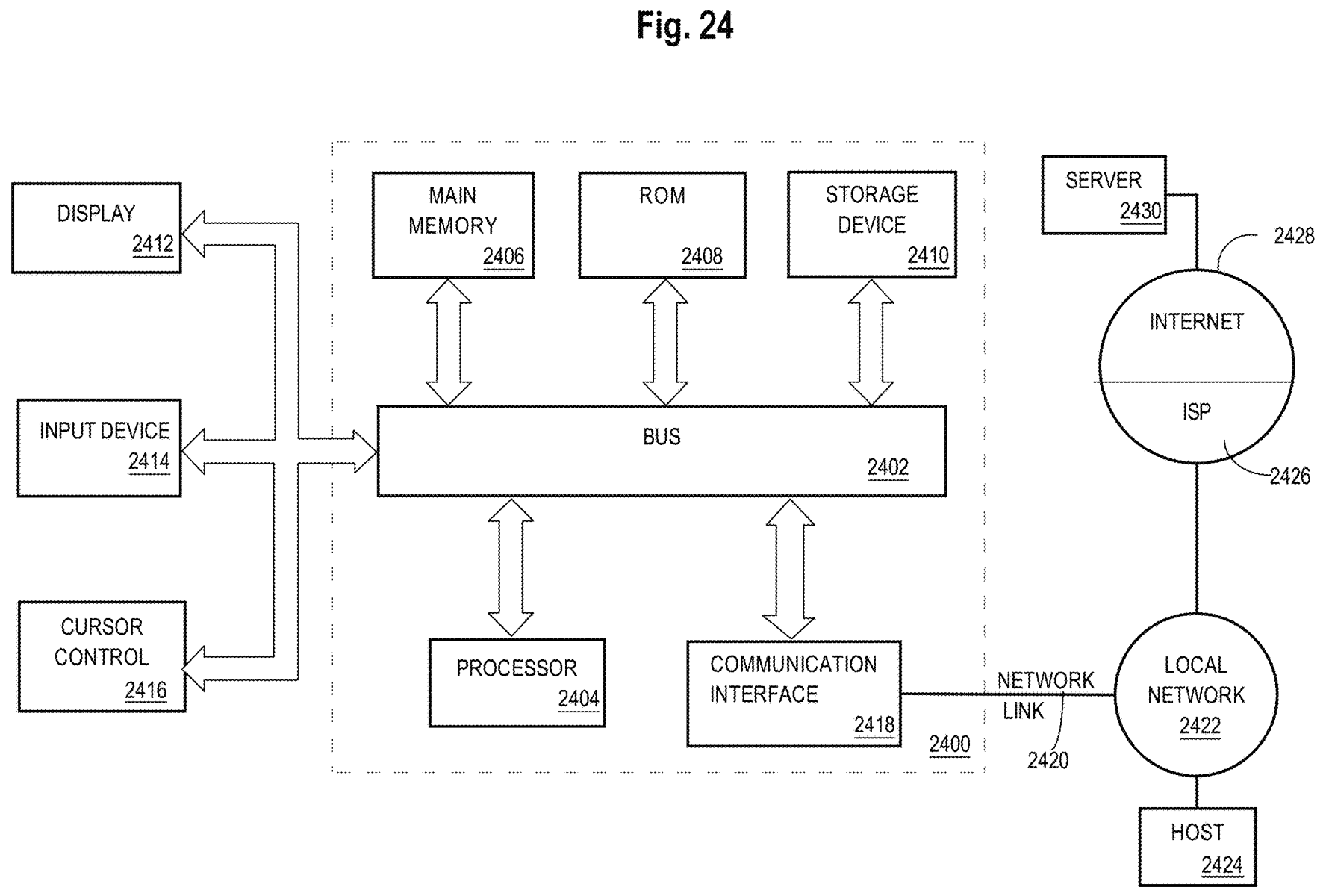

For example, FIG. 24 is a block diagram that illustrates a computer system 2400 upon which an embodiment of the invention may be implemented. Computer system 2400 includes a bus 2402 or other communication mechanism for communicating information, and a hardware processor 2404 coupled with bus 2402 for processing information. Hardware processor 2404 may be, for example, a general purpose microprocessor.

Computer system 2400 also includes a main memory 2406, such as a random access memory (RAM) or other dynamic storage device, coupled to bus 2402 for storing information and instructions to be executed by processor 2404. Main memory 2406 also may be used for storing temporary variables or other intermediate information during execution of instructions to be executed by processor 2404. Such instructions, when stored in non-transitory storage media accessible to processor 2404, render computer system 2400 into a special-purpose machine that is customized to perform the operations specified in the instructions.

Computer system 2400 further includes a read only memory (ROM) 2408 or other static storage device coupled to bus 2402 for storing static information and instructions for processor 2404. A storage device 2410, such as a magnetic disk, optical disk, or solid-state drive is provided and coupled to bus 2402 for storing information and instructions.

Computer system 2400 may be coupled via bus 2402 to a display 2412, such as a cathode ray tube (CRT), for displaying information to a computer user. An input device 2414, including alphanumeric and other keys, is coupled to bus 2402 for communicating information and command selections to processor 2404. Another type of user input device is cursor control 2416, such as a mouse, a trackball, or cursor direction keys for communicating direction information and command selections to processor 2404 and for controlling cursor movement on display 2412. This input device typically has two degrees of freedom in two axes, a first axis (e.g., x) and a second axis (e.g., y), that allows the device to specify positions in a plane.

Computer system 2400 may implement the techniques described herein using customized hard-wired logic, one or more ASICs or FPGAs, firmware and/or program logic which in combination with the computer system causes or programs computer system 2400 to be a special-purpose machine. According to one embodiment, the techniques herein are performed by computer system 2400 in response to processor 2404 executing one or more sequences of one or more instructions contained in main memory 2406. Such instructions may be read into main memory 2406 from another storage medium, such as storage device 2410. Execution of the sequences of instructions contained in main memory 2406 causes processor 2404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 2406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 2402. Transmission media can also take the form of acoustic or light waves, such as those generated during radio-wave and infrared data communications.

Various forms of media may be involved in carrying one or more sequences of one or more instructions to processor 2404 for execution. For example, the instructions may initially be carried on a magnetic disk or solid-state drive of a remote computer. The remote computer can load the instructions into its dynamic memory and send the instructions over a telephone line using a modem. A modem local to computer system 2400 can receive the data on the telephone line and use an infra-red transmitter to convert the data to an infra-red signal. An infra-red detector can receive the data carried in the infrared signal and appropriate circuitry can place the data on bus 402. Bus 2402 carries the data to main memory 2406, from which processor 2404 retrieves and executes the instructions. The instructions received by main memory 2406 may optionally be stored on storage device 410 either before or after execution by processor 2404.

Computer system 2400 also includes a communication interface 2418 coupled to bus 2402. Communication interface 2418 provides a two-way data communication coupling to a network link 2420 that is connected to a local network 2422. For example, communication interface 2418 may be an integrated services digital network (ISDN) card, cable modem, satellite modem, or a modem to provide a data communication connection to a corresponding type of telephone line. As another example, communication interface 2418 may be a local area network (LAN) card to provide a data communication connection to a compatible LAN. Wireless links may also be implemented. In any such implementation, communication interface 2418 sends and receives electrical, electromagnetic or optical signals that carry digital data streams representing various types of information.

Network link 2420 typically provides data communication through one or more networks to other data devices. For example, network link 2420 may provide a connection through local network 2422 to a host computer 2424 or to data equipment operated by an Internet Service Provider (ISP) 2426. ISP 2426 in turn provides data communication services through the world wide packet data communication network now commonly referred to as the "Internet" 2428. Local network 2422 and Internet 2428 both use electrical, electromagnetic or optical signals that carry digital data streams. The signals through the various networks and the signals on network link 2420 and through communication interface 2418, which carry the digital data to and from computer system 2400, are example forms of transmission media.

Computer system 2400 can send messages and receive data, including program code, through the network(s), network link 2420 and communication interface 2418. In the Internet example, a server 2430 might transmit a requested code for an application program through Internet 2428, ISP 2426, local network 2422 and communication interface 2418.

The received code may be executed by processor 2404 as it is received, and/or stored in storage device 2410, or other non-volatile storage for later execution.

6.0. ADDITIONAL EXAMPLES

Illustrative examples of the technologies disclosed herein are provided below. An embodiment of the technologies may include any of the examples or a combination of the described below.

An example 1 includes an apparatus for storing data and wirelessly communicating data between an agricultural implement and a computing device, including a non-conductive housing, a thermally and electrically conductive housing, a first interior region defined by the non-conductive housing and a first side of the thermally and electrically conductive housing, a connector sub-assembly, a second interior region defined by a second side of the thermally and electrically conductive housing and the connector sub-assembly, an antenna located in the first interior region, a first integrated circuit coupled to the antenna and located in the first interior region, at least a second integrated circuit located in the second interior region, at least one ground clip coupled to the connector sub-assembly, the second integrated circuit, and the thermally and electrically conductive housing, at least one mating connector coupled to the connector sub-assembly and arranged to communicatively couple with at least one connector of the vehicle or the agricultural implement, and memory coupled to the second integrated circuit and programmed to store, at least temporarily, digital data received from the agricultural implement or the computing device via the at least one connector of the vehicle or agricultural implement or via the antenna.

An example 2 includes the subject matter of example 1, the antenna comprising at least two coplanar finger elements each coupled to the first integrated circuit and capable of transmitting and receiving signals of a different radio frequency and a tail element orthogonal to the at least two coplanar finger elements. An example 3 includes the subject matter of example 1 or example 2, the antenna comprising at least two arcuate elements coupled to at least one non-arcuate element, wherein the at least two arcuate elements and the at least one non-arcuate element are coplanar. An example 4 includes the subject matter of any of examples 1-3, the at least two arcuate elements being concentrically arranged. An example 5 includes the subject matter of any of examples 1-4, the antenna comprising a first arcuate element, a second arcuate element, and an angled element that couples the first arcuate element to the second arcuate element at an angle that is less than or equal to ninety degrees; the first arcuate element, the second arcuate element, and the angled element being coplanar. An example 6 includes the subject matter of any of examples 1-5, the antenna comprising at least two finger elements each coupled to the first integrated circuit and capable of transmitting and receiving signals of a different radio frequency, a tail element, and an arcuate element located between the at least two finger elements and the tail element; the tail element being orthogonal to both the at least two finger elements and the arcuate element; the arcuate element not being coplanar with the at least two finger elements. An example 7 includes the subject matter of any of examples 1-6, the at least one ground clip comprising a first wall orthogonal to the first integrated circuit, a second wall orthogonal to a first end of the first wall, a contact coupled to the second wall, and a finger coupled to a second end of the first wall. An example 8 includes the subject matter of any of examples 1-7, the finger being electrically coupled to the thermally and electrically conductive housing, and the contact being electrically coupled to a ground terminal of the first integrated circuit. An example 9 includes the subject matter of any of examples 1-8, the at least one ground clip comprising one of a plurality of ground clips that are arranged concentrically about a perimeter of the connector sub-assembly. An example 10 includes the subject matter of any of examples 1-9, the first integrated circuit comprising circuitry for wireless data communication via the antenna; the thermally and electrically conductive housing comprising a metal chassis that acts as both a ground plane and a heat sink for the circuitry and the antenna. An example 11 includes the subject matter of any of examples 1-10, the first side of the thermally and electrically conductive housing comprising a concavely shaped edge adjacent to but not in contact with a tail element of the antenna. An example 12 includes the subject matter of any of examples 1-11, the connector sub-assembly comprising a first side and a second side opposing the first side, the at least one ground clip being coupled to the first side, and the at least one mating connector being coupled to the second side. An example 13 includes the subject matter of any of examples 1-12, the at least one mating connector comprising at least one female connector adapted to receive at least one male connector of the at least one connector of the vehicle or agricultural implement or at least one male connector of an adapter. An example 14 includes the subject matter of any of examples 1-13, further comprising a plurality of pins extending from the first side of the connector sub-assembly and electrically coupled to the second integrated circuit. An example 15 includes the subject matter of any of examples 1-14, further comprising a cooling element in the connector sub-assembly, the cooling element comprising at least one of a fan or a heat pipe and at least one fluid inlet. An example 16 includes the subject matter of any of examples 1-15, further comprising an adapter assembly comprising a first connector sub-assembly configured to mate with the at least one mating connector, a second connector sub-assembly configured to mate with the at least one connector of the vehicle or the agricultural implement, and at least one serial communication interface configured to receive a first end of a cable, the cable having a second end that comprises at least one coupler configured to couple to a display monitor or a computing device. An example 17 includes the subject matter of any of examples 1-16, the at least one serial communication interface comprising at least one circular trace configured to mate with at least one pin of the first end of the cable. An example 18 includes the subject matter of any of examples 1-17, the first end of the cable comprising an arcuately-shaped member or a circularly shaped member, the arcuately-shaped member or circularly shaped member configured to engage with the at least one serial communication interface. An example 19 includes the subject matter of any of examples 1-18, the apparatus being programmed to at least temporarily store, in the memory, at least one of a script to control an operating parameter of the agricultural implement or a digital communication received from an agricultural intelligence system or digital data received from at least one sensor coupled to the agricultural implement or digital data received from at least one field sensor.

In an example 20, an apparatus for storing data and communicating data between a vehicle or an agricultural implement and a computing device, includes a non-conductive housing, an antenna coupled to the non-conductive housing, a first integrated circuit coupled to the antenna, a thermally and electrically conductive housing coupled to the first integrated circuit, at least one ground clip coupled to the thermally and electrically conductive housing, at least one second integrated circuit coupled to the at least one ground clip, a memory coupled to the second integrated circuit and arranged to at least temporarily store digital communications between the agricultural implement and the computing device, and a connector communicatively coupled to the memory and arranged to mate with a connector of the vehicle or the agricultural implement, wherein the thermally and electrically conductive housing is disposed between the first integrated circuit and the at least one second integrated circuit to electromagnetically isolate the first integrated circuit from the second integrated circuit.

In an example 21, a method includes, by a wireless control unit, via an antenna disposed in a first inner portion of the wireless control unit, wirelessly receiving data from an agricultural intelligence computer system, storing the data in a memory located in a second inner portion of the wireless control unit that is electromagnetically isolated from the first inner portion, via an align, twist, and lock coupling mechanism of an outer portion of the wireless control unit, transmitting the data from the memory to an agricultural implement for display by a display device of the agricultural implement.

In an example 22, an apparatus includes a wireless drive unit, as shown and described in any one or more of the drawing figures and/or any one or more paragraphs of the description.

In an example 23, an apparatus includes a thermally and electrically conductive housing for a wireless drive unit, affixed to a non-conductive cap that permits admission of radio-frequency radiation to an antenna within the cap, as shown and described in any one or more of the drawing figures and/or any one or more paragraphs of the description. In an example 24, an apparatus includes an antenna, as shown and described in any one or more of the drawing figures and/or any one or more paragraphs of the description. In an example 25, an apparatus includes a multi-band radio-frequency antenna apparatus, as shown and described in any one or more of the drawing figures and/or any one or more paragraphs of the description. In an example 26, an apparatus includes a ground clip, as shown and described in any one or more of the drawing figures and/or any one or more paragraphs of the description. In an example 27, an apparatus includes a rotatable housing for a wireless drive unit, comprising a plurality of spaced-apart roller contacts each in rolling contact with a corresponding plurality of circular circuit traces of a circuit board, as shown and described in any one or more of the drawing figures and/or any one or more paragraphs of the description. In an example 28, an apparatus includes a rotatable housing for a wireless drive unit, comprising a plurality of spaced-apart roller contacts each in rolling contact with a corresponding plurality of circular circuit traces of a circuit board, the roller contacts in a roller contact housing that is electrically coupled to a fixed header via a coiled, extensible cable, as shown and described in any one or more of the drawing figures and/or any one or more paragraphs of the description.

An example 29 includes the apparatus of any of examples 22-28, further including: circuitry that enables the wireless drive unit to wirelessly communicate with a portable computing device and to directly communicated with circuitry of farm equipment; and a protective connector having a core assembly structure, mating pins, and a mating coupling structure, wherein the circuitry is mounted within the core assembly structure, wherein the mating coupling structure substantially encases the core assembly structure and mates with a connector of the farm equipment such that the mating pins of the protective connector are electrically coupled to pins of the connector of the farm equipment, and wherein the mating coupling structure is mechanically free-moving with respect to the core assembly structure such that forces applied to the mating coupling structure to mate the protective connector to the connector of the farm equipment are not applied to the circuitry within the core assembly structure.

An example 30 includes the apparatus of example 29, where the core assembly structure includes: an end cap; a circuitry housing; and a circuitry mounting and mating connection piece, wherein the circuitry is mounted to the circuitry mounting and mating connection piece, wherein the mating pins are within the circuitry mounting and mating connection piece and electrically coupled to the circuitry, wherein the circuitry housing mechanically couples to the circuitry mounting and mating connection piece to substantially encircle the circuitry, and wherein the end cap mechanically couples to an end of the circuitry housing.

7.0. TERMINOLOGY AND OTHER ASPECTS OF DISCLOSURE

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc., any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the drawing figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A connector for use with a communication apparatus to facilitate communication of data, via the communication apparatus, between a vehicle or agricultural implement and a computing device, the connector comprising a first portion and a second portion;

the first portion configured to couple the connector to the vehicle or agricultural implement; and the second portion configured to couple the connector to the communication apparatus, the second portion including a substrate having at least one circuit trace extending along a surface of the substrate and configured to engage a contact of the communication apparatus at the surface of the substrate, at a location along a length of the at least one circuit trace, to conductively transfer electronic signals between the connector and the communication apparatus.

2. The connector of claim 1, wherein the at least one circuit trace extends around the surface of the substrate in a generally circular configuration.

3. The connector of claim 1, wherein the at least one circuit trace includes multiple circuit traces defined along the surface of the substrate.

4. The connector of claim 3, wherein each of the multiple circuit traces extends around the surface of the substrate in a generally circular configuration at a different radial distance from other ones of the multiple circuit traces.

5. The connector of claim 1, wherein the at least one circuit trace extends around a perimeter portion of the substrate.

6. The connector of claim 1, further comprising a body defining a generally cylinder shape, the body including a first end and a second end generally opposite the first end, wherein the first portion is disposed at the first end of the body and the second portion is disposed at the second end of the body.

7. The connector of claim 6, wherein the first portion includes threads configured to mechanically couple the connector to a threaded receptacle of the vehicle or agricultural implement.

8. The connector of claim 1, wherein the first portion includes a cable configured to couple the connector to the vehicle or the agricultural implement.

9. The connector of claim 1, wherein the second portion further includes at least one receptacle configured to mechanically couple the connector to the communication apparatus.

10. The connector of claim 9, wherein the at least one receptacle includes a push and twist coupling receptacle.

11. The connector of claim 1, wherein the second portion further includes multiple female pin receptacles.

12. The connector of claim 1, wherein the second portion is configured to couple the connector to the communication apparatus, to facilitate the communication of data between the vehicle or agricultural implement and the computing device, without engagement of any male pins and female pin receptacles.

13. An apparatus for communicating data between a vehicle or agricultural implement and a computing device, the apparatus comprising:

a body configured to couple the apparatus to a connector associated with the vehicle or agricultural implement, the body comprising circuitry configured to communicate the data between the vehicle or agricultural implement and the computing device; and a housing positioned over at least part of the body and configured to rotate relative to the body, the housing having multiple roller contacts protruding from the housing, each of the multiple roller contacts configured to engage a circuit trace of the connector to thereby conductively transfer electronic signals between the connector and the circuitry to facilitate the communication of the data between the vehicle or agricultural implement and the computing device.

14. The apparatus of claim 13, wherein each of the roller contacts includes:

a ball configured to engage the corresponding circuit trace; and a spring configured to bias the ball into contact with the corresponding circuit trace.

15. The apparatus of claim 14, wherein the housing further includes multiple retainer tubes, each of the retainer tubes associated with one of the roller contacts and configured to house the spring and the ball of said roller contact.

16. The apparatus of claim 13, wherein the housing is configured to rotate around the body about three-hundred and sixty degrees or more while maintaining engagement of each of the multiple roller contacts with a corresponding circuit trace of the connector, when the body is coupled to the connector.

17. The apparatus of claim 13, further comprising at least one antenna disposed within the housing;

wherein the circuitry is configured to wirelessly communicate the data via the at least one antenna.

18. The apparatus of claim 13, further comprising a cable having a first end coupled to the multiple roller contacts and a second end coupled to the circuitry of the body, the cable configured to transfer the electronic signals between the multiple roller contacts and the circuitry.

19. The apparatus of claim 18, wherein the cable is disposed about a perimeter portion of the body.

20. The apparatus of claim 13, wherein the body is configured to couple the apparatus of the connector, to facilitate the communication of the data between the vehicle or agricultural implement and the computing device, without engagement of any male pins and female pin receptacles.

\* \* \* \* \*